United States Patent … US 7,554,234 B2
Yokomori et al. … Jun. 30, 2009

(54) MOTOR WITH ROTATION SUPPRESSION MECHANISM FOR MOVABLE BODY

(75) Inventors: Kazuhito Yokomori, Yamanashi (JP); Hiroshi Sato, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 175 days.

(21) Appl. No.: 11/637,689

(22) Filed: Dec. 13, 2006

(65) Prior Publication Data

US 2007/0170795 A1 Jul. 26, 2007

(30) Foreign Application Priority Data

Jan. 18, 2006 (JP) ............................. 2006-010038

(51) Int. Cl.
  *H02K 7/10* (2006.01)
(52) U.S. Cl. ............................. 310/77; 310/93; 318/362
(58) Field of Classification Search ................... 310/77, 310/83, 93–96; 318/362, 375, 379–381; 188/164
  See application file for complete search history.

(56) References Cited

U.S. PATENT DOCUMENTS

| | | | |
|---|---|---|---|
| 3,885,175 A * | 5/1975 | Palloch | 310/68 D |
| 4,717,865 A * | 1/1988 | Caputo | 318/362 |
| 5,087,845 A * | 2/1992 | Behrens et al. | 310/77 |
| 5,404,063 A * | 4/1995 | Mills | 310/266 |
| 5,986,370 A * | 11/1999 | Cheng | 310/77 |
| 6,581,731 B2 * | 6/2003 | Chen | 188/164 |
| 6,806,666 B2 | 10/2004 | Kim et al. | |
| 7,279,858 B2 * | 10/2007 | Takeuchi | 318/376 |
| 2006/0238060 A1 * | 10/2006 | Sesita et al. | 310/180 |

FOREIGN PATENT DOCUMENTS

| | | |
|---|---|---|
| FR | 002813147 A3 * | 2/2002 |
| JP | 5-211798 | 8/1993 |
| JP | 9-125823 | 5/1997 |
| JP | 10-341590 | 12/1998 |
| JP | 2004-242500 | 8/2004 |
| KR | 10-2004-0029618 | 4/2004 |

OTHER PUBLICATIONS

Korean Notice of Allowance issued in Korean Patent Application No. 9-5-2008-035125594, mailed Jun. 30, 2008.

* cited by examiner

*Primary Examiner*—Michael C Zarroli
(74) *Attorney, Agent, or Firm*—McDermott Will & Emery LLP

(57) ABSTRACT

A motor for driving a movable body includes a cylinder portion that holds a field magnet, a coil holder disposed rotatably to the cylinder portion, a conducting coil wound on the coil holder and generates a rotational force between the same and the cylinder portion when a current flows in the conducting coil, a brake coil provided on the coil holder, where an electromotive force for generating magnetic field that suppresses relative rotation between the coil holder and the cylinder portion is induced between both ends of brake coil when a current flows in the conducting coil, and a switch interposed between the both ends of the brake coil.

19 Claims, 32 Drawing Sheets

FIG.1
FULLY CLOSED POSITION
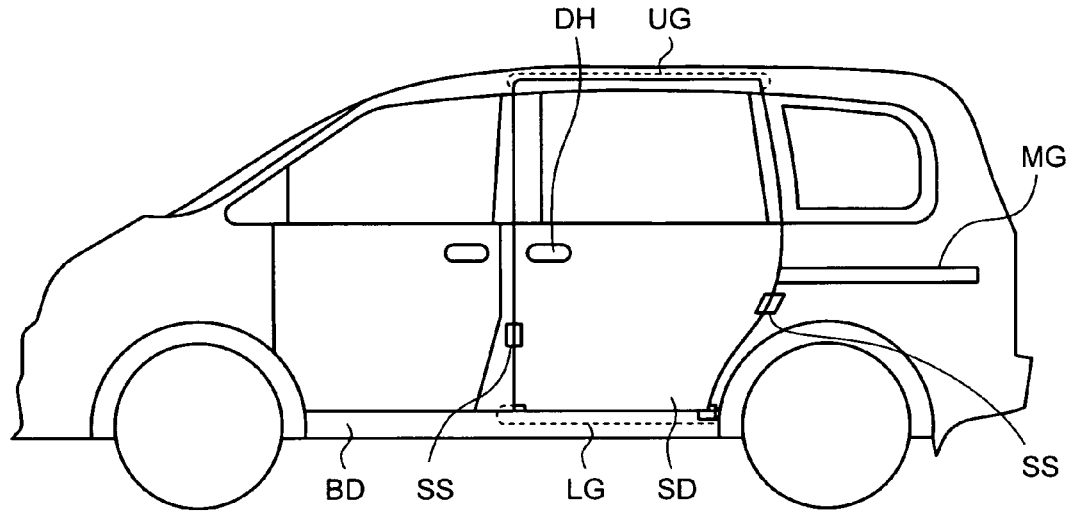
FULLY OPENED POSITION
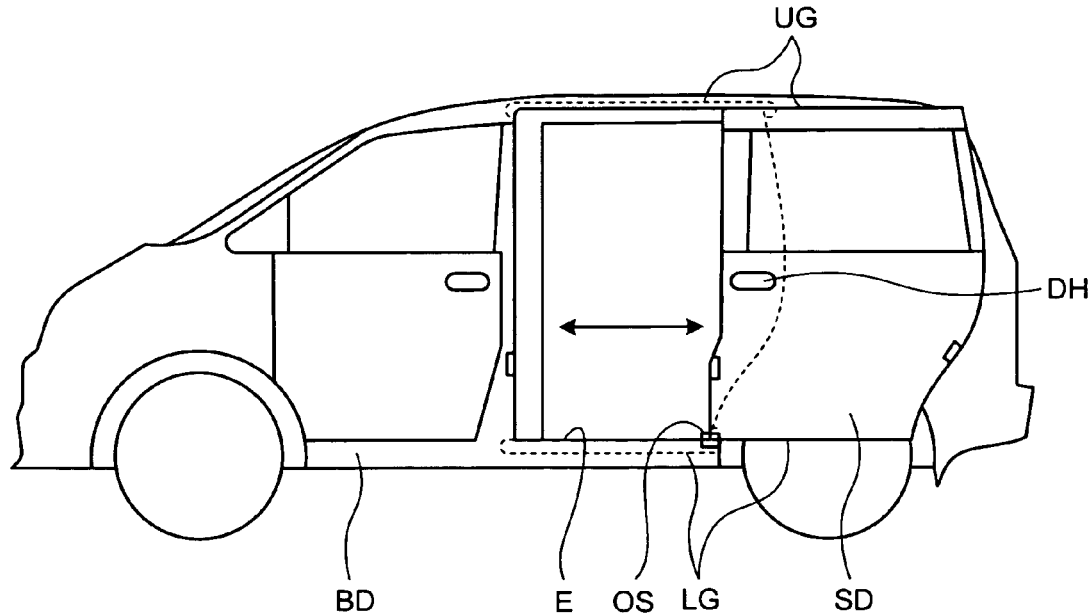

MOTOR WITH ROTATION SUPPRESSION MECHANISM FOR MOVABLE BODY

BACKGROUND OF THE INVENTION

1. Field of the Invention

The present invention relates to a motor that moves a movable body such as a door, a sunroof, a passenger seat, or a gate, and to a body moving apparatus that includes the motor.

2. Description of the Related Art

Some vehicles, passenger cars or vans, have a sliding door on one or more sides of the body, and a sliding-door motor is employed to open and close the sliding door. A driving mechanism couples the sliding-door motor and the sliding door. The driving mechanism includes a drum fixed to a driving shaft of the sliding-door motor and that rotates with the shaft, a door-closing wire for closing the sliding door and a door-opening wire for opening the sliding door couple the drum and the sliding door.

A door switch is provided in the compartment of the vehicle and the door switch is electrically coupled with the sliding-door motor. An opening operation for opening the sliding door and a closing operation for closing the sliding door is performed by operating the door switch. The door switch is provided nears the driver seat or near the front passenger seat, or can be integrated in a door handle or a key. A conventional art has been disclosed in, for example, Japanese Patent Application Laid-Open No. H9-125823.

Assume that a vehicle with a sliding door is standing on a slop, with front side down and back side up, and the sliding door is opened in this state. In this case, the sliding door opens forcefully due to gravity force acting on the sliding door.

Similar problem occurs when closing the sliding door when the vehicle is standing in a state with front side down and back side up.

Some conventional sliding-door motors include brake coils to solve the above problem. Such a sliding-door motor includes a rotor rotatable about a rotation shaft, a stator disposed around the rotor, a field magnet holder provided in the stator to hold field magnets, a coil holder disposed on the rotor, and a conducting coil provided on the coil holder, where the rotor is rotated (the field magnet holder and the coil holder are rotated relative to each other) by magnetic field generated according to application of a voltage to both ends of the conducting coil (conducting to the conducting coil), rotation of the rotor is transmitted to the driving shaft and the drum is rotated in a forward/backward direction, so that the sliding door is opened/closed. Thus, the sliding door motor includes not only the conducting coil but also a brake coil provided on the coil holder to be stacked on the conducting coil, and it also includes a brake circuit formed by connecting both ends of the brake coil using a conducting wire. In this sliding door motor, when magnetic field is generated on the conducting coil by application of a voltage across the both end, an induced electromotive force occurs between the both ends of the brake coil and a current flows in the brake circuit so that magnetic field is generated in the brake coil. Because the magnetic field generated in the brake coil reduces intensity of the magnetic field generated when a current flows in the conducting coil, it can suppress a relative movement of the field magnet holder and the coil holder to control a moving speed of the sliding door.

In the sliding door motor including the brake coil, even if the door switch is operated in a vehicle where the vehicle is inclined, a moving speed of the sliding door can be suppressed so that a problem of the sliding door opening forcefully is prevented, and a problem that the door closing forcefully can be prevented. Especially, in the sliding door motor including the brake coil, since a change rate of magnetic field intensity per unit time acting on the brake coil increases according to increase of a rotation number per unit time of the rotor, magnetic field intensity of magnetic field generated in the brake coil by an induced electromotive force increases so that a force suppressing a moving speed of the sliding door acts largely. Therefore, a force that suppresses a moving speed of the sliding door and obtained by the brake coil acts largely on a steep slope. Accordingly, a moving speed of the sliding door can be controlled even on a steep slope.

However, there is a problem in the conventional sliding door motor that, when the sliding door is operated for opening or operated for closing using the sliding door motor, the rotation of the rotor is suppressed by the brake coil, so that the efficiency of the sliding door motor is reduced.

This problem also occurs, for example, in a sliding door motor that opens and closes a back door (a door) provided on a rear portion of a vehicle, or a motor for operating a sunroof provided at a ceiling of a vehicle.

Thus, there is a need of a motor for a movable body better efficiency and operability.

SUMMARY OF THE INVENTION

It is an object of the present invention to at least partially solve the problems in the conventional technology.

According to an aspect of the present invention, a motor for driving a movable body includes a field magnet holder that holds a field magnet; a coil holder rotatable relative to the field magnet holder; a conducting coil that is wound on the coil holder and generates a rotational force between the coil holder and the field magnet holder when a current flows in the conducting coil; a brake coil that is wound on the coil holder, where an electromotive force for generating magnetic field that suppresses relative rotation between the coil holder and the field magnet holder is induced at both ends of the brake coil when a current flows in the conducting coil; and a switch unit that is electrically interposed between the both ends of the brake coil.

According to another aspect of the present invention, a motor for driving a movable body includes a driving field-magnet holder that holds a driving field magnet; a driving coil holder that is rotatable relative to the driving field-magnet holder; a conducting coil that is wound on the driving coil holder and generates a rotational force between the driving coil and the driving field-magnet holder when a current flows in the conducting coil; a braking field-magnet holder that is rotatable together with any one of the driving coil holder and the driving field-magnet holder by a rotational force generated by the conducting coil and holds a braking field magnet; a braking coil holder that is rotatable relative to the braking field-magnet holder; a brake coil that is wound on the braking coil holder, where an electromotive force for generating magnetic field that suppresses the relative rotation between the driving coil holder and the driving field-magnet holder is induced at both ends of the brake coil when a current flows in the conducting coil; and a switch unit that is electrically interposed between both ends of the brake coil.

According to still another aspect of the present invention, a body moving apparatus includes the above motor.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a side view of a passenger vehicle to which a sliding door motor (i.e., a motor for a movable body) according to a first embodiment of the present invention is applied;

DETAILED DESCRIPTION OF THE PREFERRED EMBODIMENTS

Figure 2:
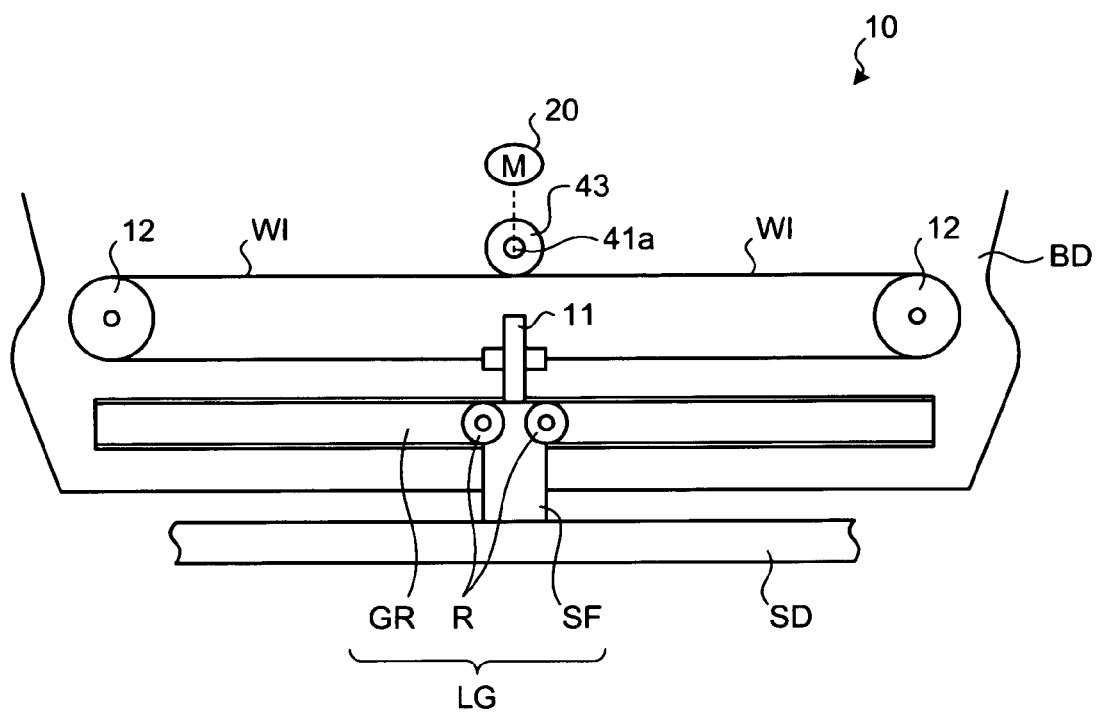
FIG. 2 is a plan conceptual diagram of a power slide unit (i.e., a body moving apparatus) provided in the passenger vehicle shown in FIG. 1.

Exemplary embodiments of the present invention will be explained below in detail with reference to the accompanying drawings.

FIG. 1 is a schematic of a four-wheel passenger vehicle to which a motor for a movable body (hereinafter, "sliding door motor") according to a first embodiment of the present invention is applied. The passenger vehicle includes a vehicle main body BD, so-called "one box type", where an entrance opening E that allows entrance of passengers is provided at an approximately central position at a side portion of the vehicle main body BD and a sliding door SD is provided to the entrance opening E.

The sliding door SD is provided on the side portion of the vehicle main body BD so as to be slidable via an upper guide unit UG provided between the same and an upper end portion of the vehicle main body BD, a lower guide unit LG provided between the same and a lower end portion of the vehicle main body BD, and a central guide unit MG provided between the same and a central portion of the vehicle main body BD. When the sliding door SD is slid most forward to the vehicle main body BD, the entrance opening E is put in a closing state (hereinafter, "a fully closed position"), while the entrance opening E is put in an opening state (hereinafter, "a fully opened position") when it is slid most rearward to the vehicle main body BD. The guide units UG, LG, MG are each constituted, for example, by providing a support frame SF including traveling rollers R on the sliding door SD while providing a guide rail GR for guiding the traveling rollers R on the vehicle main body BD, as typified by the lower guide unit LG shown in FIG. 2.

As shown in FIG. 1, full-closing stoppers SS and a full-opening stopper OS are provided between the sliding door SD and the vehicle main body BD.

The full-closing stoppers SS maintain the fully closed position of the slide door SD when the sliding door SD has reached the fully closed position, and they are provided, for example, between a front edge portion of the sliding door SD and the vehicle main body BD and between a rear edge portion of the sliding door SD and the vehicle main body BD. The full-closing stopper SS includes, for example, a striker provided on the vehicle main body BD and a latch provided on the sliding door SD (the support frame SF), where, when the striker and the latch are made to engage each other, the movement of the sliding door SD to the vehicle main body BD is restricted.

The full-opening stopper OS maintains the fully opened position of the sliding door SD when the sliding door SD has reached the fully opened position, and it is provided, for example, between the support frame SF of the lower guide unit LG and the vehicle main body BD. The full-opening stopper OS includes, for example, a striker provided on the vehicle main body BD and a latch provided on the sliding door SD (the support frame SF), where, when the striker and the latch are made to engage each other, the movement of the sliding door SD to the vehicle main body BD is restricted.

A movement restricted state of the sliding door SD maintained by the full-closing stoppers SS and the full-opening stopper OS can be cancelled according to driving of a release actuator (not shown) when a door handle DH provided on the sliding door SD is operated or a door switch provided on a remote controller key is operated.

As shown in FIG. 2, the sliding door SD includes a power slide unit (a body moving apparatus) 10. The power slide unit 10 is a driving device that slides the sliding door SD to the vehicle main body BD, and drives a sliding door motor 20 that is an actuator according to an operation of, for example, the door handle HD or the door switch provided on the remote controller key to slide the sliding door SD according to driving of the sliding door motor 20. More specifically, a drum 43 is provided on a driving shaft 41a of the sliding door motor 20 while a wire coupling plate 11 is provided on the support frame SF, a door-closing wire WI for sending the slide door forward is provided between the drum 43 and the wire coupling plate 11 and a door-opening wire WI for sending the sliding door rearward is provided between the drum 43 and the wire coupling plate 11, and the drum 43 and the support frame SF are linked by the wires WI, so that the sliding door SD is slid in a door-opening direction and in a door-closing direction according to transmission of driving of the sliding door motor 20 to the support frame SF via the respective wires WI. The wires WI are turned over idler pulleys 12 for changing extending directions of the wires WI.

The sliding door motor 20 rotates the drum 43 when a voltage is applied to the sliding door motor 20 from a power source described later. The sliding door motor 20 includes, as shown in FIGS. 3 to 7, a motor case 21, a motor cap 26, a shaft 33, and a worm wheel 41.

Figure 3:
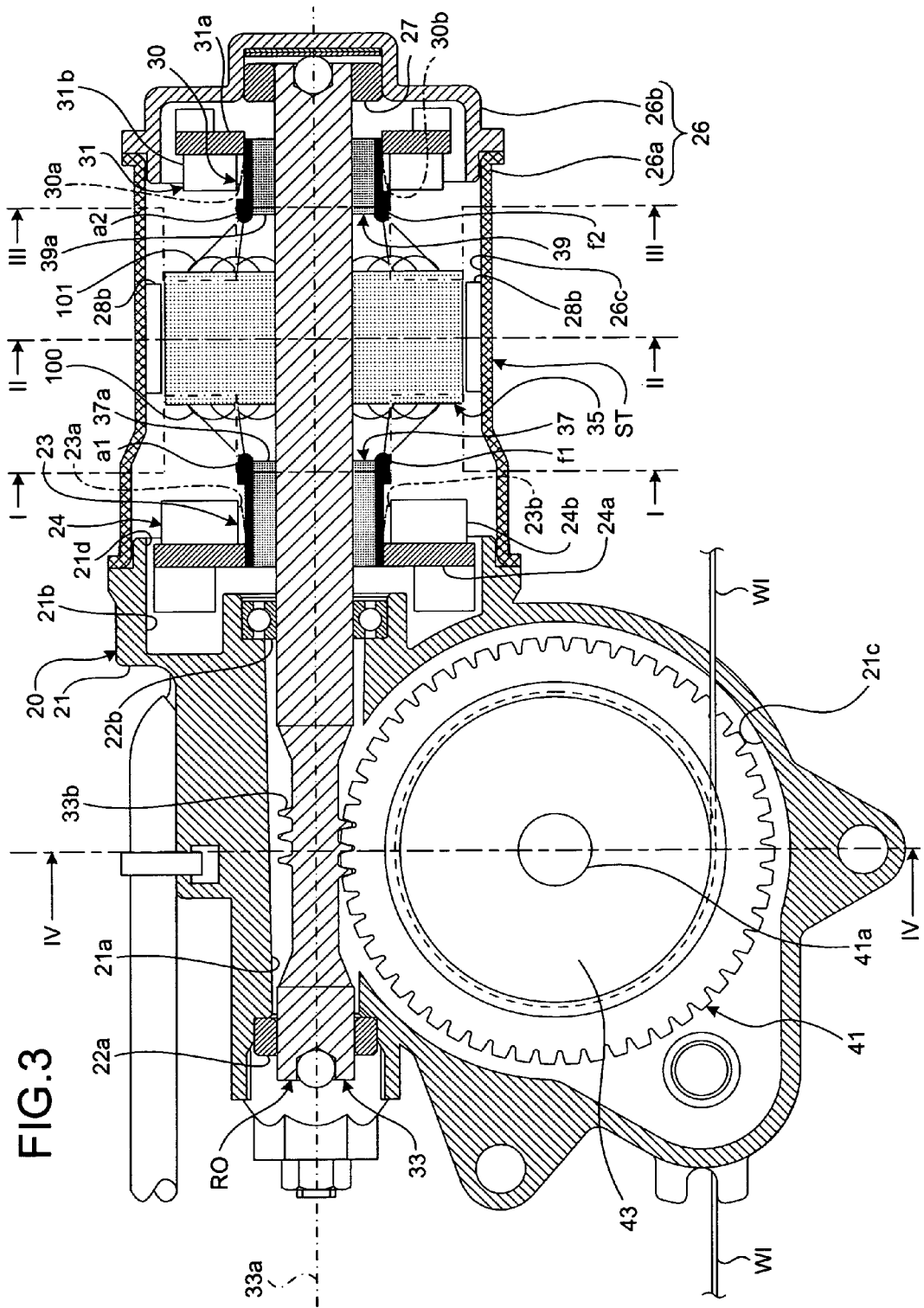
FIG. 3 is a sectional side view of the sliding door motor applied to the passenger vehicle shown in FIG. 1.
Figure 4:
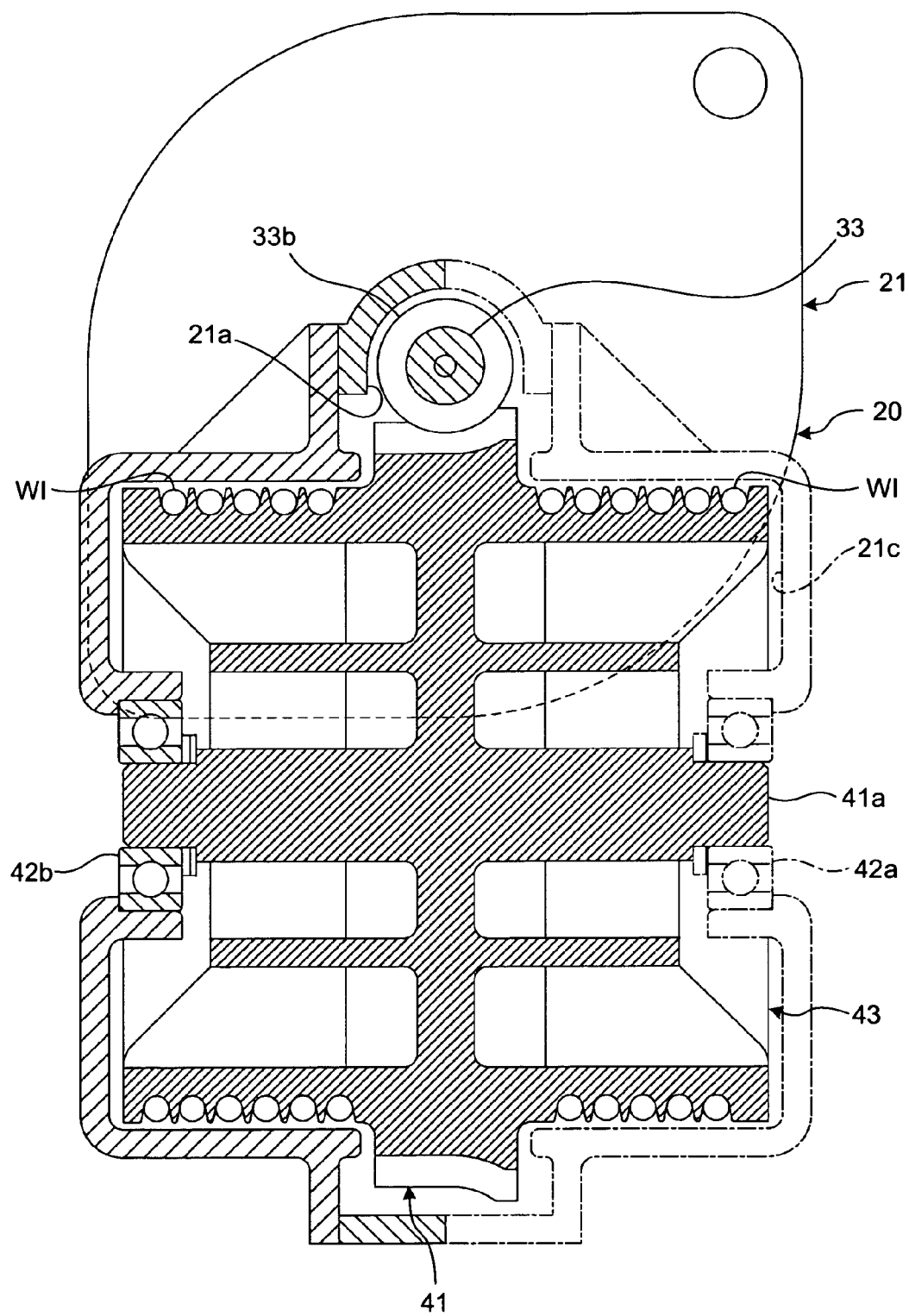
FIG. 4 is a sectional view taken along a line IV-IV in FIG. 3.

The motor case 21 includes a cylindrical first space 21a, a cylindrical second space 21b whose diameter is larger than that of the first space 21a, and an accommodating space 21c. The first space 21a and the second space 21b communicate with each other and accommodate the shaft 33. The accommodating space 21c accommodates the worm wheel 41, and it communicates with the first space 21a, as shown in FIGS. 3 and 4.

A brush 23 and a brush holder 24 are provided at one end of the motor case 21, which one end includes an opening 21d communicating with the second space 21b.

The brush 23 electrically connects a voltage controller and a conducting coil in cooperation with a commutator described later. The brush 23 can include, for example, a pair of brushes 23a and 23b.

The brush holder 24 is made from an electrically insulating material and it includes a main body 24a and the brush supporting unit 24b. The main body 24a is cylindrical, while the brush supporting portion 24b projects outside the motor case 21 from the main body 24a along a rotation axis 33a of the shaft 33. The brush holder 24 is attached to the motor case 21 via an attaching member (not shown) provided on an outer peripheral face of the main body 24a, and it holds the brushes 23a, 23b via a brush supporting unit 24b while electrically insulating the brushes 23a, 23b and the motor case 21 from each other.

Figure 5:
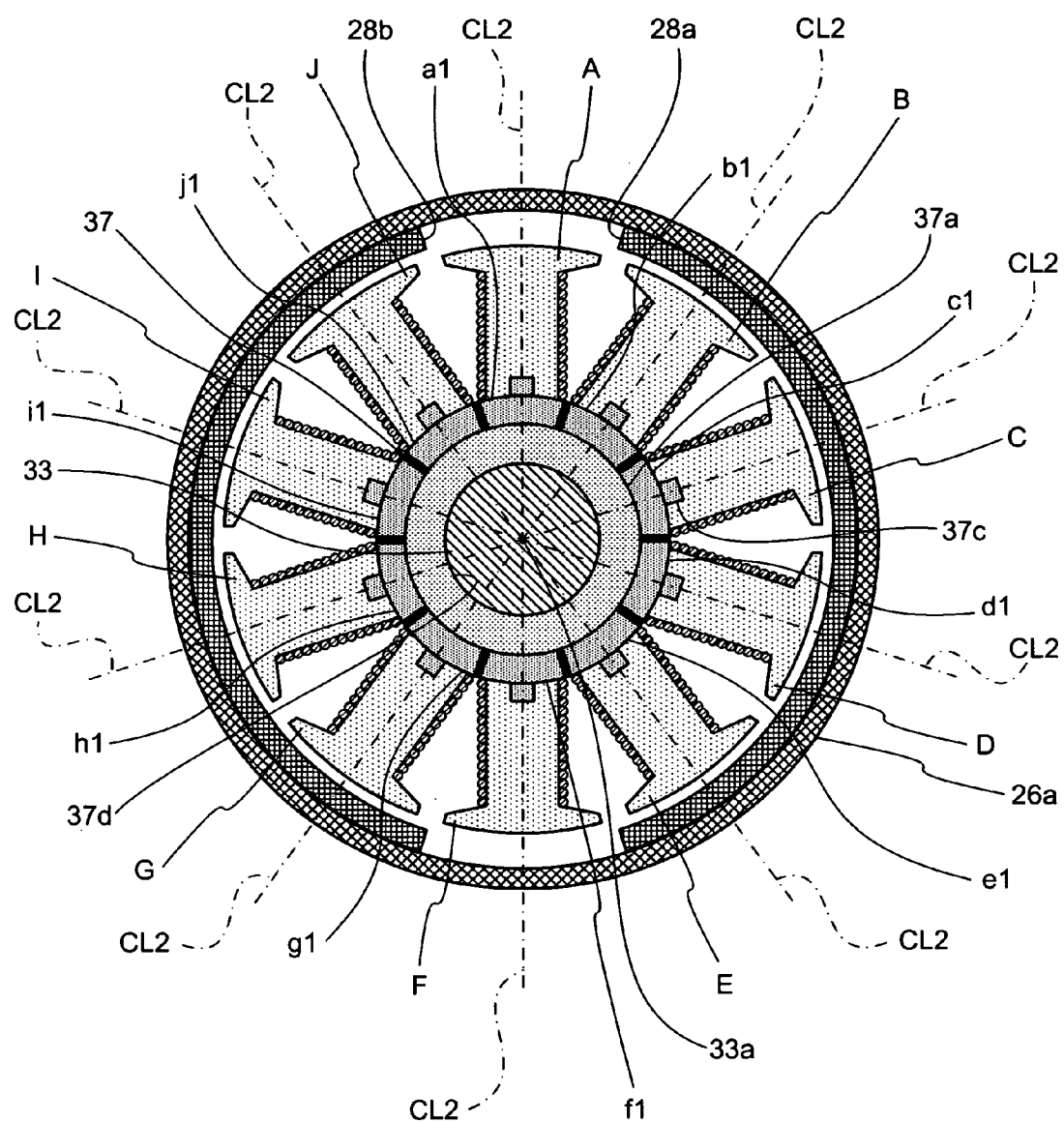
FIG. 5 is a sectional view taken along a line I-I in FIG. 3.
Figure 6:
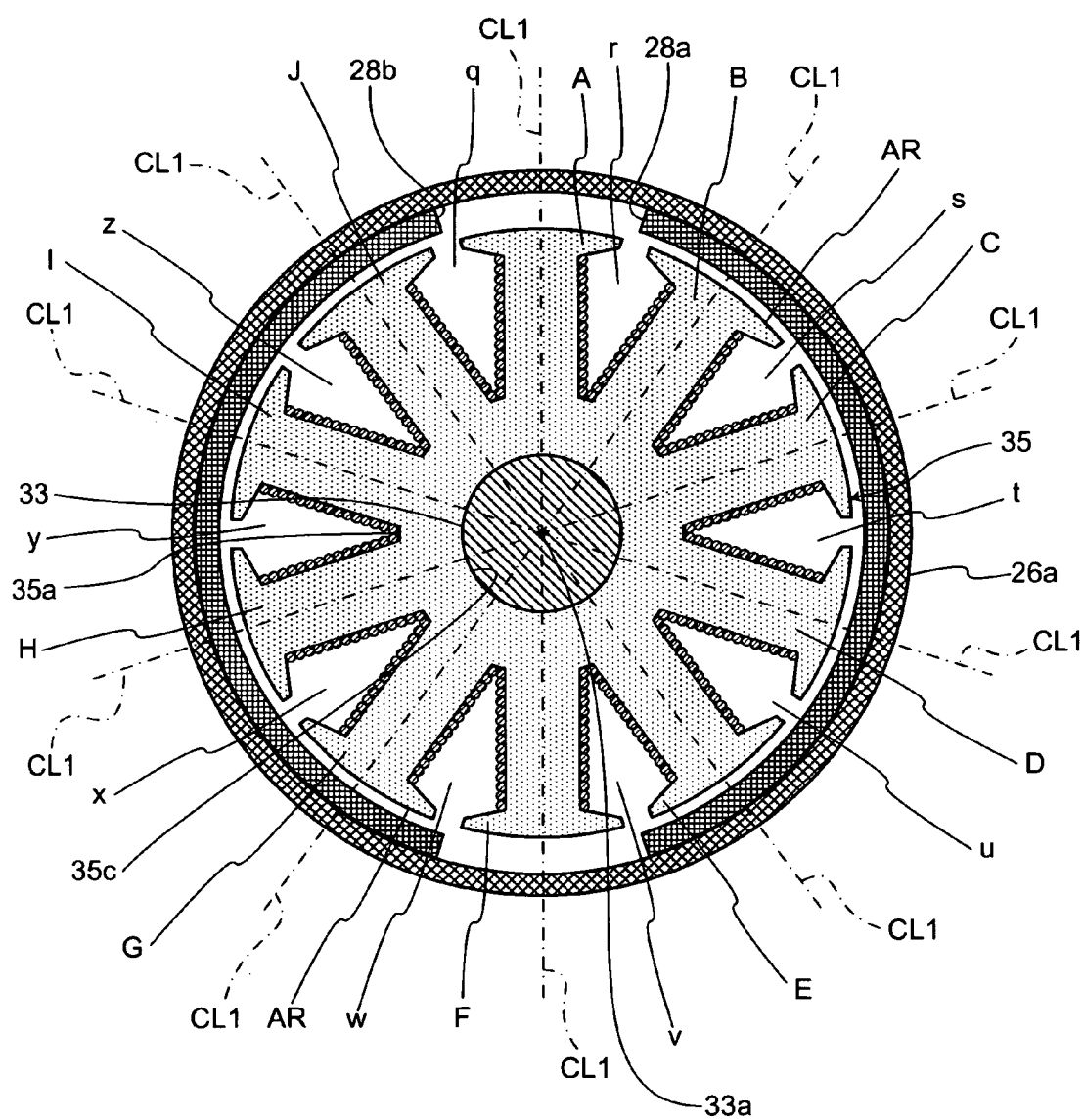
FIG. 6 is a sectional view taken along a line II-II in FIG. 3.
Figure 7:
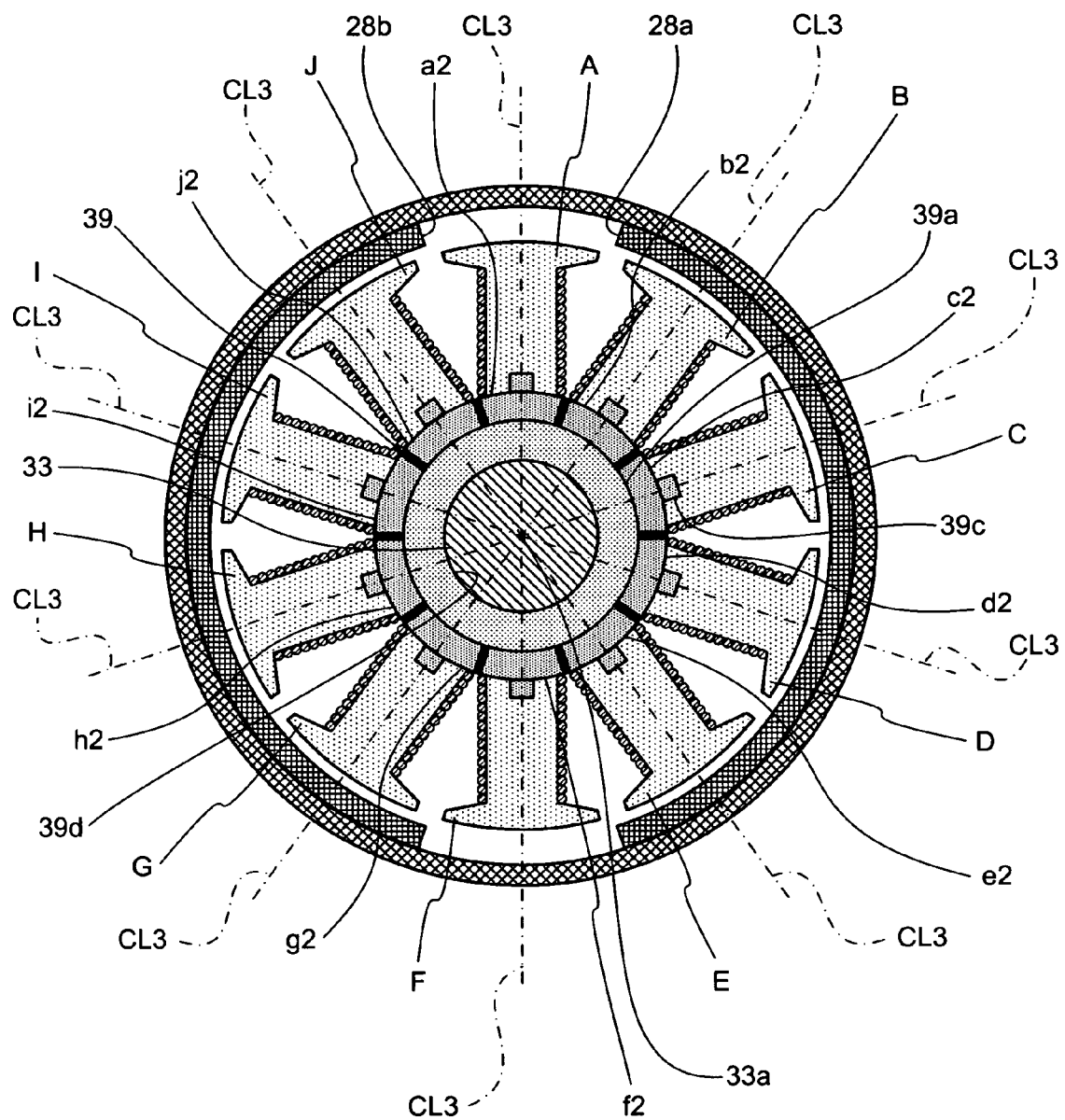
FIG. 7 is a sectional view taken along a line III-III in FIG. 3.

The motor cap 26 includes a cylindrically formed cylinder portion 26a and a lid portion 26b attached to one end of the cylinder portion 26a, and it is formed to have a cylindrical third space 26c therein by assembling the lid portion 26b to the cylinder portion 26a. The cylinder portion 26a is formed from a magnetic material and functions as a yoke for preventing magnetic force of two field magnets 28a, 28b attached thereto from lowering and also functions as a field magnet holder for holding the field magnets 28a, 28b. The field magnets 28a, 28b are, for example, plate-like permanent magnets, where one field magnet 28a is attached to a right inner side face of the cylinder portion 26a and the other field magnet 28b having, on its surface, a pole different from that on a surface of the field magnet 28a is attached to a left inner side face of the cylinder portion 26a such that magnetic field forming approximately parallel magnetic force lines is formed in the third space 26c, as shown in FIGS. 5 to 7. More specifically, the one field magnet 28a is attached to the right inner side face of the cylinder portion 26a such that a surface thereof becomes the south pole, while the other field magnet 28b is attached to the left side surface of the cylinder portion 26a such that a surface thereof becomes the north pole. The two field magnets 28a, 28b are arranged on the inner side face of the motor cap 26 such that they are spaced by a predetermined distance. As shown in FIG. 3, the third space 26c accommodates the shaft 33 and a coil holder described later.

A braking brush (a brush for movement restriction) 30 and a braking brush holder (a brush holder for movement restriction) 31 are attached to the lid portion 26b of the motor cap 26.

The braking brush 30 together with the braking commutator 39 described later electrically connects a brake coil and a switch (a switch unit), and it is provided such that one braking brush 30a and the other braking brush 30b form a pair, for example.

The braking brush holder 31 is made from an electrically insulating material, and it is formed to have a main body 31a and a brush supporting unit 31b. The main body 31a is formed to be cylindrical, while the brush supporting unit 31b is formed to project from the main body 31a along the rotation axis 33a of the shaft 33. The braking brush holder 31 is attached to the motor cap 26 via an attaching member (not shown) provided on an outer peripheral face of the main body 31a, and it holds the braking brushes 30a, 30b through the brush supporting unit 31b while electrically insulating the braking brushes 30a, 30b and the motor cap 26 from each other.

The motor case 21 and the motor cap 26 are assembled such that the second space 21b and the third space 26c communicate with each other.

The shaft 33 is provided to be rotatable about the rotation axis 33a in the first space 21a, the second space 21b, and the third space 26c through bearings 22a, 22b provided on the motor case 21 and a bearing 27 provided on the motor cap 26, namely, to be rotatable about the rotation axis 33a in the motor case 21 and the motor cap 26. A worm 33b is provided on an outer peripheral face of a portion of the shaft 33 positioned between the bearing 22a and the bearing 22b, and a coil holder (core) 35, the commutator 37, and a commutator for break 39 are provided on an outer peripheral face of a portion of the shaft 33 positioned between the bearing 22b and the bearing 27.

As shown in FIG. 4, the worm wheel 41 is provided in the accommodating space 21c so as to be rotatable about the drive shaft 41a through bearings 42a, 42b provided on the motor case 21 and mesh with the worm 33b. The worm wheel 41 of the first embodiment is provided such that the drums 43 attached with one ends of the two wires WI, respectively, are integrated to both sides of the worm wheel 41. That is, in the first embodiment, the worm wheel 41 and the drums 43 are integrally provided such that, when the shaft 33 is rotated once so that the worm wheel 41 is rotated via the worm 33b by a predetermined angle, the drums 43 are also rotated by the predetermined angle.

The coil holder 35 holds a coil formed by winding a conducting wire described later. The coil holder 35 is disposed at an approximately central portion between the bearing 22b and the bearing 27, as shown in FIG. 3, and it is formed by laminating magnetic members such as silicon steel plates so as to have a cylinder portion 35a provided cylindrically, a plurality of, e.g., ten, tooth portions A, B, C, D, E, F, G, H, I, J provided on an outer peripheral face of the cylinder portion 35a so as to project, and a plurality of, e.g., ten, slot portions (grooves) q, r, s, t, u, v, w, x, y, z provided so as to correspond to the tooth portions A, B, C, D, E, F, G, H, I, J, as shown in FIG. 6. The coil holder 35 is attached to the shaft 33 by fixing an inner peripheral face of a through hole 35c formed in the cylinder portion 35a and an outer peripheral face of the shaft 33.

Each of the tooth portions A, B, C, D, E, F, G, H, I, J is formed in a T shape expanding toward its tip end in side view such that an opposed area between a surface of each field magnet 28a, 28b attached to the motor cap 26 and a surface AR of the tip end becomes large. The tooth portions A, B, C, D, E, F, G, H, I, J are arranged such that a projecting direction of one of the tooth portions and a projecting direction of another of the tooth portions which is provided on the opposite side of the outer peripheral face of the cylinder portion 35a from the one are reverse to each other in a state where a center line CL1 passing through a center passes through the rotation axis 33a on a plane perpendicular to the rotation axis 33a and the slot portions q, r, S, t, u, V, w, x, y, z are each interposed between adjacent ones of the tooth portions such that the tooth portions are positioned at equal intervals on the outer peripheral face of the cylinder portion 35a. Further, in the first embodiment, the tooth portions A, B, C, D, E, F, G, H, I, J are arranged on the plane perpendicular to the rotation axis 33a to form a point symmetry about the rotation axis 33a, where ten tooth portions A, B. C, D, E, F, G, H, I, J are arranged on the outer peripheral face of the cylinder portion 35a such that an angle defined by the center line CL1 of one of the tooth portions A, B, C, D, E, F, G, H, I, J and the center line CL1 of another of the tooth portions A, B, C, D, E, F, G, H, I, J adjacent thereto forms 36 degrees.

The coil holder 35 with these tooth portions A, B, C, D, E, F, G, H, I, J are disposed on the shaft 33 such that the surfaces of the field magnets 28a, 28b and surfaces AR of distal ends of the tooth portions A, B, C, D, E, F, G, H, I, J are opposed to each other in a state where slight gaps are formed between the surfaces of the field magnets 28a, 28b and the surfaces AR of the distal ends of the tooth portions A, B, C, D, E, F, G, H, I, J.

As shown in FIG. 3, the commutator 37 is disposed between the coil holder 35 and the bearing 22b. As shown in FIG. 5, the commutator 37 is formed from an electrically conductive material to have a cylinder portion 37a provided cylindrically and a plurality of, e.g., ten, commutator pieces a1, b1, c1, d1, e1, f1, g1, h1, i1, j1 provided so as to project from the outer peripheral face of the cylinder portion 37a, and it is attached to the shaft 33 by fixing an inner peripheral face of a through-hole 37d formed in the cylinder portion 37a and an outer peripheral face of the shaft 33.

The respective commutator pieces a1, b1, c1, d1, e1, f1, g1, h1, i1, j1 are formed to correspond to the tooth portions A, B, C, D, E, F, G, H, I, J in an insulating state from one another. The commutator pieces a1, b1 c1, d1, e1, f1, g1, h1, i1, j1 are arranged such that a projecting direction of one of the commutator pieces and a projecting direction of another of the commutator pieces which is provided on the opposite side of the outer peripheral face of the cylinder portion 37a from the one are reverse to each other in a state where a center line CL2 passing through a center passes through the rotation axis 33a on a plane perpendicular to the rotation axis 33a and the commutator pieces are adjacent to the outer peripheral face of the cylinder portion 37a. Further, in the first embodiment, the commutator pieces a1, b1, c1, d1, e1, f1, g1, h1, i1, j1 are arranged on the outer peripheral face of the cylinder portion 37a to form a point symmetry about the rotation axis 33a on the plane perpendicular to the rotation axis 33a, where ten commutator pieces a1, b1, c1, d1, e1, f1, g1, h1, i1, j1 are arranged on the outer peripheral face of the cylinder portion 37a such that an angle defined by the center line CL2 of one of the commutator pieces a1, b1, c1, d1, e1, f1, g1, h1, i1, j1 and the center line CL2 of another thereof which is adjacent to the one forms 36 degrees. The commutator pieces a1, b1, c1, d1, e1, f1, g1, h1, i1, j1 are formed with engagement pieces 37c for attachment of a conducting wire.

The commutator 37 with these commutator pieces a1, b1, c1, d1, e1, f1, g1, h1, i1, j1 are arranged such that the center lines CL1 of the tooth portions A, B, C, D, E, F, G, H, I, J and the center lines CL2 of the commutator pieces a1, b1, c1, d1, e1, f1, g1, h1, i1, j1 are overlapped on each other in a direction extending along the rotation axis 33a.

As shown in FIG. 3, the braking commutator 39 is disposed between the coil holder 35 and the bearing 27. As shown in FIG. 7, the commutator 39 is formed from an electrically conductive material to have a cylinder portion 39a provided cylindrically and a plurality of, e.g., ten, commutator pieces a2, b2, c2, d2, e2, f2, g2, h2, i2, j2 provided so as to project from the outer peripheral face of the cylinder portion 39a, and it is attached to the shaft 33 by fixing an inner peripheral face of a through-hole 39d formed in the cylinder portion 39a and an outer peripheral face of the shaft 33.

The respective commutator pieces a2, b2, c2, d2, e2, f2, g2, h2, i2, j2 are formed, for example, to correspond to the tooth portions A, B, C, D, E, F, G, H, I, J in an insulating state from one another. The commutator pieces a2, b2, c2, d2, e2, f2, g2, h2, i2, j2 are arranged such that a projecting direction of one of the commutator pieces and a projecting direction of another of the commutator pieces which is provided on the opposite side of the outer peripheral face of the cylinder portion 39a from the one are reverse to each other in a state where a center line CL3 passing through a center passes through the rotation axis 33a on a plane perpendicular to the rotation axis 33a and the commutator pieces are adjacent to the outer peripheral face of the cylinder portion 39a. Further, in the first embodiment, the commutator pieces a2, b2, c2, d2, e2, f2, g2, h2, i2, j2 are arranged on the outer peripheral face of the cylinder portion 37a to form a point symmetry about the rotation axis 33a on the plane perpendicular to the rotation axis 33a, where ten commutator pieces a2, b2, c2, d2, e2, f2, g2, h2, i2, j2 are arranged on the outer peripheral face of the cylinder portion 39a such that an angle defined by the center line CL3 of one of the commutator pieces a1, b1, c1, d1, e1, f1, g1, h1, i1, j1 and the center line CL3 of another thereof which is adjacent to the one forms 36 degrees. The commutator pieces a2, b2, c2, d2, e2, f2, g2, h2, i2, j2 are formed with engagement pieces 39c for attachment of a conducting wire.

The braking commutator 39 with these commutator pieces a2, b2, c2, d2, e2, f2, g2, h2, i2, j2 are arranged such that the center lines CL1 of the tooth portions A, B, C, D, E, F, G, H, I, J and the center lines CL3 of the commutator pieces a2, b2, c2, d2, e2, f2, g2, h2, i2, j2 are overlapped on each other, for example, in a direction extending along the rotation axis 33a.

Figure 8:
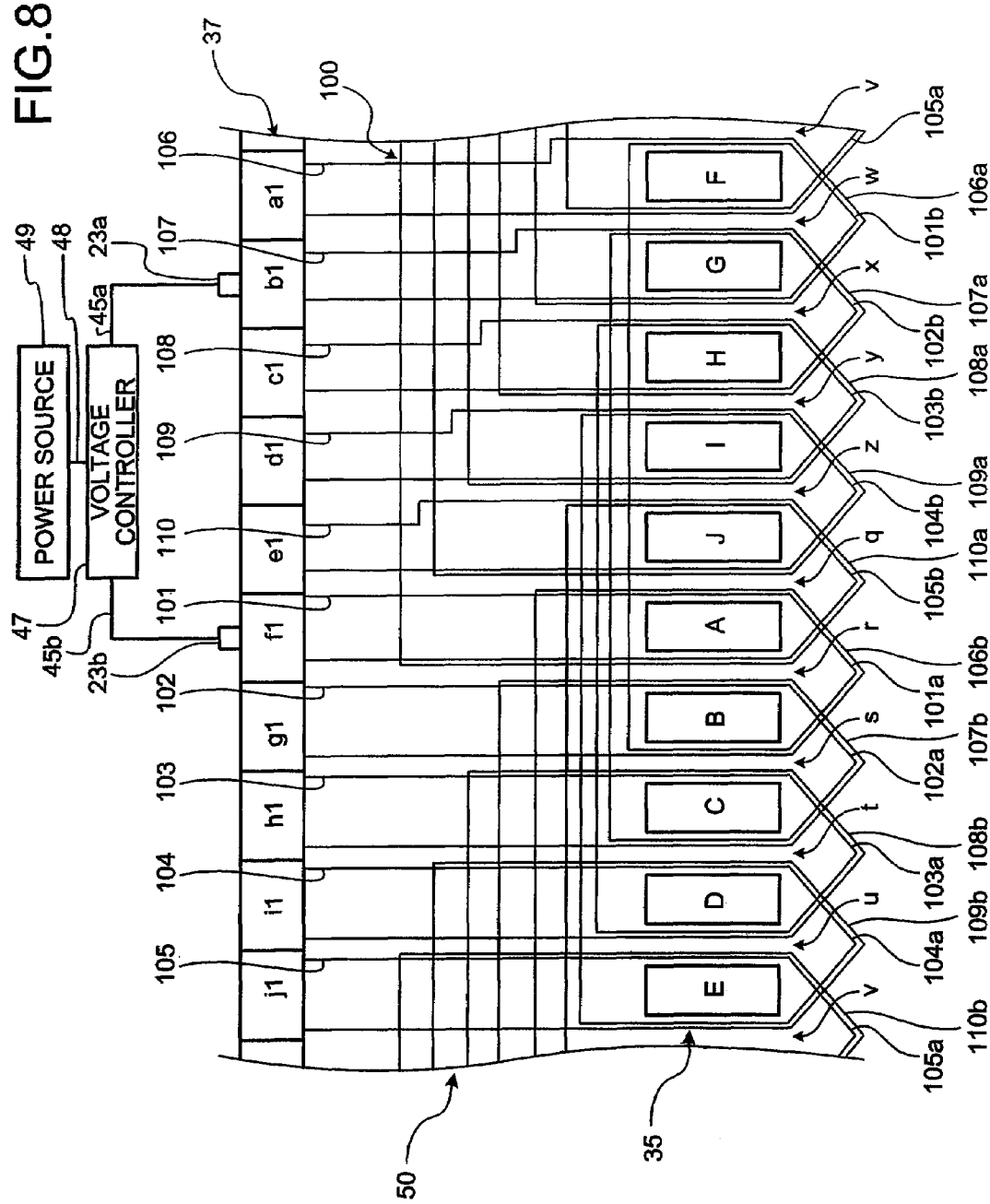
FIG. 8 is a development diagram of a concept of wire connections of wires for providing a conducting coil in the sliding door motor.

As shown in FIG. 8, for example, in the sliding door motor 20 of the first embodiment, conducting coils 101a, 101b, 102a, 102b, 103a, 103b, 104a, 104b, 105a, 105b, 106a, 106b, 107a, 107b, 108a, 100b, 109a, 109b, 110a, 110b are provided by winding conducting wires 100 (101, 102, 103, 104, 105, 106, 107, 108, 109, 110) on the tooth portions A, B, C, D, E, F, G, H, I, J.

That is, the first conducting wire 101 whose one end has been attached to the engagement piece 37c of the commutator piece f1 is made to pass through the slot portion q and the slot portion s so as to be wound around the first tooth portion A and the second tooth portion B for plural times so that the first conducting coil 101a is provided. The first conducting wire 101 is then made to pass through the slot portion v and the slot portion x so as to be wound around the sixth tooth portion F and the seventh tooth portion G for plural times in a direction reverse to a winding direction regarding the first tooth portion A and the second tooth portion B so that the first conducting coil 101*b* is provided, and thereafter the other end thereof is attached to the engagement piece 37*c* of the commutator piece b1.

The second conducting wire 102 whose one end has been attached to the engagement piece 37*c* of the commutator piece g1 is made to pass through the slot portion r and the slot portion t so as to be wound around the second tooth portion B and the third tooth portion C for plural times so that the second conducting coil 102*a* is provided. The second conducting wire 102 is then made to pass through the slot portion w and the slot portion y so as to be wound around the seventh tooth portion G and the eighth tooth portion H for plural times in a direction reverse to a winding direction regarding the second tooth portion B and the third tooth portion C so that the second conducting coil 102*b* is provided, and thereafter the other end thereof is attached to the engagement piece 37*c* of the commutator piece c1.

The third conducting wire 103 whose one end has been attached to the engagement piece 37*c* of the commutator piece h1 is made to pass through the slot portion s and the slot portion u so as to be wound around the third tooth portion C and the fourth tooth portion D for plural times so that the third conducting coil 103*a* is provided. The third conducting wire 103 is then made to pass through the slot portion x and the slot portion z so as to be wound around the eighth tooth portion H and the ninth tooth portion I for plural times in a direction reverse to a winding direction regarding the third tooth portion C and the fourth tooth portion D so that the third conducting coil 103*b* is provided, and thereafter the other end thereof is attached to the engagement piece 37*c* of the commutator piece d1.

The fourth conducting wire 104 whose one end has been attached to the engagement piece 37*c* of the commutator piece i1 is made to pass through the slot portion t and the slot portion v so as to be wound around the fourth tooth portion D and the fifth tooth portion E for plural times so that the fourth conducting coil 104*a* is provided. The fourth conducting wire 104 is then made to pass through the slot portion y and the slot portion q so as to be wound around the ninth tooth portion I and the tenth tooth portion J for plural times in a direction reverse to a winding direction regarding the fourth tooth portion D and the fifth tooth portion E so that the fourth conducting coil 104*b* is provided, and thereafter the other end thereof is attached to the engagement piece 37*c* of the commutator piece e1.

The fifth conducting wire 105 whose one end has been attached to the engagement piece 37*c* of the commutator piece j1 is made to pass through the slot portion u and the slot portion w so as to be wound around the fifth tooth portion E and the sixth tooth portion F for plural times so that the fifth conducting coil 105*a* is provided. The fifth conducting wire 105 is then made to pass through the slot portion z and the slot portion r so as to be wound around the tenth tooth portion J and the first tooth portion A for plural times in a direction reverse to a winding direction regarding the fifth tooth portion E and the sixth tooth portion F so that a fifth conducting coil 105*b* is provided, and thereafter the other end thereof is attached to the engagement piece 37*c* of the commutator piece f1.

The sixth conducting wire 106 whose one end has been attached to the engagement piece 37*c* of the commutator piece a1 is made to pass through the slot portion v and the slot portion x so as to be wound around the sixth tooth portion F and the seventh tooth portion G for plural times so that the sixth conducting coil 106*a* is provided. The sixth conducting wire 106 is then made to pass through the slot portion q and the slot portion s so as to be wound around the first tooth portion A and the second tooth portion B for plural times in a direction reverse to a winding direction regarding the sixth tooth portion F and the seventh tooth portion G so that the sixth conducting coil 106*b* is provided, and thereafter the other end thereof is attached to the engagement piece 37*c* of the commutator piece g1.

The seventh conducting wire 107 whose one end has been attached to the engagement piece 37*c* of the commutator piece b1 is made to pass through the slot portion w and the slot portion y so as to be wound around the seventh tooth portion G and the eighth tooth portion H for plural times so that the seventh conducting coil 107*a* is provided. The seventh conducting wire 107 is then made to pass through the slot portion r and the slot portion t so as to be wound around the second tooth portion B and the third tooth portion C for plural times in a direction reverse to a winding direction regarding the seventh tooth portion G and the eighth tooth portion H so that the seventh conducting coil 107*b* is provided, and thereafter the other end thereof is attached to the engagement piece 37*c* of the commutator piece h1.

The eighth conducting wire 108 whose one end has been attached to the engagement piece 37*c* of the commutator piece c1 is made to pass through the slot portion x and the slot portion z so as to be wound around the eighth tooth portion H and the ninth tooth portion I for plural times so that the eighth conducting coil 108*a* is provided. The eighth conducting wire 108 is then made to pass through the slot portion s and the slot portion u so as to be wound around the third tooth portion C and the fourth tooth portion D for plural times in a direction reverse to a winding direction regarding the eighth tooth portion H and the ninth tooth portion I so that the eighth conducting coil 108*b* is provided, and thereafter the other end thereof is attached to the engagement piece 37*c* of the commutator piece i1.

The ninth conducting wire 109 whose one end has been attached to the engagement piece 37*c* of the commutator piece d1 is made to pass through the slot portion y and the slot portion q so as to be wound around the ninth tooth portion I and the tenth tooth portion J for plural times so that the ninth conducting coil 109*a* is provided. The ninth conducting wire 109 is then made to pass through the slot portion t and the slot portion v so as to be wound around the fourth tooth portion D and the fifth tooth portion E for plural times in a direction reverse to a winding direction regarding the ninth tooth portion I and the tenth tooth portion J so that the ninth conducting coil 109*b* is provided, and thereafter the other end thereof is attached to the engagement piece 37*c* of the commutator piece j1.

The tenth conducting wire 110 whose one end has been attached to the engagement piece 37*c* of the commutator piece e1 is made to pass through the slot portion z and the slot portion r so as to be wound around the tenth tooth portion J and the first tooth portion A for plural times so that the tenth conducting coil 110*a* is provided. The tenth conducting wire 110 is then made to pass through the slot portion u and the slot portion w so as to be wound around the fifth tooth portion E and the sixth tooth portion F for plural times in a direction reverse to a winding direction regarding the tenth tooth portion J and the first tooth portion A so that the tenth conducting coil 110*b* is provided, and thereafter the other end thereof is attached to the engagement piece 37*c* of the commutator piece a1.

Figure 9:
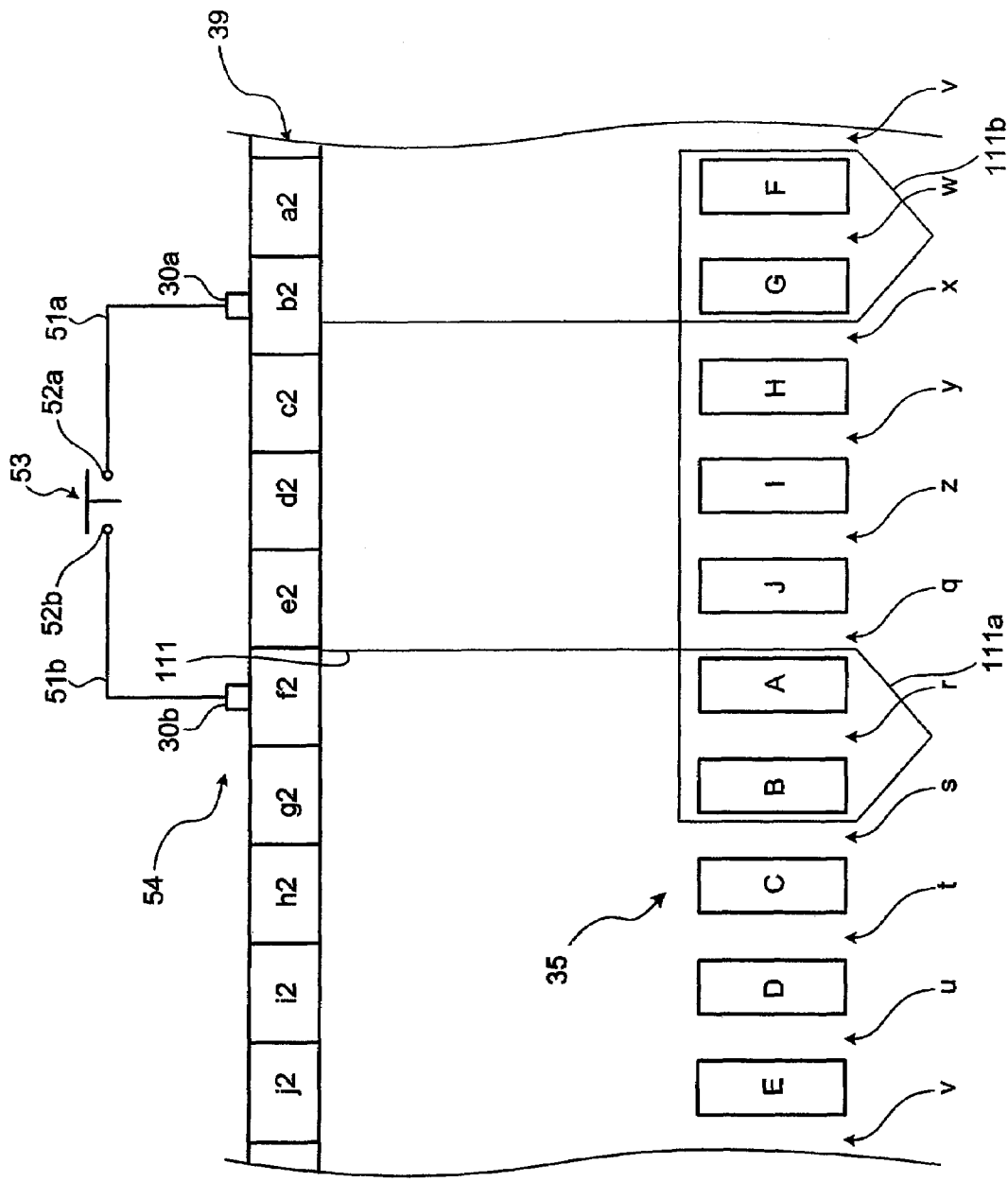
FIG. 9 is a development diagram of a concept of wire connections of wires for providing a brake coil in the sliding door motor shown in FIG. 3.

Further, as shown in FIG. 9, for example, brake coils 111*a*, 111*b* are provided on the coil holder 35 having the conducting coils 101*a*, 101*b*, 102*a*, 102*b*, 103*a*, 103*b*, 104*a*, 104*b*, 105*a*, 105b, 106a, 106b, 107a, 107b, 108a, 108b, 109a, 109b, 110a, 110b by winding an eleventh conducting wire 111 on the tooth portions A, B, F, G.

That is, the eleventh conducting wire 111 whose one end has been attached to an engagement piece 39c of the braking commutator piece f2 is made to pass through the slop portion q and the slot portion s to be wound around the first tooth portion A and the second tooth portion B for plural times so that the first brake coil 111a is provided. The eleventh conducting wire 111 is made to pass through the slot portion v and the slot portion x to be wound around the sixth tooth portion F and the seventh tooth portion G for plural times in a direction revere to a winding direction regarding the first tooth portion A and the second tooth portion B so that the second brake coil 111b is provided, and thereafter the other end thereof is attached to the engagement piece 39c of the braking commutator piece b2. The conducting wire 111 for the brake coils 111a, 111b thus constituted is wound, for example, to overlap on the conducting wire 101 for providing the first conducting coils 101a, 101b.

Figure 10:
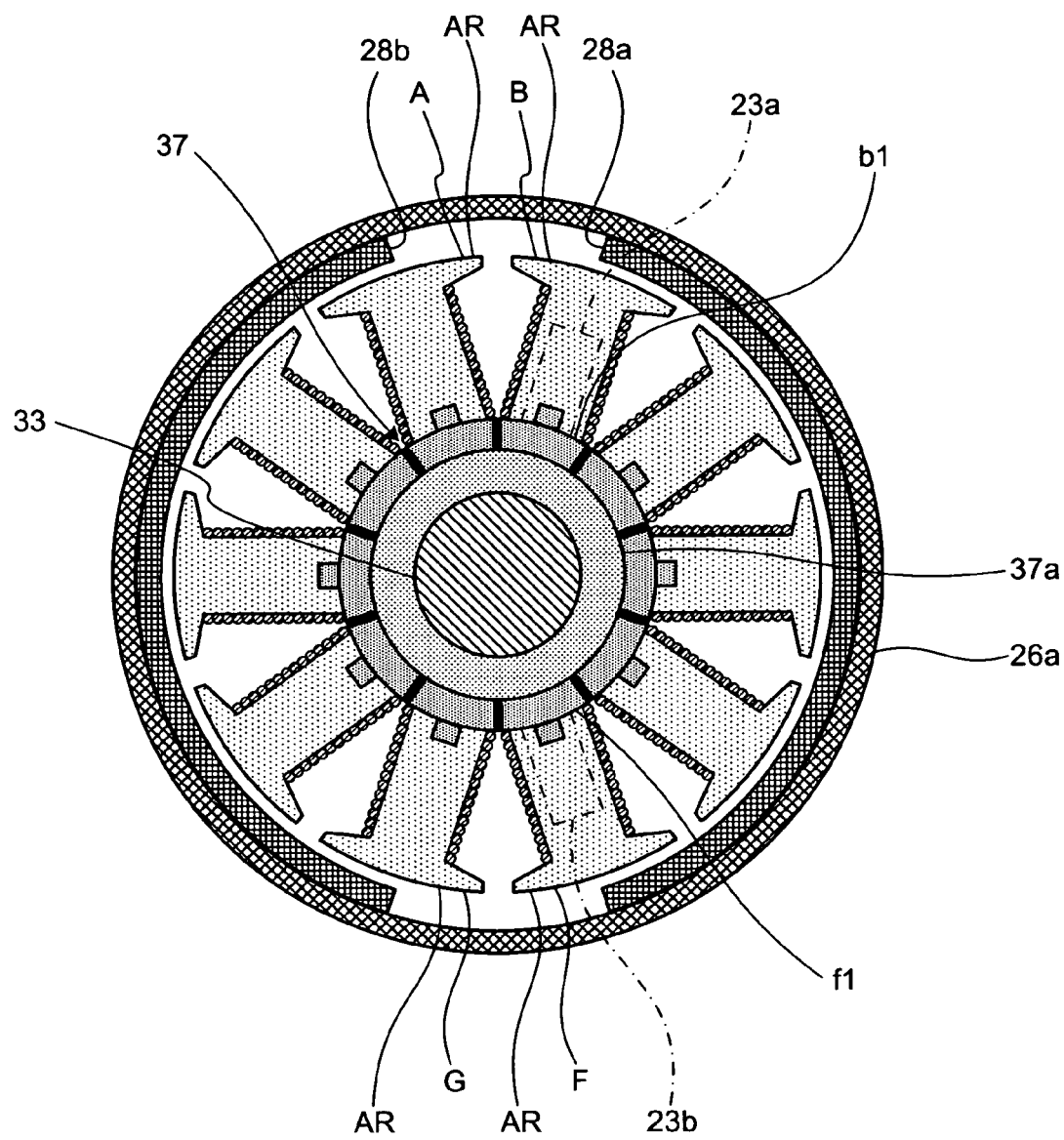
FIG. 10 is an explanatory diagram of an arrangement of a brush included in the sliding door motor shown in FIG. 3.

In the sliding door motor 20 thus constituted, one brush 23a is connected to a voltage controller 47 via a cable 45a, while the other brush 23b is connected to the voltage controller 47 via a cable 45b, as shown in FIG. 8. The brushes 23a, 23b are arranged to contact with two of the commutator pieces a1, b1, c1, d1, e1, f1, g1, h1, i1, j1, thereby electrically connecting the conducting wires 101, 102, 103, 104, 105, 106, 107, 108, 109, 110 and the voltage controller 47. More specifically, as shown in FIGS. 8 and 10, the brushes 23a, 23b are arranged such that, when the coil holder 35 stops at a position where the surface AR of the first tooth portion A and a surface of an end portion of the other field magnet 28b face each other, the surface AR of the second tooth portion B and the surface of an end portion of the one field magnet 28a face each other, the surface AR of the sixth tooth portion F and the surface of the end portion of the one field magnet 28a face each other, and the surface AR of the seventh tooth portion G and the surface of the end portion of the other field magnet 28b face each other, the one brush 23a contacts with the commutator piece b1 and the other brush 23b contacts with the commutator piece f1, so that the first conducting wire 101 and the voltage controller 47 are electrically connected to each other.

As shown in FIG. 8, the voltage controller 47 is connected to a power source (a battery) 49 provided inside the vehicle main body BD via a cable 48. The voltage controller 47 transforms a DC voltage applied from, for example, the power source 49 to a predetermined voltage to supply the same to the sliding door motor 20. In the sliding door motor 20 of the first embodiment, the power source 49, the voltage controller 47, the conducting wire 100, the cables 45a, 45b, the brushes 23a, 23b, and the commutator 37 constitute a driving circuit 50.

In the sliding door motor 20, the one braking brush 30a is connected to one terminal 52a of a switch (a switch unit) 53 via a cable 51a, while the other braking brush 30b is connected to the other terminal 52b of the switch 53 via a cable 51b, as shown in FIG. 9. The braking brushes 30a, 30b are arranged to contact with the braking commutator pieces b2, f2, thereby electrically connecting the eleventh conducting wire 111 and the switch 53. More specifically, for example, as shown in FIGS. 9 and 10, the braking brushes 30a, 30b are arranged such that, when the coil holder 35 stops at a position where the surface AR of the first tooth portion A and the surface of the end portion of the other field magnet 28b face each other, the surface AR of the second tooth portion B and the surface of the end portion of the one field magnet 28a face each other, the surface AR of the sixth tooth portion F and the surface of the end portion of the one field magnet 28a face each other, and the surface AR of the seventh tooth portion G and the surface of the end portion of the other field magnet 28b face each other, the one braking brush 30a contacts with the braking commutator piece b2, and the other braking brush 30b contacts with the braking commutator piece f2, thereby electrically connecting the eleventh conducting wire 111 and the switch 53. In the sliding door motor 20 of the first embodiment, the switch 53, the eleventh conducting wire 111, the braking brushes 30a, 30b, and the braking commutator 39 constitute a brake circuit (a movement suppressing circuit) 54.

The switch 53 is constituted, for example, outside the motor case 21, and is constituted to be switchable between a closed state where the brake circuit 54 is closed and an opened state where the brake circuit 54 is partially opened. The switch 53 includes, for example, a biasing spring (not shown) and an opening/closing mechanism described later. The switch 53 is normally put in the opened state according to a biasing force of the biasing spring, while it is switched to the closed state according to pressing from the opening/closing mechanism against the biasing force of the biasing spring based on a command from a control device described later. When a pressing force from the opening/closing mechanism is released, the switch 53 is switched from the closed state to the opened state according to the biasing force of the biasing spring.

In the sliding door motor 20 with such a constitution, as shown in FIG. 3, while the shaft 33 and the coil holder 35 constitute the rotor RO, the motor case 21 and the motor cap 26 constitute the stator ST, where the rotor RO is disposed to be rotatable relative to the stator ST. In the driving circuit 50, the conducting wire 100 provided on the rotating rotor RO and the voltage controller 47 are electrically connected to each other by providing the commutator 37 and the brushes 23a, 23b between the rotor RO and the stator ST, while the eleventh conducting wire 111 provided on the rotor RO that is rotating and the switch 53 are electrically connected to each other by providing the braking commutator 39 and the braking brushes 30a, 30b between the rotor RO and the stator ST in the brake circuit 54.

Figure 11:
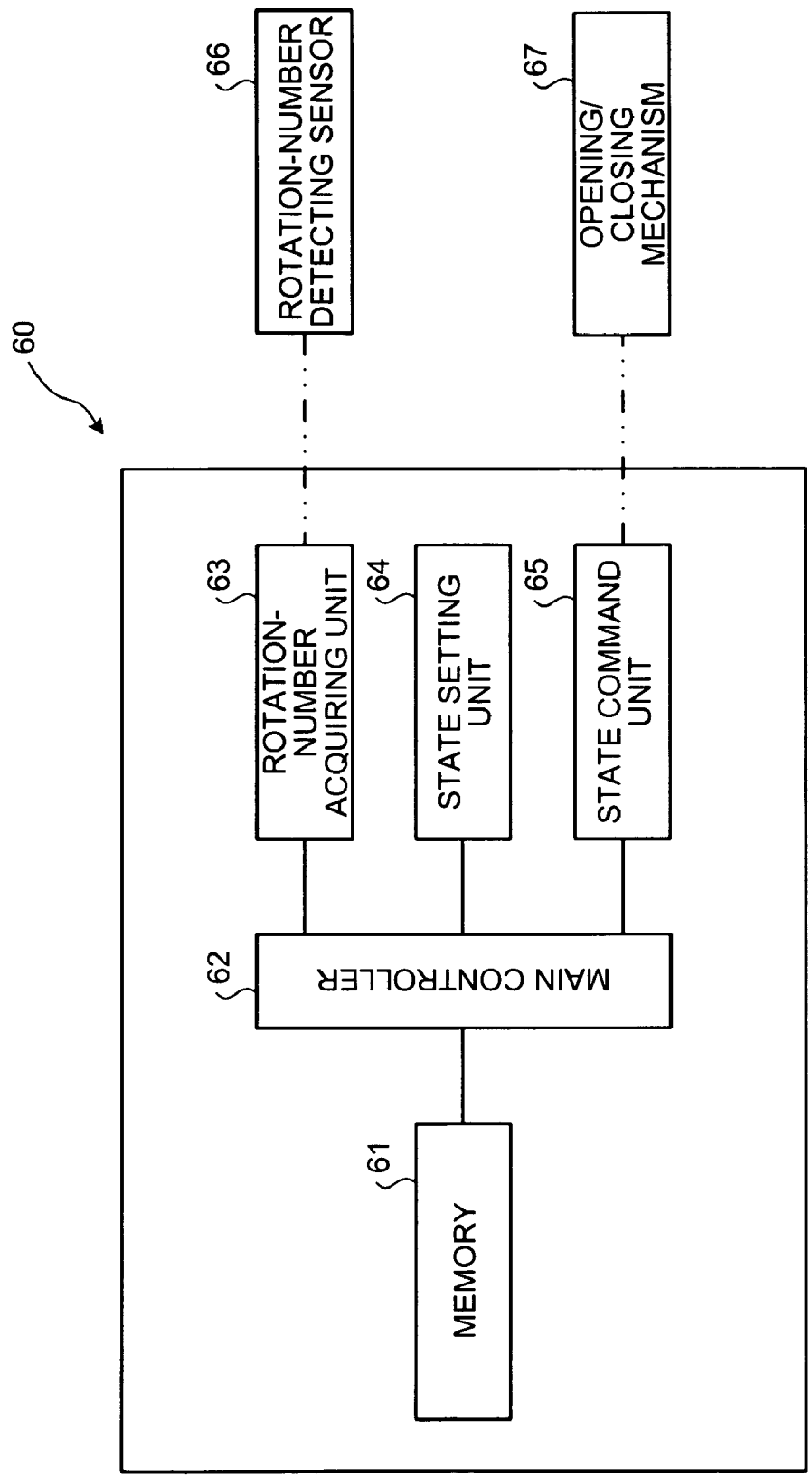
FIG. 11 is a block diagram of a control device included in the sliding door motor shown in FIG. 3.

The switch 53 is controlled by the following control device provided inside the vehicle main body BD. As shown in FIG. 11, the control device 60 includes a memory 61, a main controller 62, a rotation-number acquiring unit 63, a state setting unit 64, and a state command unit 65.

The main controller 62 controls the rotation-number acquiring unit 63, the state setting unit 64, and the state command unit 65 based on a program or data stored in the memory 61 such as a ROM or a RAM in advance.

The rotation-number acquiring unit 63 is connected to a rotation-number detecting sensor (a rotation number detector) 66 provided inside the motor case 21, and converts a rotation number per unit time (hereinafter, "rotation number") of the shaft 33 detected by the rotation-number detecting sensor 66 to a signal to send the same to the main controller 62. The rotation-number detecting sensor 66 detects the rotation number of the shaft 33 for each predetermined time period.

The state setting unit 64 compares the rotation number of the shaft 33 acquired through the rotation-number acquiring unit 63 and a set rotation number (a threshold) of the shaft 33 stored in the memory 61 in advance with each other to set a state of the switch 53. More specifically, the state setting unit 64 compares the rotation number of the shaft 33 acquired through the rotation-number acquiring unit 63 and the threshold with each other to set the closed state of the switch 53 when the rotation number of the shaft 33 is larger than the threshold while set the opened state of the switch 53 when the rotation number of the shaft 33 is smaller than the threshold. The threshold is set to such a rotation number that is not exceeded when the sliding door SD is moved to rotate the shaft 33 according to an operation of the door switch during stop of the vehicle main body BD on a horizontal and flat ground and which is exceeded according to a follow-up rotation of the shaft 33 due to an action of the gravity when the sliding door SD is moved to rotate the shaft 33 according to an operation of the door switch during stop of the vehicle main body BD on a ground inclined to a moving direction of the sliding door SD by a predetermined angle.

The state command unit 65 is connected to an opening/closing mechanism 67 provided in the switch 53, and it transmits a command to the opening/closing mechanism 67 based on a state set by the state setting unit 64, thereby changing the state of the switch 53.

The main controller 62 of the control device 60 of the first embodiment is connected to the voltage controller 47 via a cable (not shown), and it is also for performing control on the voltage controller 47. More specifically, the main controller 62 transmits a command instructing application of a voltage to between both ends of the conducting wire 100 via the cables 45a, 45b and the brushed 23a, 23b to the voltage controller 47 and instructing stop of the application of a voltage to the voltage controller 47.

Figure 12:
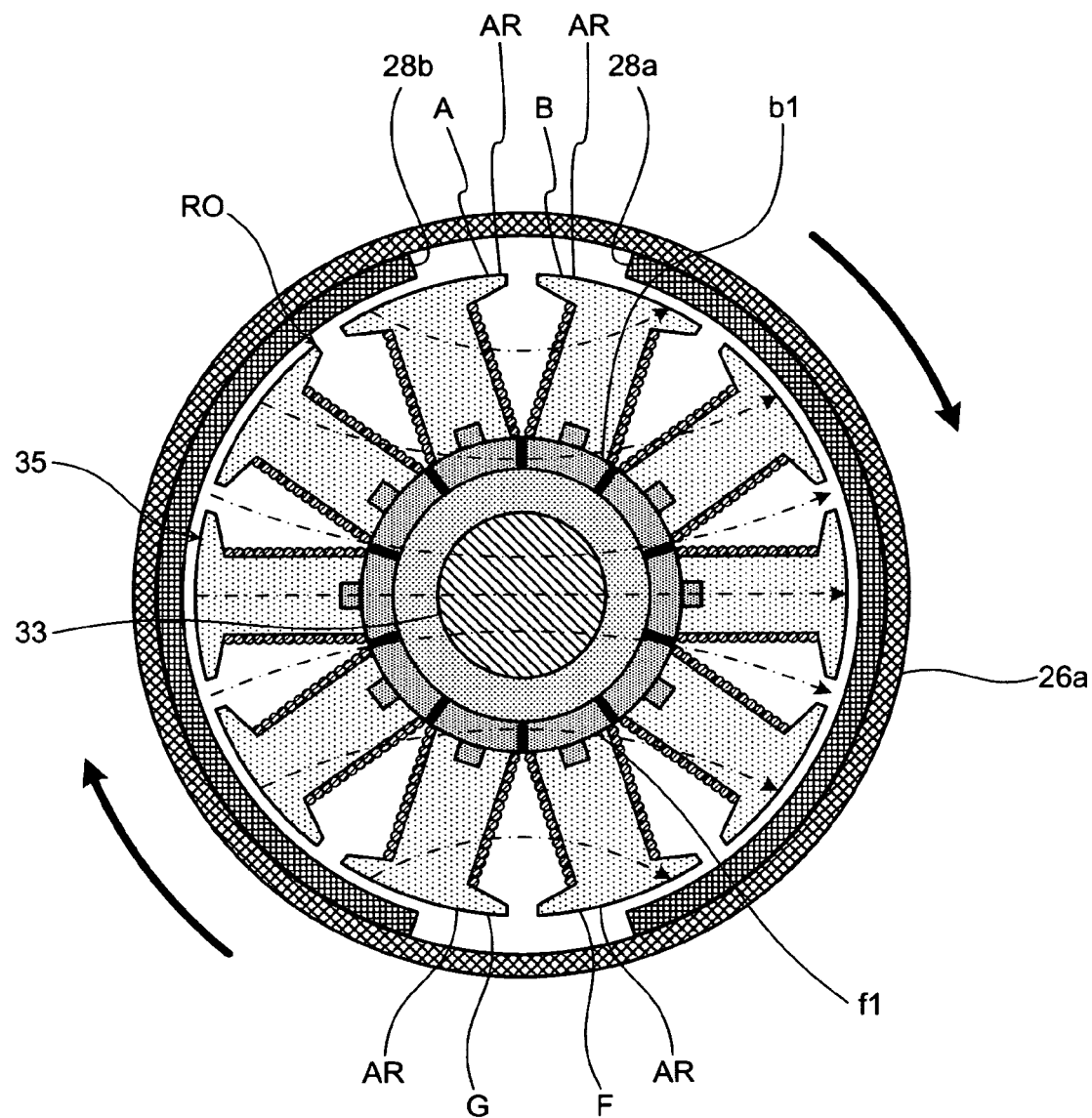
FIG. 12 is an explanatory diagram of a magnetic field formed by a field magnet included in the sliding door motor shown in FIG. 3.

In a passenger vehicle to which the sliding door motor 20 with the constitution described above is applied, the sliding door SD is closed, for example, in the following manner. In the explanation below, it is assumed that the passenger vehicle stops on a horizontal and flat ground (a ground that is not inclined in a door opening direction and a door closing direction of the sliding door SD). As an initial state in the explanation, it is assumed that the sliding door SD is put in a fully opened position, and the coil holder 35 is stopped (the rotor RO is stopped) at a position where the surface AR of the first tooth portion A and the surface of the end portion of the other field magnet 28b face each other, the surface AR of the second tooth portion B and the surface of the end portion of the one field magnet 28a face each other, the surface AR of the sixth tooth portion F and the surface of the end portion of the one field magnet 28a face each other, and the surface AR of the seventh tooth portion G and the surface of the end portion of the other field magnet 28b face each other, as shown in FIG. 12.

In this state, magnetic field where magnetic force lines (shown by a dashed line in FIG. 12) become approximately parallel is formed inside the motor cap 26 by the one field magnet 28a and the other field magnet 28b. Further, since the shaft 33 is stopped in this state, the rotation-number detecting sensor 66 detects that the rotation number of the shaft 33 is zero. Thereby, the rotation-number acquiring unit 63 transmits that the rotation number of the shaft 33 is zero to the main controller 62. When the main controller 62 receives that effect, the state setting unit 64 determines that the rotation number of the shaft 33 is smaller than the threshold to perform setting for maintaining the opened state of the switch 53. Thereby, the state command unit 65 transmits a command instructing that the opened state of the switch 53 should be maintained to the opening/closing mechanism 67. Upon receipt of the command instructing that effect, the opening/closing mechanism 67 maintains the opened state of the switch 53.

For example, when a driver operates the door switch to conduct a door-closing operation from this state, a command instructing that a voltage is applied to the both ends of the conducting wire 100 via the cables 45a, 45b, and the brushes 23a, 23b is transmitted to the voltage controller 47 from the control device 60.

As shown in FIG. 8, when the voltage controller 47 receives the command, since the brush 23a contacts with the commutator piece b1 and the brush 23b contacts with the commutator piece f1, a voltage is applied to the both ends of the first conducting wire 101, which causes a current flow, so that the surface AR of the first tooth portion A and the surface AR of the second tooth portion B become the north pole due to magnetic field generated by change of the first conducting coil 101a to a conducting state and the surface AR of the sixth tooth portion F and the surface AR of the seventh tooth portion G become the south pole due to magnetic field generated by change of the first conducting coil 101b to a conducting state.

Thereby, since the surface of the other field magnet 28b is the north pole and the surface AR of the first tooth portion A becomes the north pole, repellence occurs therebetween, since the surface of the one field magnet 28a is the south pole and the surface AR of the second tooth portion B becomes the north pole, attraction occurs therebetween, since the surface of the one field magnet 28a is the south pole and the surface AR of the sixth tooth portion F becomes the south pole, repellence occurs therebetween, since the surface of the other field magnet 28b is the north pole and the surface AR of the seventh tooth portion G becomes the south pole, attraction occurs therebetween, and the field magnets 28a and 28b attract and repel the tooth portions A, B, F, G, so that the rotor RO rotates in a clockwise direction in FIG. 12 as shown by arrows.

On the other hand, in a state where the brush 23a contacts with the commutator piece b1 and the brush 23b contacts with the commutator piece f1, the braking brush 30a contacts with the braking commutator piece b2 and the braking brush 30b contacts with the braking commutator piece f2. However, since the switch 53 is in the opened state, a current caused by an induced electromotive force does not flow in the brake coils 111a, 111b by magnetic field generated in the first conducting coils 101a, 101b. Accordingly, rotation of the rotor RO is not suppressed.

Figure 13:
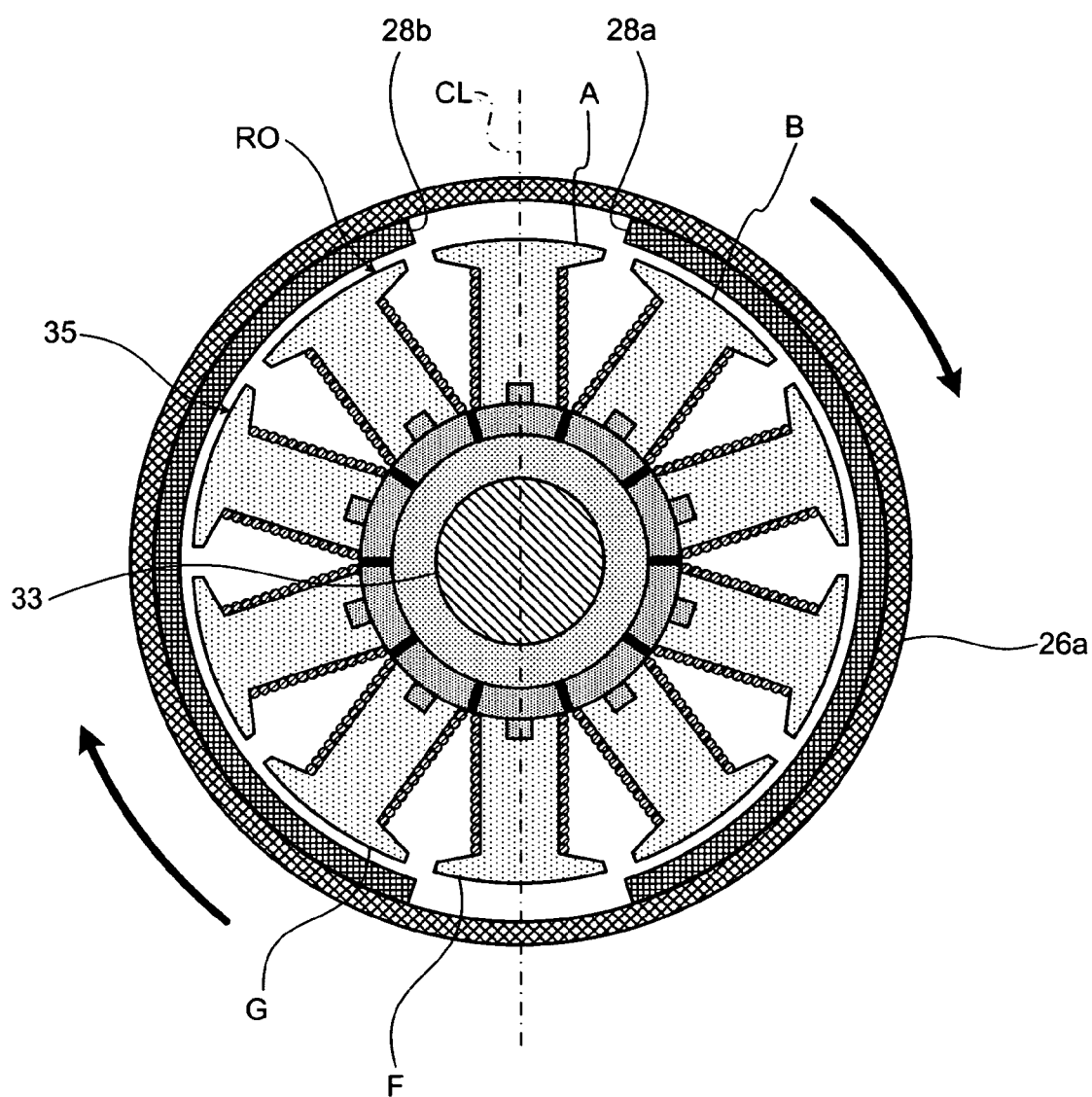
FIGS. 13 to 16 are explanatory diagrams of rotation of a rotor included in the sliding door motor shown in FIG. 3.

As shown in FIG. 13, when the rotor RO is rotated until the center line CL1 of the first tooth portion A becomes vertical and the center line CL1 of the sixth tooth portion F becomes vertical, contact between the one brush 23a and the commutator piece b1 is broken and contact between the other brush 23a and the commutator piece f1 is broken, so that application of a voltage to the both ends of the conducting wire 101 is interrupted and a force for rotating the rotor RO due to magnetic force is lost. However, the rotation of the rotor RO continues due to inertia, as shown by arrows in FIG. 13.

Figure 14:
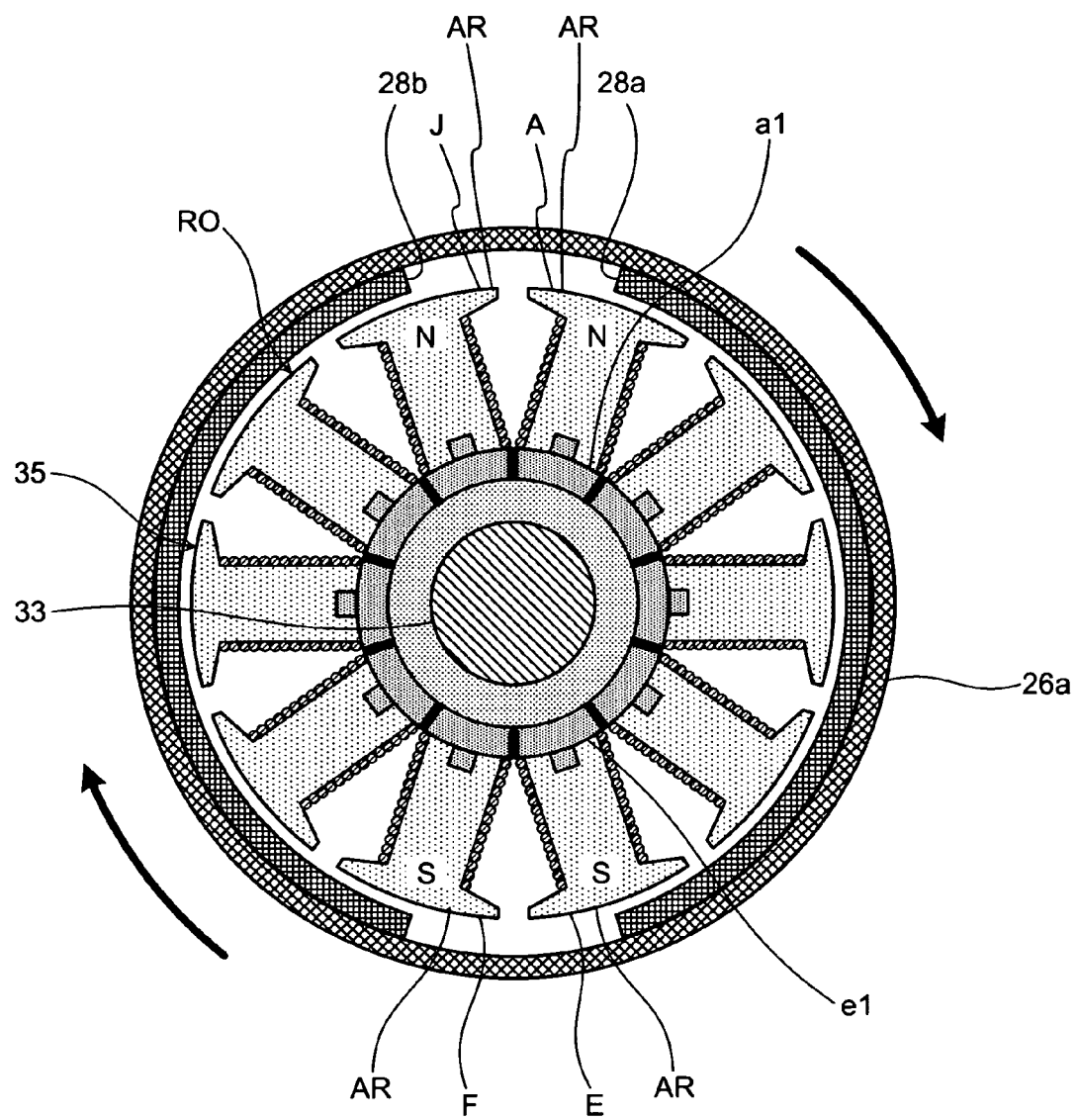
Figure 15:
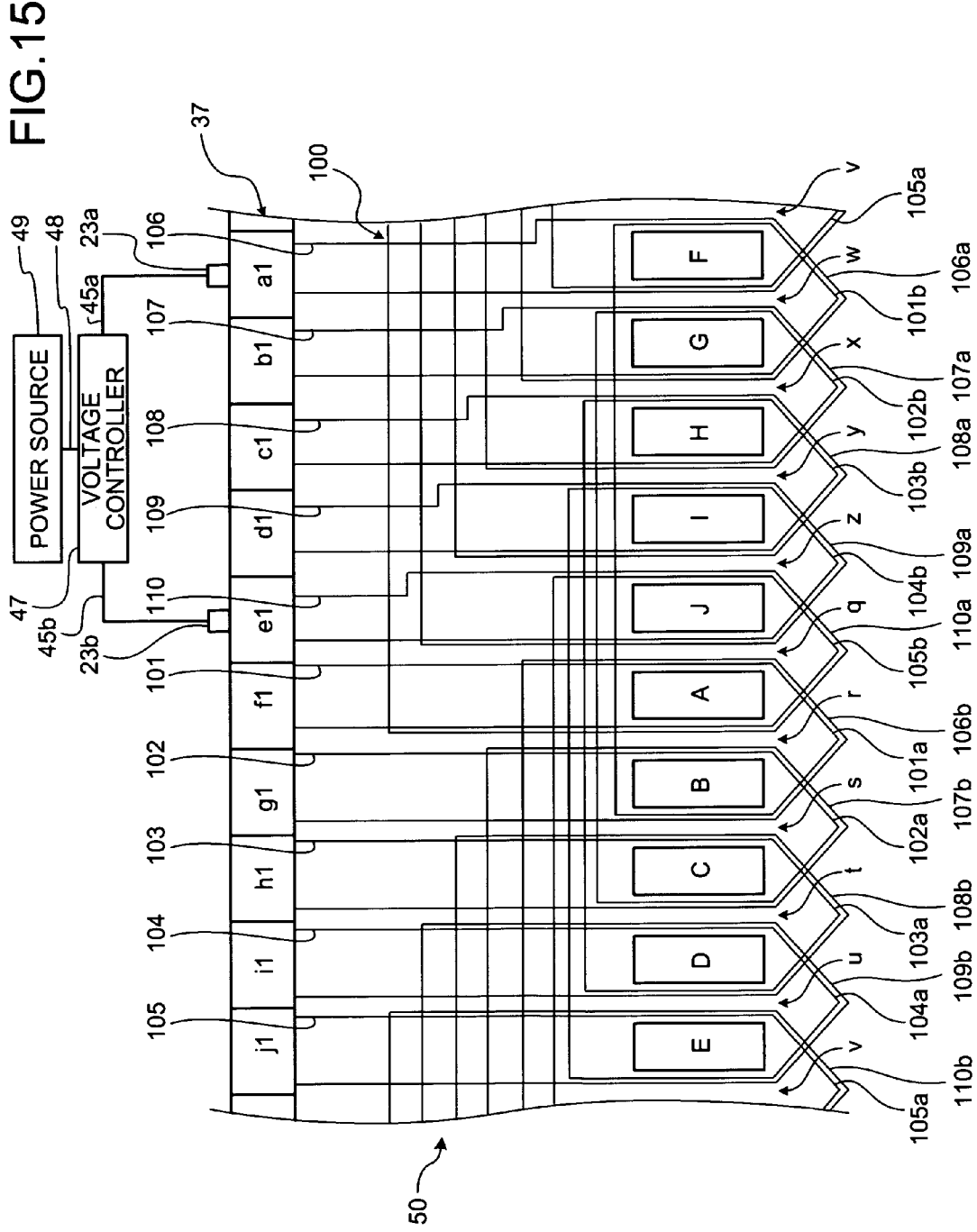

As shown in FIGS. 14 and 15, the rotor RO rotates until the commutator piece a1 contacts with the one brush 23a and the commutator piece e1 contacts with the other brush 23b. When the rotor RO rotates up to this state, since the brush 23a contacts with the commutator piece a1 and the brush 23b contacts with the commutator piece e1, the voltage controller 47 applies a voltage to between the both ends of the tenth conducting wire 110 via the cables 45a, 45b and the brushes 23a, 23b to cause a current to flow in the tenth conducting wire 110, so that the surface AR of the tenth tooth portion J and the surface AR of the first tooth portion A become the north pole due to magnetic field generated by change of the second conducting coil 102a to a conducting state and the surface AR of the fifth tooth portion E and the surface AR of the sixth tooth portion F become the south pole due to magnetic field generated by change of the second conducting coil 102b to a conducting state.

Thereby, since the surface of the other field magnet 28b is the north pole and the surface AR of the tenth tooth portion J becomes the north pole, repellence occurs therebetween, since the surface of the one field magnet 28a is the south pole and the surface AR of the first tooth portion A becomes the north pole, attraction occurs therebetween, since the surface of the one field magnet 28a is the south pole and the surface AR of the fifth tooth portion E becomes the south pole, repellence occurs therebetween, since the surface of the other field magnet 28b is the north pole and the surface AR of the sixth tooth portion F becomes the south pole, attraction occurs therebetween, and the field magnets 28a and 28b attract and repel the tooth portions J, A, E, F, so that the rotor RO rotates in a clockwise direction in FIG. 14 as shown by arrows.

Figure 16:
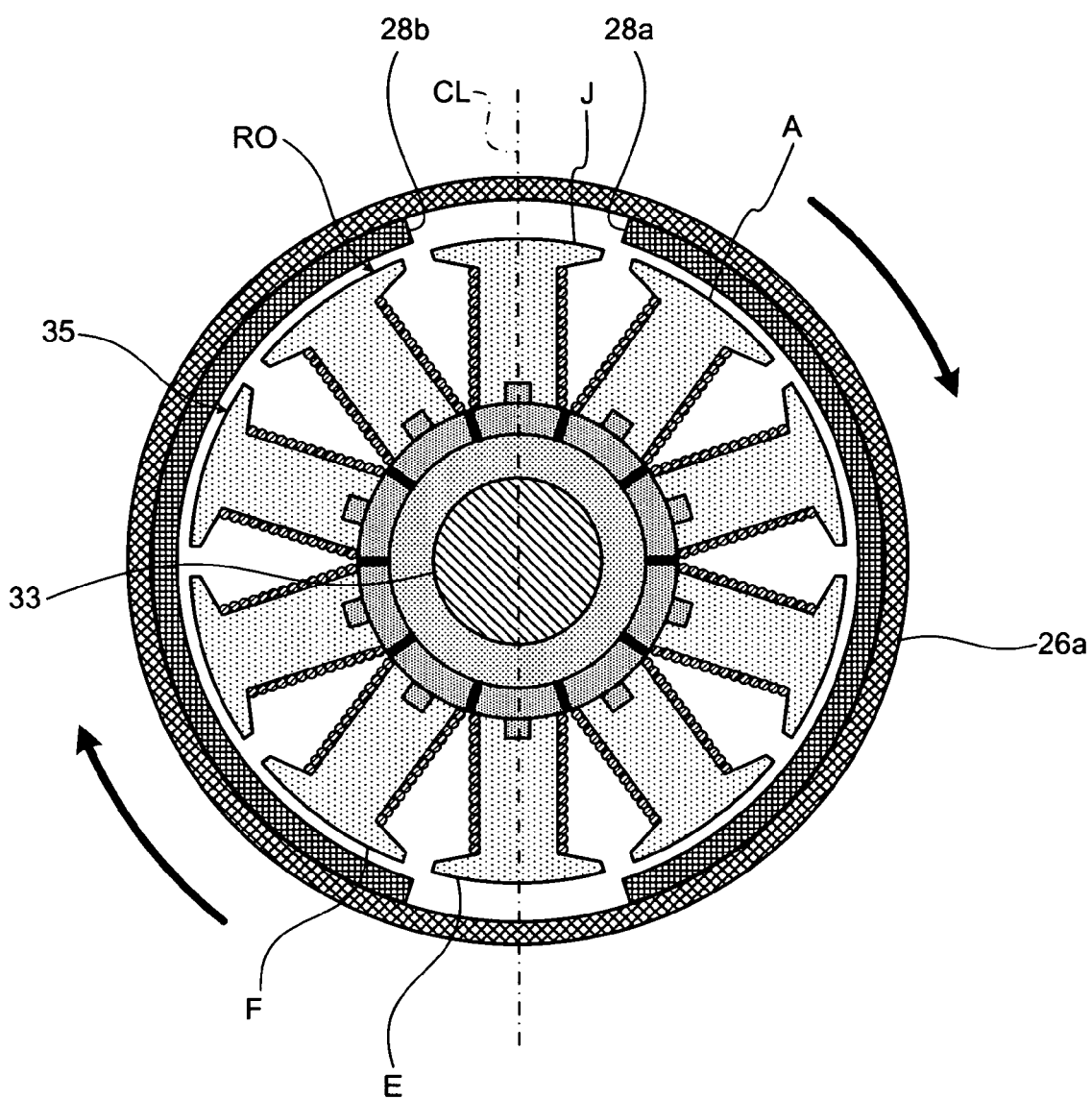

As shown in FIG. 16, when the rotor RO rotates until the center line CL1 of the tenth tooth portion J becomes vertical and the center line CL1 of the fifth tooth portion E becomes vertical, contact between the one brush 23a and the commutator piece a1 is broken, contact between the other brush 23b and the commutator piece e1 is broken, so that application of a voltage to between the both ends of the conducting wire 102 is interrupted and a force for rotating the rotor RO due to magnetic force is lost. However, the rotation of the rotor RO continues due to inertia, as shown by arrows in FIG. 16.

Similarly, the commutator pieces a1, b1, c1, d1, e1, f1, g1, h1, i1, j1 contact with the brushes 23a, 23b, and the voltage controller 47 applies a voltage to the both ends of the conducting wire 100 via the commutator pieces a1, b1, c1, d1, e1, f1, g1, h1, i1, j1 such that the surfaces AR of the tooth portions A, B, C, D, E, F, G, H, I, J positioned on an upper side in FIG. 16 due to magnetic field generated according to conducting to the conducting coil a become the north pole and the surfaces AR of the tooth portions A, B, C, D, E, F, G, H, I, J positioned on a lower side in FIG. 16 due to magnetic field generated according to conducting to the conducting coil b become the south pole, so that the rotor RO is rotated while the rotation of the rotor RO in a clockwise direction due to a mutual action between magnetic force generated on the surfaces of the tooth portions A, B, C, D, E, F, G, H, I, J and magnetic force generated by the field magnets 28a, 28b, and the rotation of the rotor RO due to inertia in a state where a rotating force generated by magnetic force has been lost due to interruption of application of a voltage to the both ends of the conducting wire 100 caused by breaking of contact between the brushes 23a, 23b and the commutator pieces a1, b1, c1, d1, e1, f1, g1, h1, i1, j1 are repeated mutually.

When the rotor RO rotates and the worm 33b together with the shaft 33 rotates in the above manner, the worm wheel 41 meshing with the worm 33b rotates. When the worm wheel 41 rotates, the drum 43 provided integrally with the worm wheel 41 also rotates. When the drum 43 rotates, the door-closing wire WI is wound while the door-opening wire WI is unwound, so that the sliding door SD is moved in the door-closing direction via these wires WI.

The rotation-number detecting sensor 66 detects the rotation number of the shaft 33 for each predetermined time period even during the rotation of the rotor RO. When it is detected by the rotation-number detecting sensor 66 that the rotation number of the shaft 33 is smaller that the threshold, the rotation-number acquiring unit 63 transmits the fact that the rotation number of the shaft 33 is smaller than the threshold to the main controller 62. When the main controller 62 receives that effect, the state setting unit 64 determines that the rotation number of the shaft 33 is smaller than the threshold to set that the switch 53 is maintained in the opened state. Thereby, the state command unit 65 transmits a command instructing that the switch 53 is maintained in the opened state to the opening/closing mechanism 67. When receiving the command, the opening/closing mechanism 67 continues to maintain the switch 53 in the opened state.

On the other hand, when it is detected by the rotation-number detecting sensor 66 that the rotation number of the shaft 33 is larger that the threshold, the rotation-number acquiring unit 63 transmits that the rotation number of the shaft 33 is larger than the threshold to the main controller 62. When the main controller 62 receives that effect, the state setting unit 64 determines that the rotation number of the shaft 33 is larger than the threshold to set that the switch 53 should be changed to a closed state. Thereby, the state command unit 65 transmits a command instructing that the switch 53 is changed to a closed state to the opening/closing mechanism 67. When receiving the command, the opening/closing mechanism 67 changes the switch 53 to a closed state.

As described above, the passenger vehicle stops on a horizontal and flat ground, where the sliding door SD is not biased in the door-closing direction due to an action of the gravity. In this case, therefore, the rotation number of the shaft 33 does not exceed the threshold due to an action of the gravity, so that the switch 53 continues to maintain the opened state. Accordingly, the rotation of the rotor RO is not suppressed by the brake coils 111a, 111b.

The sliding door SD is made to a fully closed position according to a sliding movement caused by driving of the sliding door motor 20. When the sliding door SD has been made to the fully closed position, the voltage controller 47 stops application of a voltage to the both ends of the conducting wire 100 via the cables 45a, 45b and the brushes 23a, 23b based on a command from the control device 60. Thereby, the rotation of the rotor RO stops.

A case that, for example, a driver operates the door switch for door opening in a state where the vehicle main body BD is stopped on a ground inclined downwardly in the door-opening direction of the sliding door SD after the driver moves the vehicle, will be explained next.

When the door switch is operated for door opening, a command instructing that a voltage is applied to the both ends of the conducting wire 100 via the cables 45a, 45b and the brushes 23a, 23b is transmitted from the control device 60 to the voltage controller 47.

The voltage controller 47 applies a voltage to the both ends of the conducting wire 100 via the brushes 23a, 23b such that the surfaces AR of the tooth portions A, B, C, D, E, F, G, H, I, J positioned on an upper side in FIG. 10 become the south pole and the surfaces AR of the tooth portions A, B, C, D, E, F, G, H, I, J positioned on a lower side in FIG. 10 become the north pole, so that the rotor RO is rotated in a counterclockwise direction according to mutual actions between magnetic force generated on the surfaces of the tooth portions A, B, C, D, E, F, G, H, I, J and magnetic force of the field magnets 28a, 28b provided on the inner peripheral face of the motor cap 26.

When contact between the brushes 23a, 23b and the commutator pieces a1, b1, c1, d1, e1, f1, g1, h1, i1, j1 is broken and application of a voltage to the both ends of the conducting wire 100 is stopped according to the rotation of the rotor RO, a force for rotating the rotor RO caused by magnetic force is put in a lost state. However, the rotor RO rotates due to inertia.

Similarly, the commutator pieces a1, b1, c1, d1, e1, f1, g1, h1, i1, j1 contact with the brushes 23a, 23b, and the voltage controller 47 applies a voltage to the both ends of the conducting wire 100 such that the surfaces AR of the tooth portions A, B, C, D, E, F, G, H, I, J positioned on an upper side due to magnetic field generated according to conducting to the conducting coil a become the south pole and the surfaces AR of the tooth portions A, B, C, D, E, F, G, H, I, J positioned on a lower side due to magnetic field generated according to conducting to the conducting coil b become the north pole, so that the rotor RO is rotated in a counterclockwise direction in FIG. 10 while the rotation of the rotor RO in a counterclockwise direction due to a mutual action between the magnetic force generated on the surfaces of the tooth portions A, B, C, D, E, F, G, H, I, J and the magnetic force generated by the field magnets 28a, 28b provided on the inner peripheral face of the motor cap 26, and the rotation of the rotor RO due to inertia in a state where a rotating force generated by magnetic force has been lost due to interruption of application of a voltage to the both ends of the conducting wire 100 caused by breaking of contact between the brushes 23a, 23b and the commutator pieces a1, b1, c1, d1, e1, f1, g1, h1, i1, j1 are repeated mutually.

When the rotor RO rotates and the worm 33b together with the shaft 33 rotates in the above manner, the worm wheel 41 meshing with the worm 33b rotates. When the worm wheel 41 rotates, the drum 43 provided integrally with the worm wheel 41 also rotates. When the drum 43 rotates, the door-opening wire WI is wound while the door-closing wire WI is unwound, so that the sliding door SD is moved in the door-opening direction via these wires WI.

As described above, the rotation-number detecting sensor 66 detects the rotation number of the shaft 33 for each predetermined time period during the rotation of the rotor RO, and the control device 60 transmits a command to the opening/closing mechanism 67 based on the result of the detection.

As described above, the passenger vehicle is stopped, or the vehicle main body BD is positioned, on a ground inclined downwardly in the door-opening direction of the slide door SD and the sliding door SD is biased in the door-opening direction due to an action of the gravity, so that there can be a case that the rotation number of the shaft 33 exceeds the threshold according to a follow-up rotation of the rotor RO.

Figure 17:
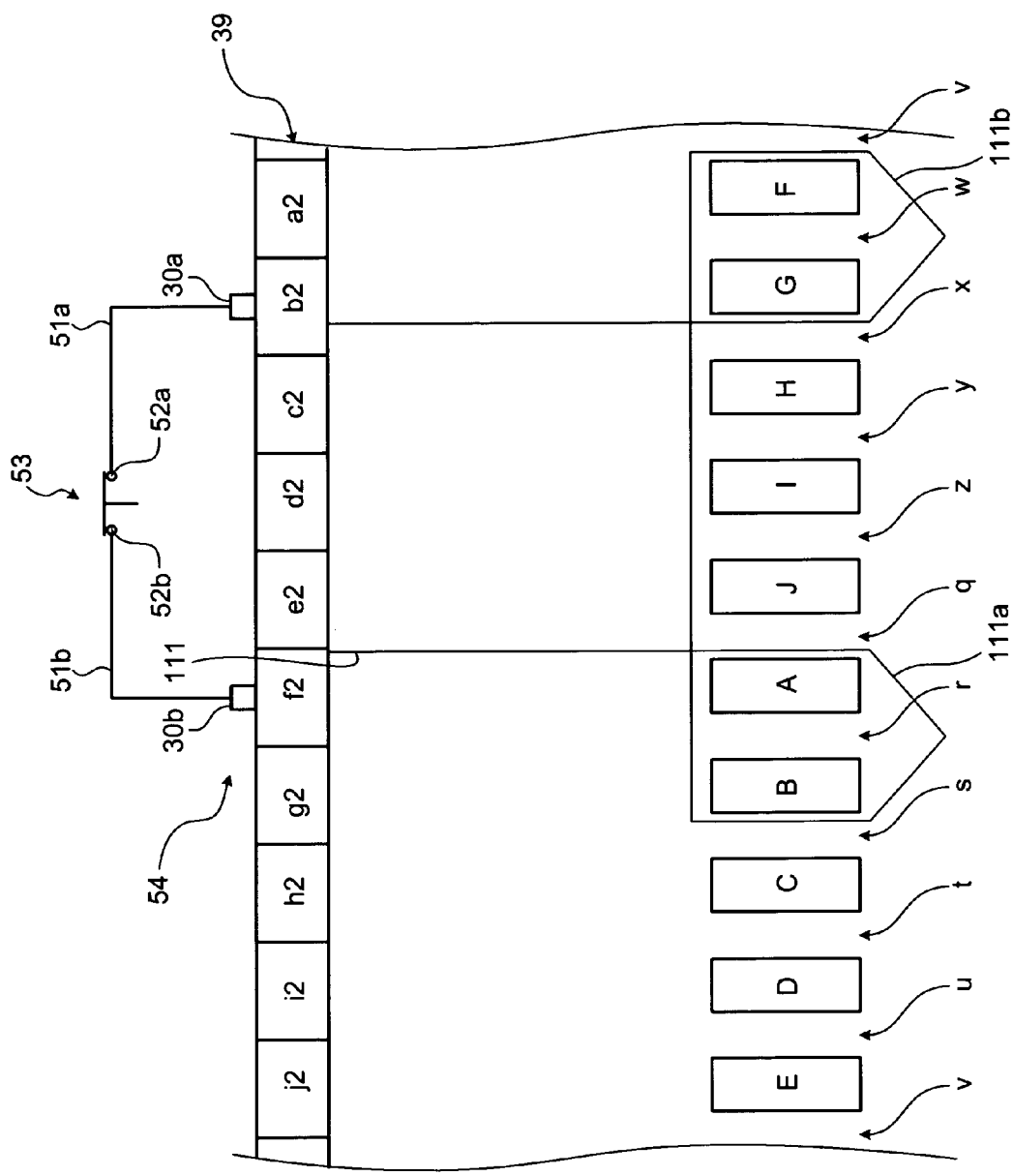
FIG. 17 is an explanatory diagram of a case that rotation of the rotor is suppressed by the brake coil.

When it is detected by the rotation-number detecting sensor 66 that the rotation number of the shaft 33 exceeds the threshold, the control device 60 transmits a command instructing that the switch 53 is switched to the closed state to the opening/closing mechanism 67 based on the detection result. Upon receipt of the command, the opening/closing mechanism 67 switches the switch 53 to the closed state, as shown in FIG. 17.

When the switch 53 is switched to the closed state, the brake circuit 54 switches to a closed circuit. When the rotor RO is rotated in this state and a voltage is applied to the both ends of the conducting wire 101 via the brushes 23a, 23b by the voltage controller 47, a current flows in the first conducting coils 101a, 101b so that the first tooth portion A, the second tooth portion B, the sixth tooth portion F, and the seventh tooth portion G are magnetized, and induced electromotive force is generated in the brake coils 111a, 111b according to electromagnetic induction so that a current flows in the brake circuit 54. Thereby, magnetic field for reducing magnetic field intensity of magnetic field generated in the first conducting coils 101a, 101b is generated in the brake coils 111a, 111b, so that the rotation of the rotor RO is suppressed. The suppression of the rotation of the rotor RO continues during a period where the rotation number of the shaft 33 exceeds the threshold.

Accordingly, since a problem that the rotation number of the rotor RO exceeding the threshold is prevented, a problem of the sliding door SD opening forcefully is prevented. Thereafter, when the rotation number of the rotor RO becomes lower than the threshold, that fact is detected by the rotation-number detecting sensor 66, and the control device 60 transmits a command instructing that the switch 53 is switched to the opened state to the opening/closing mechanism 67 based on the detection result. Upon receipt of the command, the opening/closing mechanism 67 switches the switch 53 to the opened state.

Next, when the sliding door SD is shifted to a fully opened position, the voltage controller 47 stops applying a voltage to the both ends of the conducting wire 100 via the cables 45a, 45b and the brushes 23a, 23b based on a command from the control device 60. Thereby, the rotation of the rotor RO stops.

In the above example, there has been explained the prevention of the problem of the sliding door SD opening forcefully when the sliding door SD is opened. A problem of the sliding door SD closing forcefully when the sliding door SD is closed is also prevented in the sliding door motor 20 owing to a similar function.

According to the sliding door motor 20 of the first embodiment, since the switch 53 interposed between the both ends of the brake coils 111a, 111b is provided to be switchable between the closed state and the opened state, when the switch 53 is switched to the closed state, the rotation of the rotor RO can be suppressed so that a problem of the sliding door SD closing forcefully can be prevented, and a problem of the sliding door SD opening forcefully can be prevented. Thereby, the operability of the sliding door SD can be improved. Furthermore, when the switch 53 is switched to the opened state, the rotation of the rotor RO is not suppressed, so that efficiency thereof is not reduced.

Moreover, the switch 53 is provided in the brake circuit 54 and the switch 53 can be switched to the closed state, if necessary, so that it is possible to set the gear ratio between the worm 33b and the worm wheel 41 such that the rotor RO rotates easily. By providing the worm 33b and the worm wheel 41 at such a gear ratio that the rotor RO rotates easily and providing the worm wheel 41 and the drum 43 integrally, the sliding door SD can be opened and closed manually according to the door operation of the door handle DH. Further, by providing the worm wheel 41 and the drum 43 integrally, the number of parts can be reduced so that the sliding door motor 20 can be provided at a low price. Of course, when the rotation number of the rotor RO exceeds the threshold by manually biasing the sliding door SD during a sliding movement of the sliding door SD performed by the voltage controller 47, the switch 53 is switched to the closed state so that the rotation of the rotor RO can be suppressed.

Furthermore, since the braking commutator 39 and the braking brushes 30a, 30b are provided between the brake coils 111a, 111b and the switch 53, the switch 53 can be provided externally. Thereby, a small-sized sliding door motor 20 can be provided.

In the first embodiment, explanation has been made using the sliding door motor 20 for opening and closing the sliding door SD provided on a side of the vehicle main body BD. However, the present invention is not limited to the first embodiment, in other words, it can be applied to a sliding door motor for opening and closing a back door provided in the rear portion of the vehicle main body BD, similar functions and effects can be achieved. Moreover, the sliding door motor 20 can be applied to open and close a sunroof (a movable body) provided at a ceiling portion of the vehicle main body BD, or to move a passenger seat (a movable body). Of course, while the example where the present invention has been applied to the four-wheel passenger vehicle has been explained in the above, the present invention is not limited to the example, and similar functions and effects can be achieved even in application of the invention to, for example, a motor truck (a truck) or a vehicle of a train, and similar functions and effects can be achieved even in application of the invention to a motor for a movable body that moves a gate door (a movable body) for a house or the like.

In the first embodiment, the case that, when the rotation number of the shaft 33 exceeds the threshold, the control device 60 that suppresses the rotation of the rotor RO according to switching of the switch 53 to the closed state is provided has been explained. However, the present invention is not limited thereto, and a control device that performs switching between the opened state and the closed state of the switch 53 alternately so as to intermittently perform suppression of the rotation of the rotor RO during a period where the rotation number of the shaft 33 exceeds the threshold can be provided.

In the first embodiment, the case that two field magnets 28a, 28b are provided on the cylinder portion 26a of the motor cap 26 has been explained. However, the present invention is not limited thereto, and more than two field magnets can be provided on the cylinder portion 26a.

In the first embodiment, the case that the brake coils 111a, 111b are provided by winding one conducting wire 111 (the eleventh conducting wire 111) on the first tooth portion A, the second tooth portion B, the sixth tooth portion F, and the seventh tooth portion G has been explained. However, the present invention is not limited thereto, and a plurality of brake coils can be provided by using ten conducting wires to wind them on the tooth portions A, B, C, D, E, F, G, H, I, J such as the case of providing the conducting coils 101a, 101b, 102a, 102b, 103a, 103b, 104a, 104b, 105a, 105b, 106a, 106b, 107a, 107b, 108a, 108b, 109a, 109b, 110a, 110b and attaching both ends of these conducting wires to engagement pieces 39c of the braking commutator 39. Further, by providing brake coils on all the tooth portions A, B, C, D, E, F, G, H, I, J such that the brake coils have the same conditions including the numbers of windings, balanced state can be achieved when the rotation of the rotor RO is suppressed, so that occurrence of the vibration due to rotation fluctuation can be prevented, and occurrence of noise due to the rotation fluctuation can be prevented. Of course, when a motor for a movable body in which efficiency thereof is not reduced while operability thereof is improved is provided, it is necessary to interpose a switch between both ends of the brake coil.

In the first embodiment, the case that ten tooth portions A, B, C, D, E, F, G, H, I, J are provided on the coil holder 35, ten commutator pieces a2, b2, c2, d2, e2, f2, g2, h2, i2, j2 are provided on the braking commutator 39, and the number of the tooth portions A, B, C, D, E, F, G, H, I, J and the number of the braking commutator pieces a2, b2, c2, d2, e2, f2, g2, h2, i2, j2 are equal to each other has been explained. However, the present invention is not limited thereto, and the motor for a movable body can be configured such that the number of the tooth portions A, B, C, D, E, F, G, H, I, J and the braking commutator pieces a2, b2, c2, d2, e2, f2, g2, h2, i2, j2 are different from each other.

Figure 18:
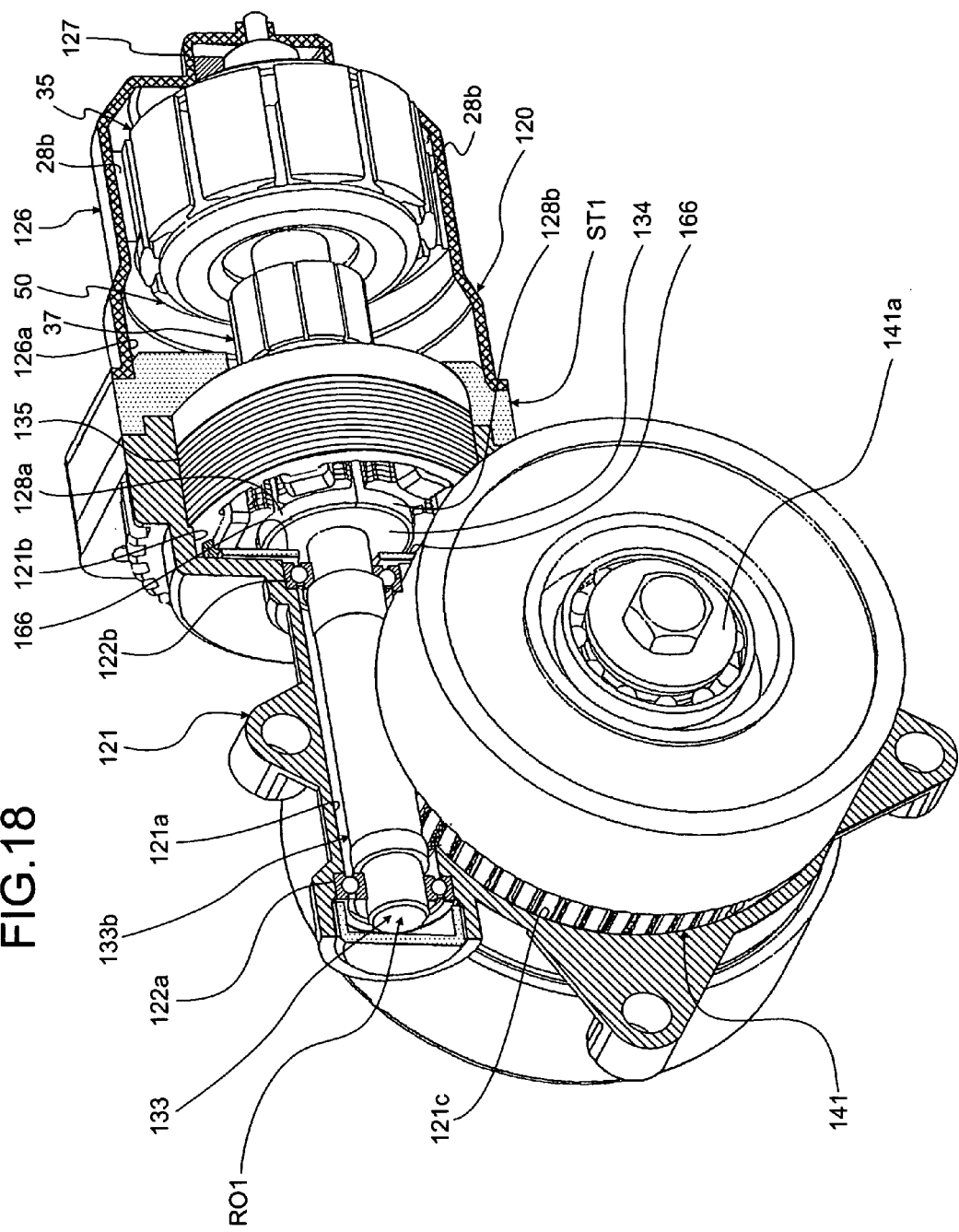
FIG. 18 is a perspective view of a sliding door motor (i.e., a motor for a movable body) according to a second embodiment of the present invention.
Figure 19:
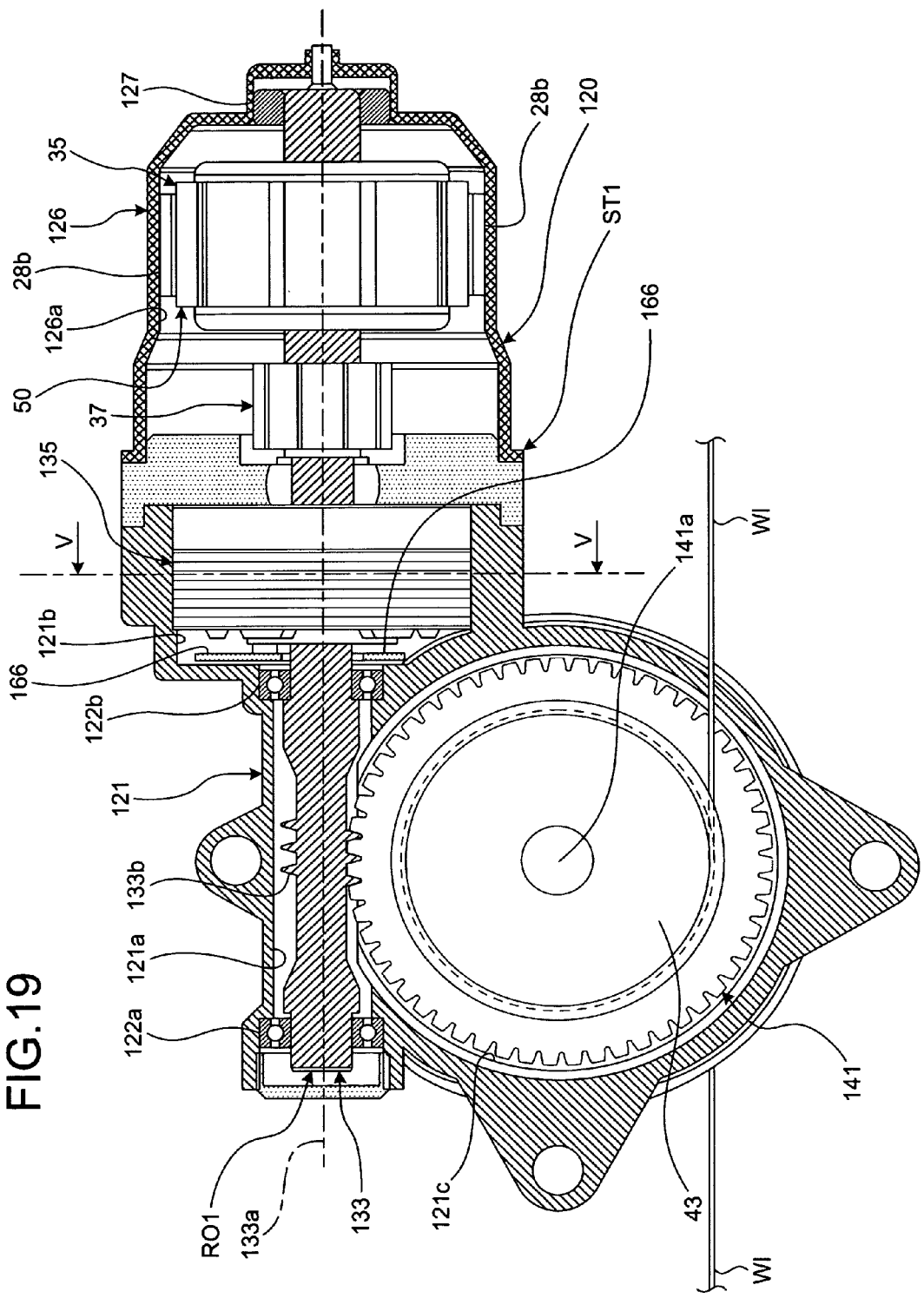
FIG. 19 is a sectional side view of the sliding door motor shown in FIG. 18.
Figure 20:
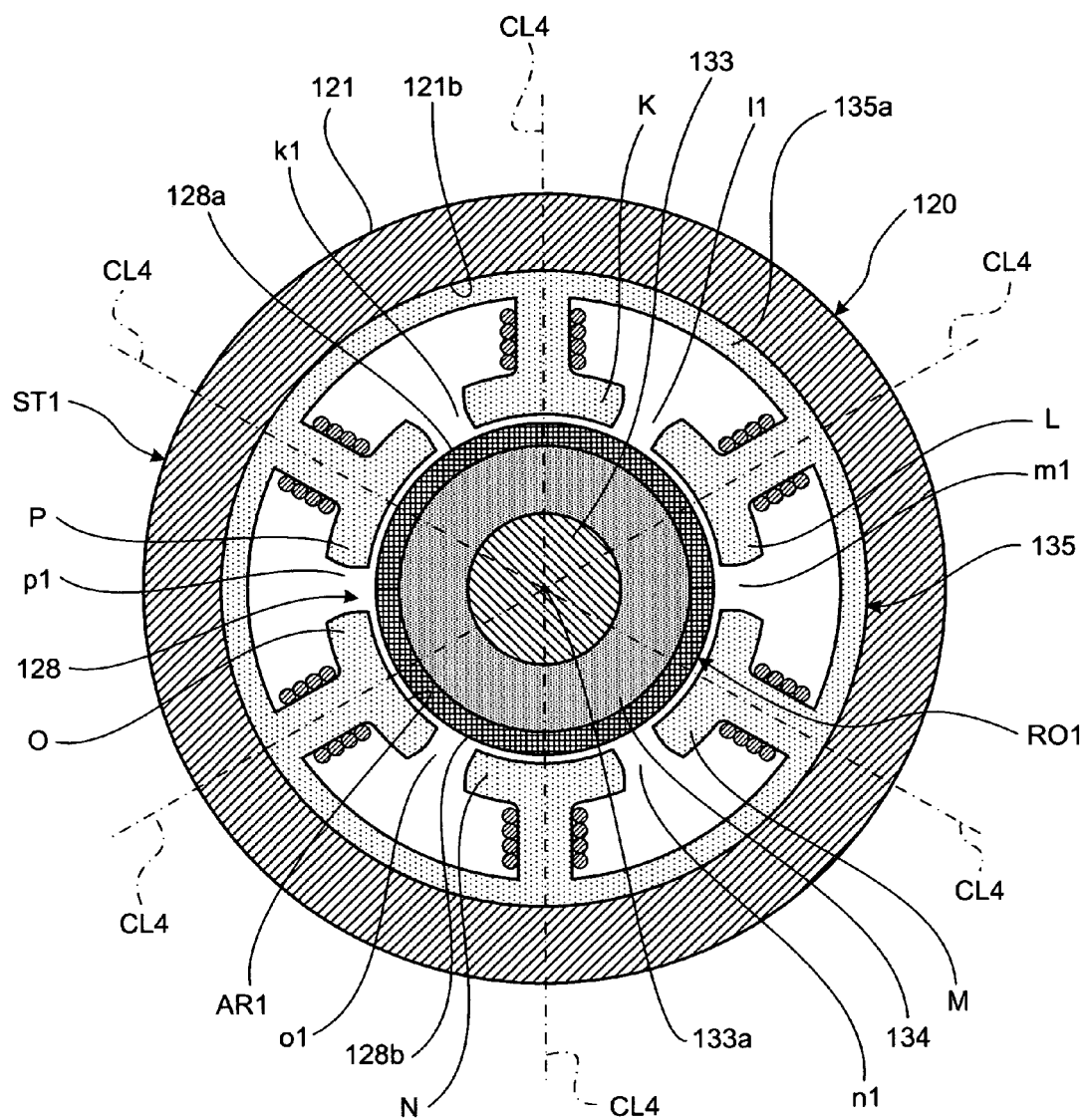
FIG. 20 is a sectional view taken along a line V-V in FIG. 18.

FIGS. 18 to 20 depict a sliding door motor 120 (hereinafter, "sliding door motor") according to a second embodiment of the present invention. In the sliding door motor (a motor for a movable body) 120 shown in FIGS. 18 to 20, parts of the sliding door motor 120 similar to those of the sliding door motor 20 shown in FIGS. 1 to 7 are denoted by like reference numerals used in the sliding door motor 20 and explanation thereof is omitted.

The sliding door motor 120 according to the second embodiment is applied to, for example, the body moving apparatus 10 of a passenger vehicle like the sliding door motor 20 according to the first embodiment.

The sliding door motor 120 rotates the drum 43 by applying a voltage from the power source 49, and it includes a shaft 133, a worm wheel 141, a motor cap 126, and a motor case 121.

The shaft 133 is provided inside the motor case 121 and the motor cap 126 to be rotatable about a rotation axis 133a via bearings 122a, 122b provided in the motor case 121 and a bearing 127 provided in the motor cap 126. As shown in FIG. 19, a worm 133b is provided on an outer peripheral face of a portion of the shaft 133 positioned between the bearing 122a and the bearing 122b, as shown in FIGS. 19 and 20, a braking field magnet 128 is provided on an outer peripheral face of a portion of the shaft 133 positioned between the bearing 122b and the bearing 127 via a cylindrical break field magnet holder 134, and as shown in FIG. 19, the commutator 37 and the coil holder (a driving coil holder) 35 are provided on an outer peripheral face of a portion of the shaft 133 positioned between the bearing 122b and the bearing 127.

As shown in FIG. 20, the braking field-magnet holder 134 is formed to have the same hole diameter as a diameter of the shaft 133, and it is attached to the shaft 133 by fixing an inner peripheral face of the hole and an outer peripheral face of the shaft 133.

The conducting coils 101a, 101b, 102a, 102b, 103a, 103b, 104a, 104b, 105a, 105b, 106a, 106b, 107a, 107b, 108a, 108b, 109a, 109b, 110a, 110b (not shown) are provided on the coil holder 35 of the second embodiment by winding a conducting wire 100 like the sliding door motor 20 of the first embodiment, however, the brake coils 111a, 111b are not provided since winding of the conducting wire 111 is not performed. Only the point is different from the coil holder 35 of the first embodiment and the coil holder 35 of the second embodiment.

Although not shown, the sliding door motor 120 of the second embodiment includes the driving circuit 50 having the power source 49, the voltage controller 47, the conducting wire 100, the cables 45a, 45b, the brushes 23a, 23b, and the commutator 37 like the sliding door motor 20 of the first embodiment.

The worm wheel 141 is provided in an accommodating space 121c provided in the motor case 121 to be rotatable about an output shaft 141a via a bearing (not shown) provided in the motor case 121 and to mesh with the worm 133b, as shown in FIG. 19. The worm wheel 141 of the second embodiment is provided such that the drums 43 attached with one ends of two wires WI, respectively, are integrated to both sides of the worm wheel 141. That is, in the second embodiment, the worm wheel 141 and the drums 43 are integrally provided such that, when the shaft 133 is rotated once so that the worm wheel 141 is rotated via the worm 133b by a predetermined angle, the drums 43 are also rotated by the predetermined angle.

As shown in FIG. 20, the braking field magnet 128 is, for example, a plate-like permanent magnet, and it is formed by arranging two field magnets as a pair. One braking field magnet 128a is adhered on an upper side of an outer peripheral face of the braking field-magnet holder 134 and the other braking field magnet 128b different in polarity from a surface of the braking field magnet 128a is adhered on a lower side thereof such that the magnets 128a and 128b constitute a cylindrical shape on the outer peripheral face of the braking field-magnet holder 134. More specifically, the one braking field magnet 128a is adhered on the upper side of the outer peripheral face of the braking field-magnet holder 134 such that a surface thereof has the north pole, while the other braking field magnet 128b is adhered on the lower side of the outer peripheral face of the braking field-magnet holder 134 such that a surface thereof has the south pole.

As shown in FIGS. 18 and 19, the motor cap 126 is formed in a cylindrical shape with a lid where a cylindrical fourth space 126a that accommodates the shaft 133 and the coil holder 35 therein is provided. The motor cap 126 is formed from a magnetic material, and it functions as a yoke for preventing the magnetic force of the field magnets (driving field magnet) 28a, 28b to be attached from lowering and also functions as a magnet holder (driving field-magnet holder) holding the field magnets 28a, 28b.

The motor case 121 is formed to include a cylindrical fifth space 121a therein, a cylindrical sixth space 121b with a diameter larger than that of the fifth space 121a, and an accommodating space 121c. The fifth space 121a and the sixth space 121b accommodate the shaft 133 and they are formed to communicate with each other. As described above, the accommodating space 121c accommodates the worm wheel 141 and is formed to communicate with the fifth space 121a. The motor case 121 and the motor cap 126 are assembled to each other such that the sixth space 121b and the fourth space 126a communicate with each other.

A braking coil holder (a core) 135 is provided in the sixth space 121b formed in the motor case 121.

The braking coil holder 135 holds a brake coil formed by winding a conducting wire described later, and it is formed by laminating magnetic members such as silicon steel plates so as to have a cylinder portion 135a provided cylindrically, a plurality of, e.g., six, tooth portions K, L, M, N, O, P provided on an inner peripheral face of the cylinder portion 135a so as to project, and a plurality of, e.g., six, slot portions (grooves) k1, l1, m1, n1, o1, p1 provided so as to correspond to the tooth portions K, L, M, N, O, P, as shown in FIG. 20. The braking coil holder 135 is attached to the motor case 121 by fixing an outer peripheral face of the cylinder portion 135a and an inner peripheral face of the motor case 121.

Each of the tooth portions K, L, M, N, O, P is formed in a T shape expanding toward its tip end in side view such that an opposed area between a surface of each braking field magnet 128a, 128b and a surface AR1 of the tip end becomes large. The tooth portions K, L, M, N, O, P are arranged such that a projecting direction of one of the tooth portions and a projecting direction of another of the tooth portions which is provided on the opposite side of the inner peripheral face of the cylinder portion 135a from the one are reverse to each other in a state where a center line CL4 passing through a center passes through the rotation axis 133a on a plane perpendicular to the rotation axis 133a and the slot portions k1, l1, m1, n1, o1, p1 are each interposed between adjacent ones of the tooth portions such that the tooth portions are positioned at equal intervals on the inner peripheral face of the cylinder portion 135a. Further, in the second embodiment, the tooth portions K, L, M, N, O, P are arranged on the plane perpendicular to the rotation axis 133a to form a point symmetry about the rotation axis 133a, where six tooth portions K, L, M, N, O, P are arranged on the inner peripheral face of the cylinder portion 135a such that an angle defined by the center line CL4 of one of the tooth portions K, L, M, N, O, P and the center line CL4 of another of the tooth portions K, L, M, N, O, P adjacent thereto forms 60 degrees.

The braking coil holder 135 with these tooth portions K, L, M, N, O, P are disposed in the sixth space 121b of the motor case 121 such that the surfaces of the braking field magnets 128a, 128b and the surfaces AR1 of distal ends of the tooth portions K, L, M, N, O, P are opposed to each other in a state where slight gaps are formed between the surfaces of the braking field magnets 128a, 128b and the surfaces AR1 of the distal ends of the tooth portions K, L, M, N, O, P.

Figure 21:
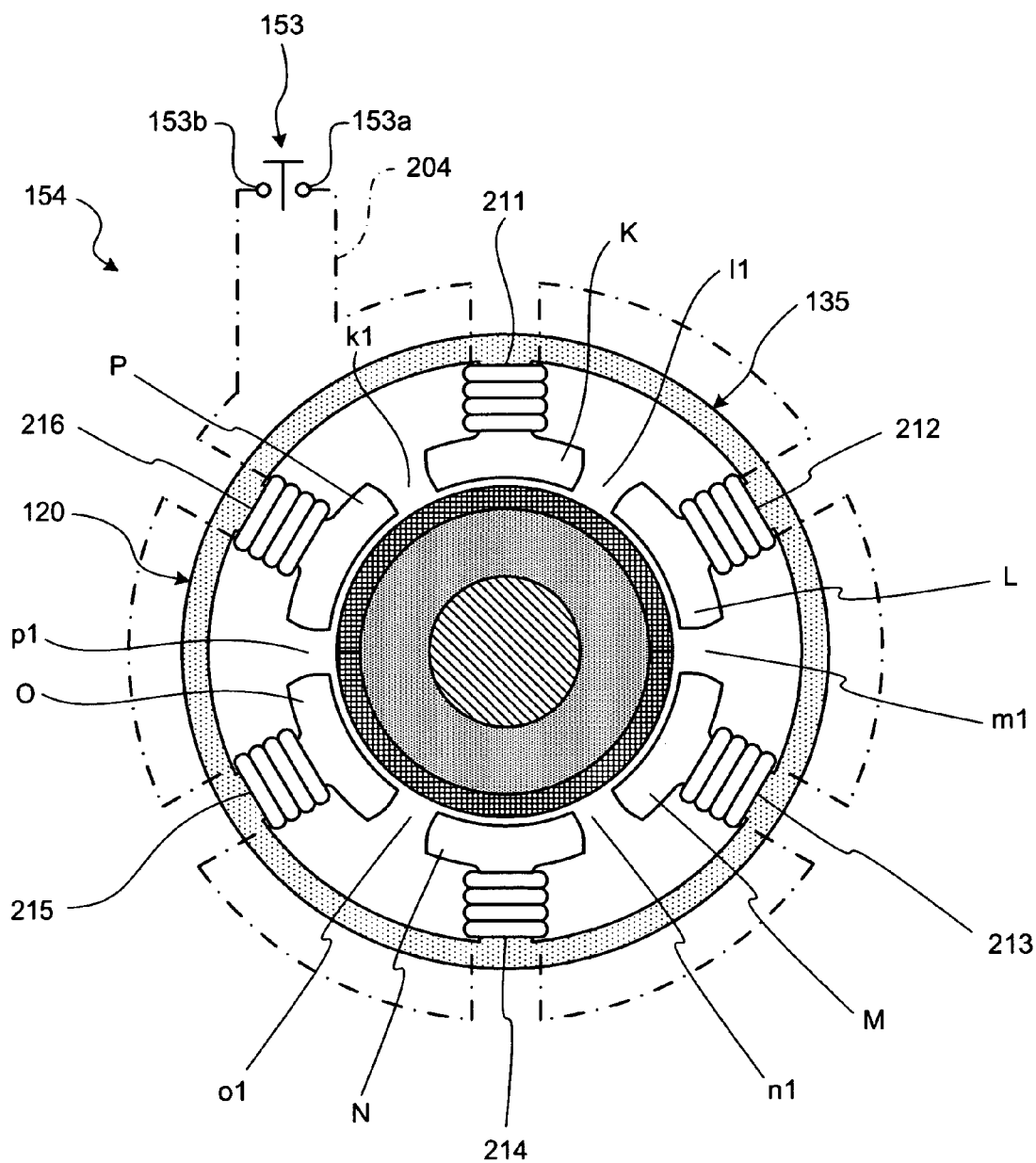
FIG. 21 is an explanatory diagram of a brake circuit included in the sliding door motor shown in FIG. 18.

As shown in FIG. 21, for example, in the sliding door motor 120 of the second embodiment, brake coils 211, 212, 213, 214, 215, 216 are provided by winding an eleventh conducting wire 204 on the tooth portions K, L, M, N, O, P on the braking coil holder 135.

The eleventh conducting wire 204 whose one end has been attached to one terminal 153a of a switch (a switch unit) 153 described later is made to pass through the slot portions k1 and l1 so as to be wound around the eleventh tooth portion K for plural times so that the first brake coil 211 is formed. The eleventh conducting wire 204 is then made to pass through the slot portions l1 and m1 so as to be wound around the twelfth tooth portion L for plural times so that the second brake coil 212 is formed. Subsequently, the eleventh conducting wire 204 is then made to pass through the slot portions m1 and n1 so as to be wound around the thirteenth tooth portion M for plural times so that the third brake coil 213 is formed. Next, the eleventh conducting wire 204 is made to pass through the slot portions n1 and o1 so as to be wound around the fourteenth tooth portion N for plural times so that the fourth brake coil 214 is formed. The eleventh conducting wire 204 is then made to pass through the slot portions o1 and p1 so as to be wound around the fifteen tooth portion O for plural times so that the fifth brake coil 215 is formed. The eleventh conducting wire 204 is further made to pass through the slot portions p1 and k1 so as to be wound around the sixteen tooth portion P for plural times so that the sixth brake coil 216 is formed. Thereafter, the other end of the eleventh conducting wire 204 is attached to the other terminal 153b of the switch 153.

In the sliding door motor 120 of the second embodiment, the eleventh conducting wire 204 and the switch 153 constitute a brake circuit (a drive suppressing circuit) 154.

The switch 153 is provided, for example, outside the motor cap 126 to be switchable between a closed state where the brake circuit 154 is closed and an opened state where the brake circuit 154 is partially opened. The switch 153 includes a biasing spring (not shown) and an opening/closing mechanism described later. The switch 153 is normally put in the opened state according to a biasing force of the biasing spring, while it is switched to the closed state according to pressing from the opening/closing mechanism against the biasing force of the biasing spring based on a command from a control device described later. When a pressing force from the opening/closing mechanism is released, the switch 153 is switched from the closed state to the opened state according to the biasing force of the biasing spring.

In the sliding door motor 120 having the configuration described above, as shown in FIGS. 18 to 20, the shaft 133, the braking field-magnet holder 134, and the coil holder 35 constitute a rotor RO, while the motor case 121, the motor cap 126, and braking coil holder 135 constitute the stator ST1, and the rotor RO1 is disposed to be rotatable to the stator ST1. In the drive circuit 50, the conducting wire 100 provided on the rotor RO1 rotated by providing the commutator 37 and the brushes 23a, 23b between the rotor RO1 and the stator ST1 and the voltage controller 47 are electrically connected to each other.

Figure 22:
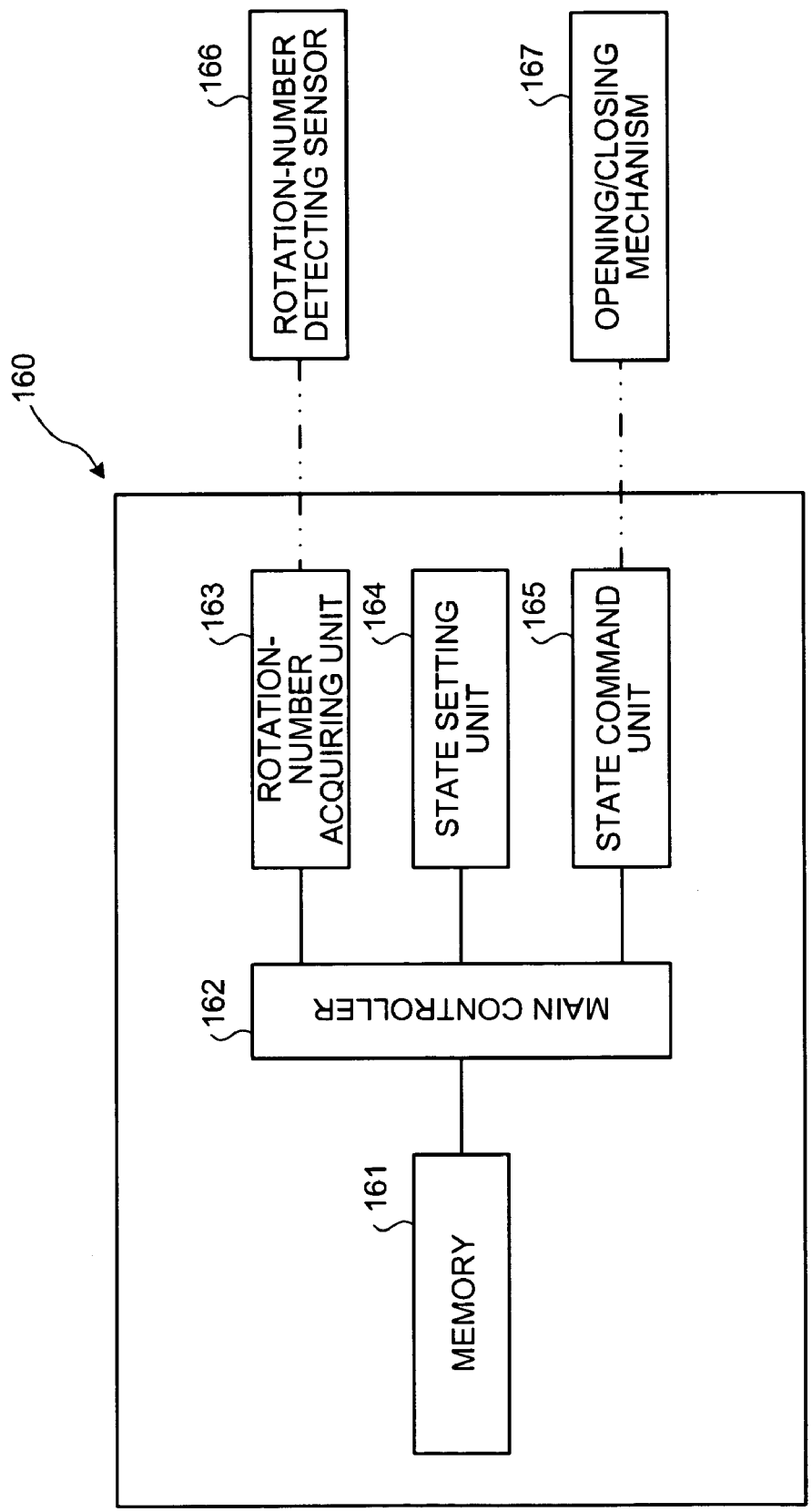
FIG. 22 is a block diagram of a control device included in the sliding door motor shown in FIG. 18.

The switch 153 is controlled by the following control device provided in the vehicle main body BD. As shown in FIG. 22, a control device 160 includes a memory 161, a main controller 162, a rotation-number acquiring unit 163, a state setting unit 164, and a state command unit 165.

The main controller 162 collectively controls the rotation-number acquiring unit 163, the state setting unit 164, and the state command unit 165 based on, for example, a program or data stored in the memory 161 such as a ROM or a RAM in advance.

The rotation-number acquiring unit 163 is connected to a rotation-number detecting sensor (a rotation number detector) 166 provided inside the motor case 121, as shown in FIG. 22. The rotation-number acquiring unit 163 calculates a rotation number per unit time (hereinafter, "rotation number") of the shaft 133 based on change in magnetic force detected by the rotation-number detecting sensor 166 to convert the calculated rotation number to a signal, and sends the same to the main controller 162. In the sliding door motor 120 of the second embodiment, for example, a Hall element is used for the rotation-number detecting sensor 166, and it is attached to the motor case 121 to face the braking field-magnet holder 134 so as to detect magnetic force of the braking field magnets 128a, 128b, as shown in FIGS. 18 and 19. The rotation-number detecting sensor 166 detects the rotation number of the shaft 133 for each predetermined time period.

The state setting unit 164 compares the rotation number of the shaft 133 acquired through the rotation-number acquiring unit 163 and a set rotation number (a threshold) of the shaft 133 stored in the memory 161 in advance with each other to set a state of the switch 153. More specifically, the state setting unit 164 compares the rotation number of the shaft 133 acquired through the rotation-number acquiring unit 163 and the threshold with each other to set the closed state of the switch 153 when the rotation number of the shaft 133 is larger than the threshold while set the opened state of the switch 153 when the rotation number of the shaft 133 is smaller than the threshold. The threshold is set to such a rotation number that is not exceeded when the sliding door SD is moved to rotate the shaft 133 according to an operation of the door switch during stop of the vehicle main body BD on a horizontal and flat ground, and that is exceeded according to a follow-up rotation of the shaft 133 due to an action of the gravity when the sliding door SD is moved to rotate the shaft 133 according to an operation of the door switch during stop of the vehicle main body BD on a ground inclined to a moving direction of the sliding door SD by a predetermined angle.

The state command unit 165 is connected to an opening/closing mechanism 167 provided in the switch 153, and transmits a command to the opening/closing mechanism 167 based on a state set by the state setting unit 164, thereby changing the state of the switch 153.

The main controller 162 of the control device 160 of the second embodiment is connected to the voltage controller 47 via a cable (not shown), and it is also for performing control on the voltage controller 47. More specifically, the main controller 162 transmits a command instructing application of a voltage to both ends of the conducting wire 100 via the cables 45a, 45b and the brushed 23a, 23b to the voltage controller 47 and instructing stop of the application of a voltage to the voltage controller 47.

Figure 23:
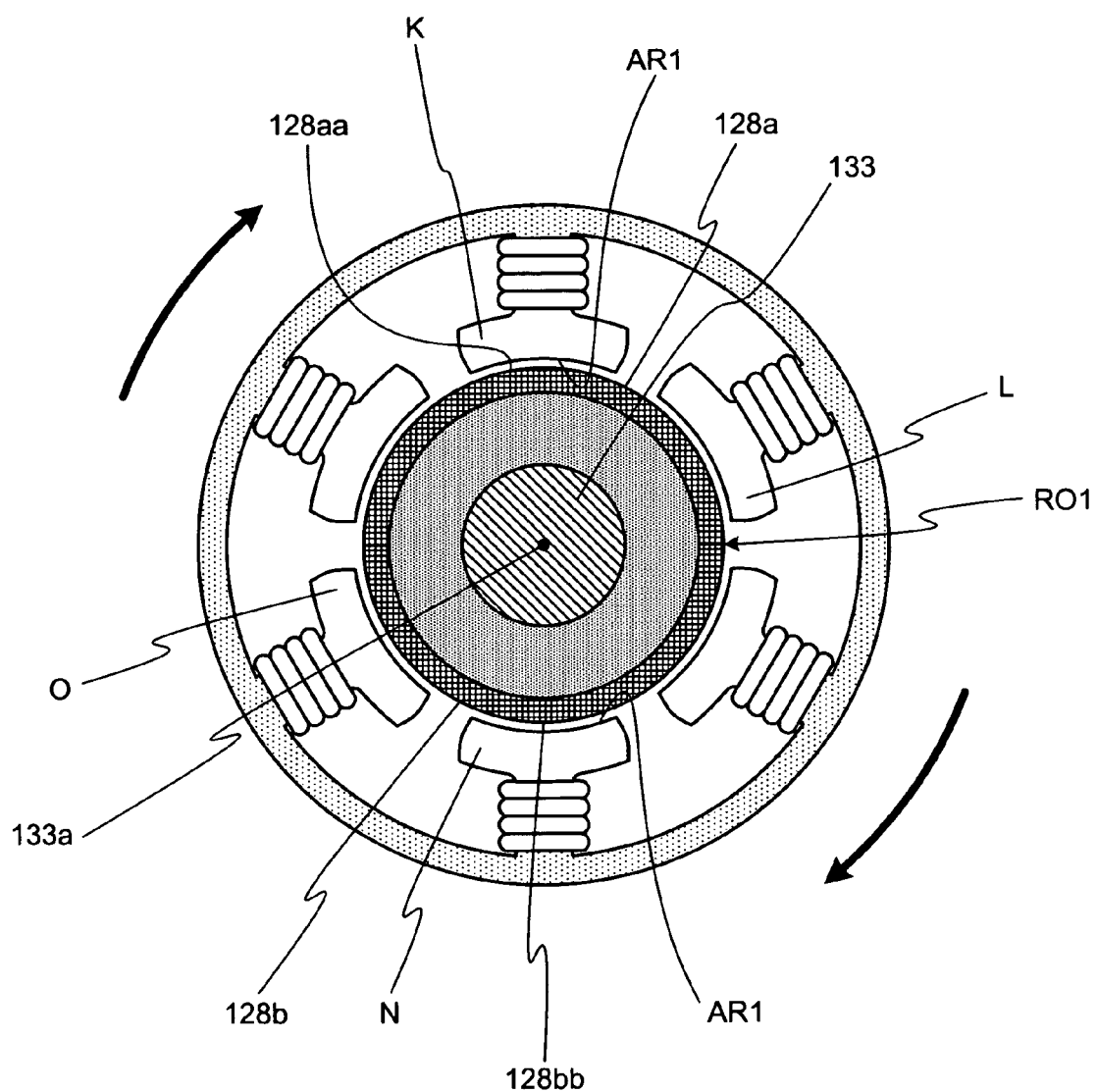
FIG. 23 is an explanatory diagram of rotation of a rotor in the sliding door motor shown in FIG. 18.

In a passenger vehicle to which the sliding door motor 120 with the constitution described above is applied, the sliding door SD is closed, for example, in the following manner. In the explanation below, it is assumed that the passenger vehicle stops on a horizontal and flat ground (a ground that is not inclined in a door opening direction and a door closing direction of the sliding door SD). As an initial state in the explanation, it is assumed that the sliding door SD is put in a fully opened position, and the rotor RO1 is stopped at a position where a center 128aa of one braking field magnet 128a and the surface AR1 of the eleventh tooth portion K face each other and a center 128bb of the other braking field magnet 128b and the surface AR1 of the fourteenth tooth portion N face each other on a plane perpendicular to the rotation axis 133a, as shown in FIG. 23.

Since the shaft 133 is stopped in this state, the rotation-number detecting sensor 166 detects that the rotation number of the shaft 133 is zero. Thereby, the rotation-number acquiring unit 163 transmits that the rotation number of the shaft 133 is zero to the main controller 162. When the main controller 162 receives that fact, the state setting unit 164 determines that the rotation number of the shaft 133 is smaller than the threshold to perform setting for maintaining the opened state of the switch 153. Thereby, the state command unit 165 transmits a command instructing that the opened state of the switch 153 should be maintained to the opening/closing mechanism 167. Upon receipt of the command instructing that effect, the opening/closing mechanism 167 maintains the opened state of the switch 153.

For example, when a driver operates the door switch to conduct a door-closing operation from this state, a command instructing that a voltage is applied to the both ends of the conducting wire 100 via the cables 45a, 45b, and the brushes 23a, 23b is transmitted to the voltage controller 47 from the control device 160.

When the command is transmitted to the voltage controller 47, the voltage controller 47 applies a voltage to the both ends of the conducting wire 100 via the brushes 23a, 23b and the commutator pieces a1, b1, c1, d1, e1, f1, g1, h1, i1, j1 such that the surfaces AR of the tooth portions A, B, C, D, E, F, G, H, I, J positioned on an upper side due to magnetic field generated according to conducting to the conducting coil a become the north pole and the surfaces AR of the tooth portions A, B, C, D, E, F, G, H, I, J positioned on a lower side due to magnetic field generated according to conducting to the conducting coil b become the south pole, so that the rotor RO1 is rotated while rotation of the rotor RO in a clockwise direction due to a mutual action between the magnetic force generated on the surfaces of the tooth portions A, B, C, D, E, F, G, H, I, J and the magnetic force generated by the field magnets 28a, 28b, and the rotation of the rotor RO1 due to inertia in a state where a rotating force generated by magnetic force has been lost due to interruption of application of a voltage to the both ends of the conducting wire 100 caused by breaking of contact between the brushes 23a, 23b and the commutator pieces a1, b1, c1, d1, e1, f1, g1, h1, i1, j1 are repeated mutually, similar to the sliding door motor 20 of the first embodiment.

When the rotor RO1 rotates and the worm 133b together with the shaft 133 rotates in the above manner, the worm wheel 141 meshing with the worm 133b rotates. When the worm wheel 141 rotates, the drum 43 provided integrally with the worm wheel 141 also rotates. When the drum 43 rotates, the door-closing wire WI is wound while the door-opening wire WI is unwound, so that the sliding door SD is moved in the door-closing direction via these wires WI.

The rotation-number detecting sensor 166 detects the rotation number of the shaft 133 for each predetermined time period even during the rotation of the rotor RO1. When it is detected by the rotation-number detecting sensor 166 that the rotation number of the shaft 133 is smaller that the threshold, the rotation-number acquiring unit 163 transmits that the rotation number of the shaft 133 is smaller than the threshold to the main controller 162. When the main controller 162 receives that effect, the state setting unit 164 determines that the rotation number of the shaft 133 is smaller than the threshold to set that the switch 153 is maintained in the opened state. Thereby, the state command unit 165 transmits a command instructing that the switch 153 is maintained in the opened state to the opening/closing mechanism 167. Upon receipt of the command, the opening/closing mechanism 167 continues to maintain the switch 153 in the opened state.

On the other hand, when it is detected by the rotation-number detecting sensor 166 that the rotation number of the shaft 133 is larger that the threshold, the rotation-number acquiring unit 163 transmits that the rotation number of the shaft 133 is larger than the threshold to the main controller 162. When the main controller 162 receives that effect, the state setting unit 164 determines that the rotation number of the shaft 133 is larger than the threshold to set that the switch 153 should be changed to a closed state. Thereby, the state command unit 165 transmits a command instructing that the switch 153 should be changed to a closed state to the opening/closing mechanism 167. Upon receipt of the command, the opening/closing mechanism 167 changes the switch 153 to a closed state.

As described above, the passenger vehicle stops on a horizontal and flat ground, where the sliding door SD is not biased in the door-closing direction due to an action of the gravity. In this case, therefore, the rotation number of the shaft 133 does not exceed the threshold due to an action of the gravity, so that the switch 153 continues to maintain the opened state. Accordingly, induced electromotive force is not generated in the brake coils 211, 212, 213, 214, 215, 216 due to the magnetic force of the braking field magnets 128a, 128b according to the rotation of the rotor RO1 so that no current flows in the brake coils 211, 212, 213, 214, 215, 216. Thereby, the rotation of the rotor RO1 is not suppressed by the brake coils 211, 212, 213, 214, 215, 216.

Next, the sliding door SD is shifted to a fully closed position according to a sliding movement caused by driving of the sliding door motor 120. When the sliding door SD has been shifted to the fully closed position, the voltage controller 47 stops application of a voltage based on a command from the control device 160. Thereby, the rotation of the rotor RO1 stops.

Next, for example, a case that a driver operates the door switch for door opening in a state where the driver drives the passenger vehicle and the vehicle main body BD is stopped on a ground inclined downwardly in the door-opening direction of the sliding door SD will be explained.

When the door switch is operated for door opening, a command instructing that a voltage is applied to the both ends of the conducting wire 100 via the cables 45a, 45b and the brushes 23a, 23b is transmitted from the control device 160 to the voltage controller 47.

When the command is transmitted to the voltage controller 47, the voltage controller 47 applies a voltage to the both ends of the conducting wire 100 via the brushes 23a, 23b and the commutator pieces a1, b1, c1, d1, e1, f1, g1, h1, i1, j1 such that the surfaces AR of the tooth portions A, B, C, D, E, F, G, H, I, J positioned on an upper side due to magnetic field generated according to conducting to the conducting coil a become the south pole and the surfaces AR of the tooth portions A, B, C, D, E, F, G, H, I, J positioned on a lower side due to magnetic field generated according to conducting to the conducting coil b become the north pole, so that the rotor RO1 is rotated while the rotation of the rotor RO1 in a counterclockwise direction due to a mutual action between magnetic force generated on the surfaces of the tooth portions A, B, C, D, E, F, G, H, I, J and the magnetic force generated by the field magnets 28a, 28b, and the rotation of the rotor RO1 due to inertia in a state where a rotating force generated by magnetic force has been lost due to interruption of application of a voltage to the both ends of the conducting wire 100 caused by breaking of contact between the brushes 23a, 23b and the commutator pieces a1, b1, c1, d1, e1, f1, g1, h1, i1, j1 are repeated mutually like the sliding door motor 20 of the first embodiment.

When the rotor RO1 rotates in a counterclockwise direction and the worm 133 together with the shaft 133 rotates, the worm wheel 141 meshing with the worm 133b rotates. When the worm wheel 141 rotates, the drum 43 provided integrally with the worm wheel 141 also rotates. When the drum 43 rotates, the door-opening wire WI is wound while the door-closing wire WI is unwound, so that the sliding door SD is moved in the door-opening direction via these wires WI.

As described above, the rotation-number detecting sensor 166 detects the rotation number of the shaft 133 for each predetermined time period during the rotation of the rotor RO, and the control device 160 transmits a command to the opening/closing mechanism 167 based on the result of the detection.

As described above, since the passenger vehicle is stopped, or the vehicle main body BD is positioned, on a ground inclined downwardly in the door-opening direction of the slide door SD, the sliding door SD is biased in the door-opening direction due to an action of the gravity, so that there can be a case that the rotation number of the shaft 133 exceeds the threshold according to a follow-up rotation of the rotor RO.

Figure 24:
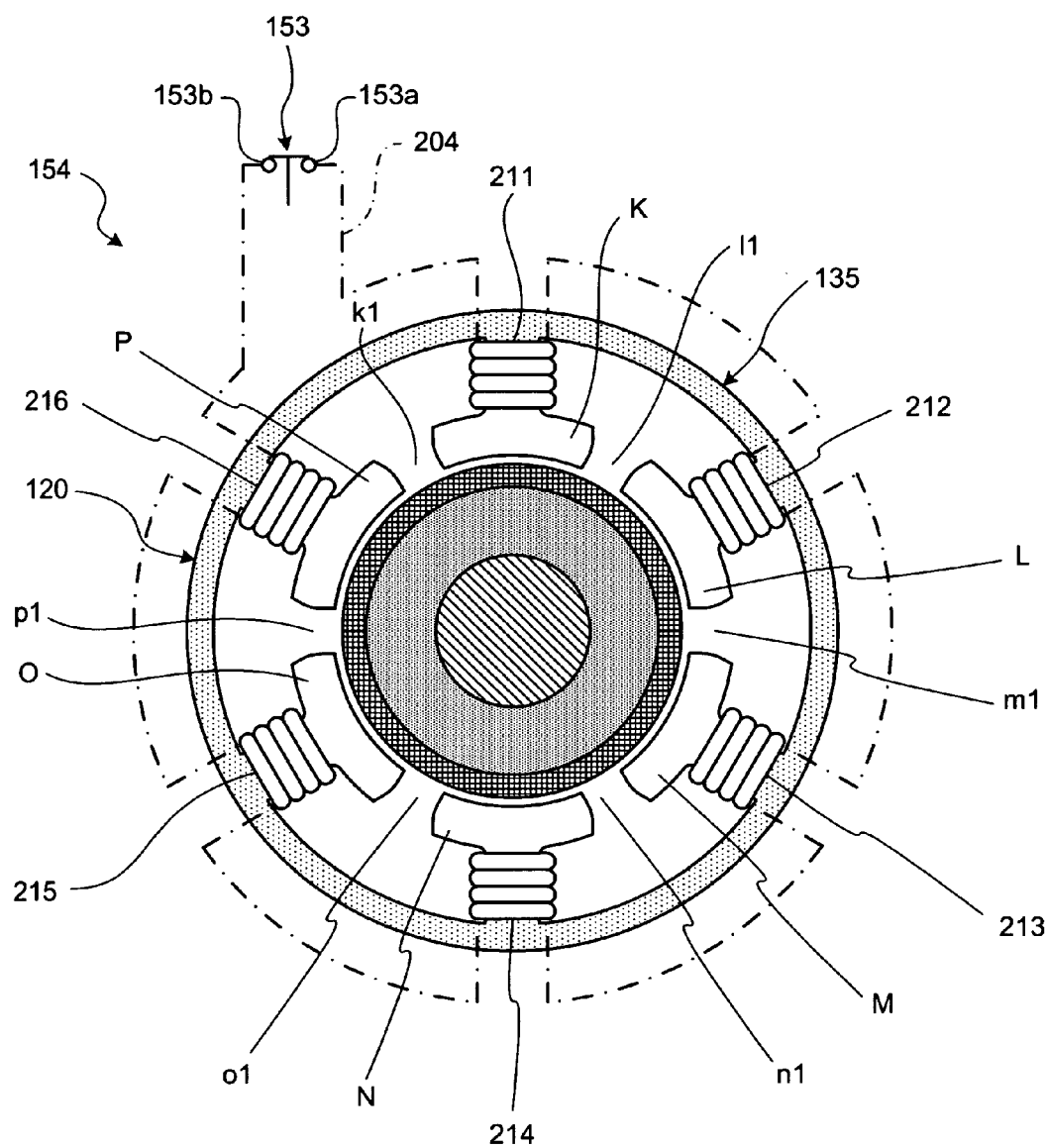
FIG. 24 is an explanatory diagram of a case that rotation of the rotor is suppressed by a brake coil included in the brake circuit shown in FIG. 21.

When it is detected by the rotation-number detecting sensor 166 that the rotation number of the shaft 133 exceeds the threshold, the control device 160 transmits a command instructing that the switch 153 is switched to the closed state to the opening/closing mechanism 167 based on the detection result. Upon receipt of the command, the opening/closing mechanism 167 switches the switch 153 to the closed state, as shown in FIG. 24.

When the switch 153 is switched to the closed state, the brake circuit 154 switches to a closed circuit. When the rotor RO1 is rotated in this state, an induced electromotive force is generated in the brake coils 211, 212, 213, 214, 215, 216 according to electromagnetic induction caused by the braking field magnets 128a, 128b so that a current flows in the brake circuit 154, and magnetic field suppressing relative rotation between the stator ST1 and the rotor RO1 is generated in the brake coils 211, 212, 213, 214, 215, 216 so that the rotation of the rotor RO1 is suppressed accordingly. The suppression of the rotation of the rotor RO1 continues during a period where the rotation number of the shaft 133 exceeds the threshold.

Accordingly, since a problem of the rotation number of the rotor RO1 exceeding the threshold is prevented, a problem of the sliding door SD opening forcefully is prevented. Thereafter, when the rotation number of the rotor RO1 becomes lower than the threshold, it is detected by the rotation-number detecting sensor 166, and the control device 160 transmits a command instructing that the switch 153 is switched to the opened state to the opening/closing mechanism 167 based on the detection result. Upon receipt of the command, the opening/closing mechanism 167 switches the switch 153 to the opened state.

Next, when the sliding door SD is shifted to a fully opened position, the voltage controller 47 stops application of a voltage based on a command from the control device 160. Thereby, the rotation of the rotor RO1 stops.

In the above example, there has been explained the prevention of the problem of the sliding door SD opening forcefully when the sliding door SD is opened. A problem of the sliding door SD closing forcefully when the sliding door SD is closed is also prevented in the sliding door motor 120.

According to the sliding door motor 120 of the second embodiment, since the switch 153 interposed between the both ends of the brake coils 211, 212, 213, 214, 215, 216 is provided to be switchable between the opened state and the closed state, when the switch 153 is switched to the closed state, the rotation of the rotor RO1 can be suppressed, so that a problem of the sliding door SD closing forcefully can be prevented and a problem of the sliding SD opening forcefully can be prevented. Thereby, the operability of the sliding door SD can be improved. Furthermore, when the switch 153 is switched to the opened state, the rotation of the rotor RO1 is not suppressed, so that efficiency thereof is not reduced.

According to the sliding door motor 120, the switch 153 is provided in the brake circuit 154 and the switch 153 can be switched to the closed state, if necessary, so that it is possible to set the gear ratio between the worm 133b and the worm wheel 141 such that the rotor RO1 rotates easily. By providing the worm 133b and the worm wheel 141 at a gear ratio such that the rotor RO1 rotates easily and providing the worm wheel 141 and the drum 43 integrally, the sliding door SD can be opened and closed manually according to a door operation of the door handle DH. Further, by providing the worm wheel 141 and the drum 43 integrally, the number of parts can be reduced so that the sliding door motor 120 can be provided at a low price. Of course, when the rotation number of the rotor RO1 exceeds the threshold by manually biasing the sliding door SD during a sliding movement of the sliding door SD performed by the voltage controller 47, the switch 153 is switched to the closed state so that the rotation of the rotor RO1 can be suppressed.

According to the sliding door motor 120, since the brake coils 211, 212, 213, 214, 215, 216 is provided on all the tooth portions K, L, M, N, O, P of the braking coil holder 135, balanced state can be achieved when the rotation of the rotor RO1 is suppressed, so that occurrence of the vibration due to rotation fluctuation can be prevented, and occurrence of the noise due to the rotation fluctuation can be prevented.

In addition, according to the sliding door motor 120, since the braking coil holder 135 is provided on the stator ST1, it is unnecessary to provide the braking brushes 30a, 30b and the braking commutator 39 explained in the first embodiment between the rotor RO1 and the stator ST1. Therefore, since the braking brushes 30a, 30b do not contact with the braking commutator 39, vibration generated due to the contact can be prevented, noise generated due to the contact can be prevented, and electric noise generated by a spark due to the contact can be prevented.

According to the sliding door motor 120, since the magnetic force detecting sensor 166 that detects the magnetic force of the braking field magnets 128a, 128b is provided, a field magnet provided only for detecting the rotation number of the rotor RO1 can be cancelled by utilizing the braking field magnets 128a, 128b for suppressing the rotation of the rotor RO1 as field magnets for detecting the rotation number of the rotor RO1. Therefore, a parts cost can be reduced by sharing the braking field magnets 128a, 128b so that an inexpensive sliding door motor 120 can be provided.

In the second embodiment, explanation has been made using the sliding door motor 120 for opening and closing the sliding door SD provided on a side of the vehicle main body BD. However, application of the sliding door motor 120 is not limited to the sliding door SD, and even if it is applied to a sliding door motor for opening and closing a back door provided in the rear portion of the vehicle main body BD, similar functions and effects can be achieved. Of course, the sliding door motor 120 is not limited to the sliding door SD and the back door, and similar functions and effects can be achieved even in application of the sliding door motor 120 to a movable body opening and closing motor that moves, for example, a sunroof (a movable body) provided at a ceiling portion of the vehicle main body BD, and similar functions and effects can be achieved even in an application of the present invention to a motor for a movable body that moves a passenger seat (a movable body). Of course, the example where the present invention has been applied to the four-wheel passenger vehicle has been explained in the above, however, the present invention is not limited to the example, and similar functions and effects can be achieved even in application of the present invention to, for example, a motor truck (a truck) or a vehicle of a train, and similar functions and effects can be achieved even in application of the present invention to a motor for a movable body that moves a gate door (a movable body) for a house or the like.

In the second embodiment, the case that, when the rotation number of the shaft 133 exceeds the threshold, the control device 160 that suppresses the rotation of the rotor RO1 according to switching of the switch 153 to the closed state is provided has been explained. However, the present invention is not limited thereto, and a control device that performing switching between the opened state and the closed state of the switch 153 alternately so as to intermittently perform suppression of the rotation of the rotor RO1 during a period where the rotation number of the shaft 133 exceeds the threshold can be provided.

In the second embodiment, the case that two braking field magnets 128a, 128b are provided on the shaft 133 has been explained. However, the present invention is not limited thereto, and more than two braking field magnets can be provided on the shaft 133.

In the second embodiment, the case that the brake coils 211, 212, 213, 214, 215, 216 are provided on all the tooth portions K, L, M, N, O, P has been explained. However, the present invention is not limited thereto, and it is unnecessary to provide brake coils on all the tooth portions K, L, M, N, O, P.

Figure 25:
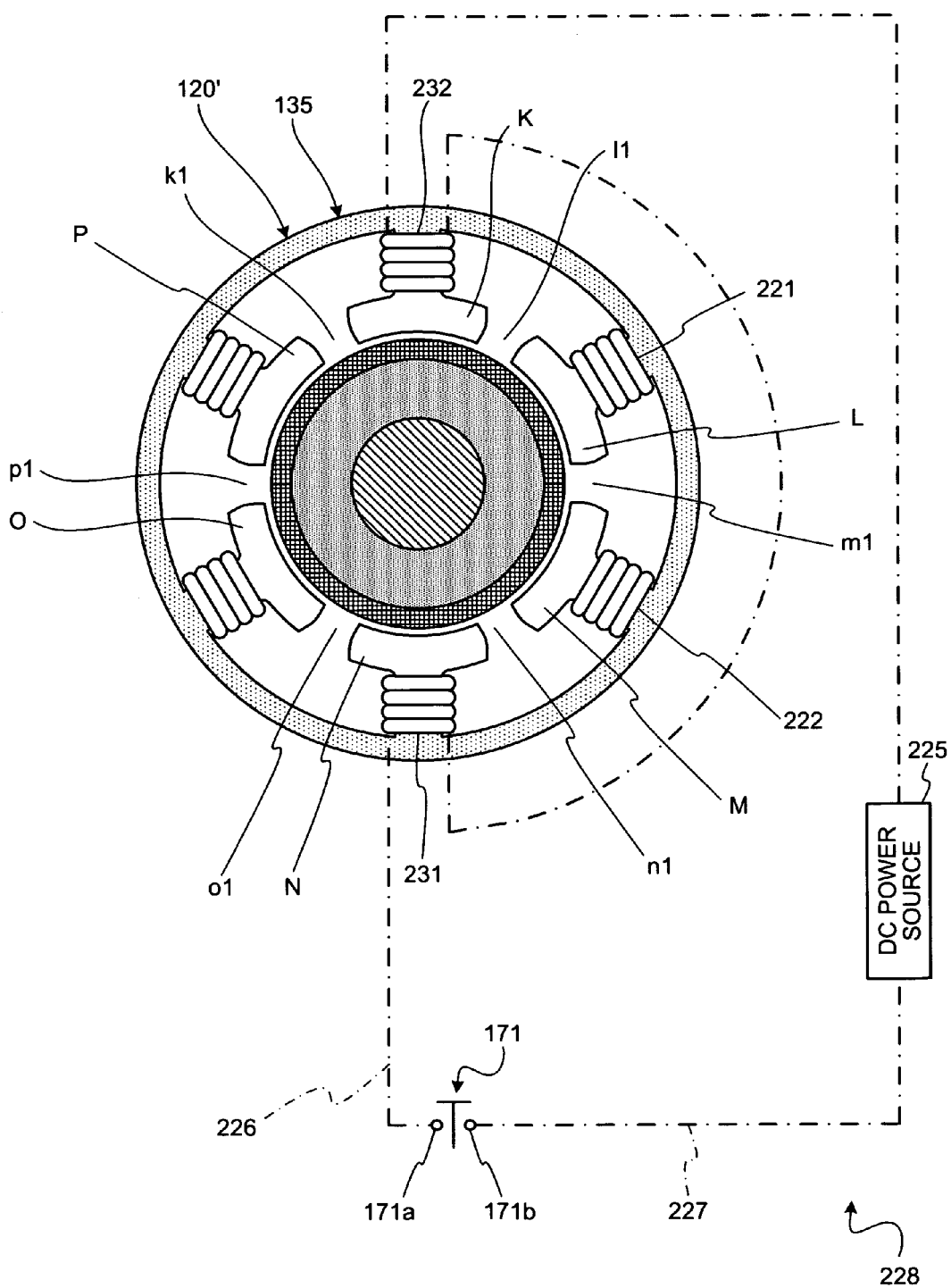
FIG. 25 is an explanatory diagram of a modification of the sliding door motor according to the second embodiment.

A sliding door motor 120' that is a modification of the sliding door motor 120 of the second embodiment is shown in FIG. 25. In the sliding door motor 120' shown in FIG. 25, parts of the sliding door motor 120' similar to those of the sliding door motor 120 are denoted by like reference numerals used in the sliding door motor 120 and explanation thereof is omitted.

The sliding door motor 120' has not only the brake circuit 154 described above but also an intermediate position stopping circuit 228.

The intermediate position stopping circuit 228 includes a switch (a switch unit) 171, a DC power source 225, a twentieth conducting wire 226, and a twenty-first conducting wire 227.

The switch 171 is provided, for example, inside the motor cap 126 such that the intermediate position stopping circuit 228 can be switched between a closed state where the intermediate position stopping circuit 228 is closed and an opened state where it is partially opened. The switch 171 includes a biasing spring (not shown) and an opening/closing mechanism. The switch 171 is normally put in the opened state according to a biasing force of the biasing spring, while it is switched to the closed state according to pressing from the opening/closing mechanism against the biasing force of the biasing spring based on a command from a control device described later. When a pressing force from the opening/closing mechanism is released, the switch 171 is switched from the closed state to the opened state according to the biasing force of the biasing spring. The opening/closing mechanism is connected to the main controller 162 of the main control device 160 and it performs switching of the state of the switch 171 based on a command from the main controller 162.

The DC power source 225 applies a DC voltage to both ends of an intermediate position stopping coil described later when the switch 171 is switched to the closed state.

The twentieth conducting wire 226 whose one end has been attached to a terminal 171a of the switch 171 is, for example, made to pass through the slot portion n1 and the slot portion o1 so as to be wound around the fourteenth tooth portion N for plural times so that a first intermediate position stopping coil 231 is provided. Next, the twentieth conducting wire 226 is made to pass through the slot portion k1 and the slot portion l1 so as to be wound around the eleventh tooth portion K for plural times in a direction reverse to a winding direction on the fourteenth tooth portion N so that a second intermediate position stopping coil 232 is provided. Thereafter, the other end of the twentieth conducting wire 226 is attached to the DC power source 225. The twenty-first conducting wire 227 electrically connects the DC power source 225 and the switch 171 to each other, one end thereof being attached to the DC power source 225 and the other end thereof being attached to a terminal 171b of the switch 171.

Next, an operation of the sliding door motor 120' having the intermediate position stopping circuit 228 will be explained. In the explanation below, it is assumed that the sliding door SD is stopped at an intermediate position between the fully opened position and the fully closed position and no voltage is applied between the brushes 23a, 23b by the voltage controller 47.

For example, when a driver operates the intermediate position stopping switch provided in a vehicle compartment portion facing a driver seat or a front passenger seat, or a door handle DH or a remote control key from this state, a command instructing that the switch 171 is switched to the closed state is transmitted from the main controller 162 of the control device 160 to the opening/closing mechanism.

Upon receipt of the induction indicating that effect, the opening/closing mechanism switches the switch 171 from the opened state to the closed state. The intermediate position stopping circuit 228 is changed to the closed state according to switching of the switch 171 to the closed state, so that a voltage is applied to between the both ends of each of the intermediate position stopping coils 231, 232.

When a voltage is applied to between the both ends of each of the intermediate position stopping coils 231, 232 so that a current flows, surfaces of the eleventh tooth portion K and the fourteenth tooth portion N are magnetized by magnetic field generated due to change of the intermediate position stopping coils 231, 232 to their conducting states, and magnetic force of the tooth portions K, N and the magnetic force of the braking field magnets 128a, 128b attract each other, so that the rotor RO1 is put in a locked state and a sliding movement of the sliding door SD is restricted.

Therefore, according to the sliding door motor 120', since the intermediate position stop coils disposed such that the magnetic force of the braking field magnets 128a, 128b and the magnetic force generated by application of a voltage to both ends of each of the intermediate position stopping coils attract each other are provided on the braking coil holder 135, the sliding door SD can be stopped at an intermediate position between the fully opened position and the fully closed position. Therefore, operability of the sliding door SD can be further improved.

In the above embodiments, the case that the intermediate position stopping coils 231, 232 and the brake coils 211, 212, 213, 214, 215, 216 are respectively provided has been explained. However, the present invention is not limited to the example. The brake coils 211, 212, 213, 214, 215, 216 can be used as the intermediate position stopping coils. When the brake coils 211, 212, 213, 214, 215, 216 are used as the intermediate position stopping coils, it is necessary to provide a by-pass unit connecting both ends of the DC power source to each other through a conducting wire.

Figure 26:
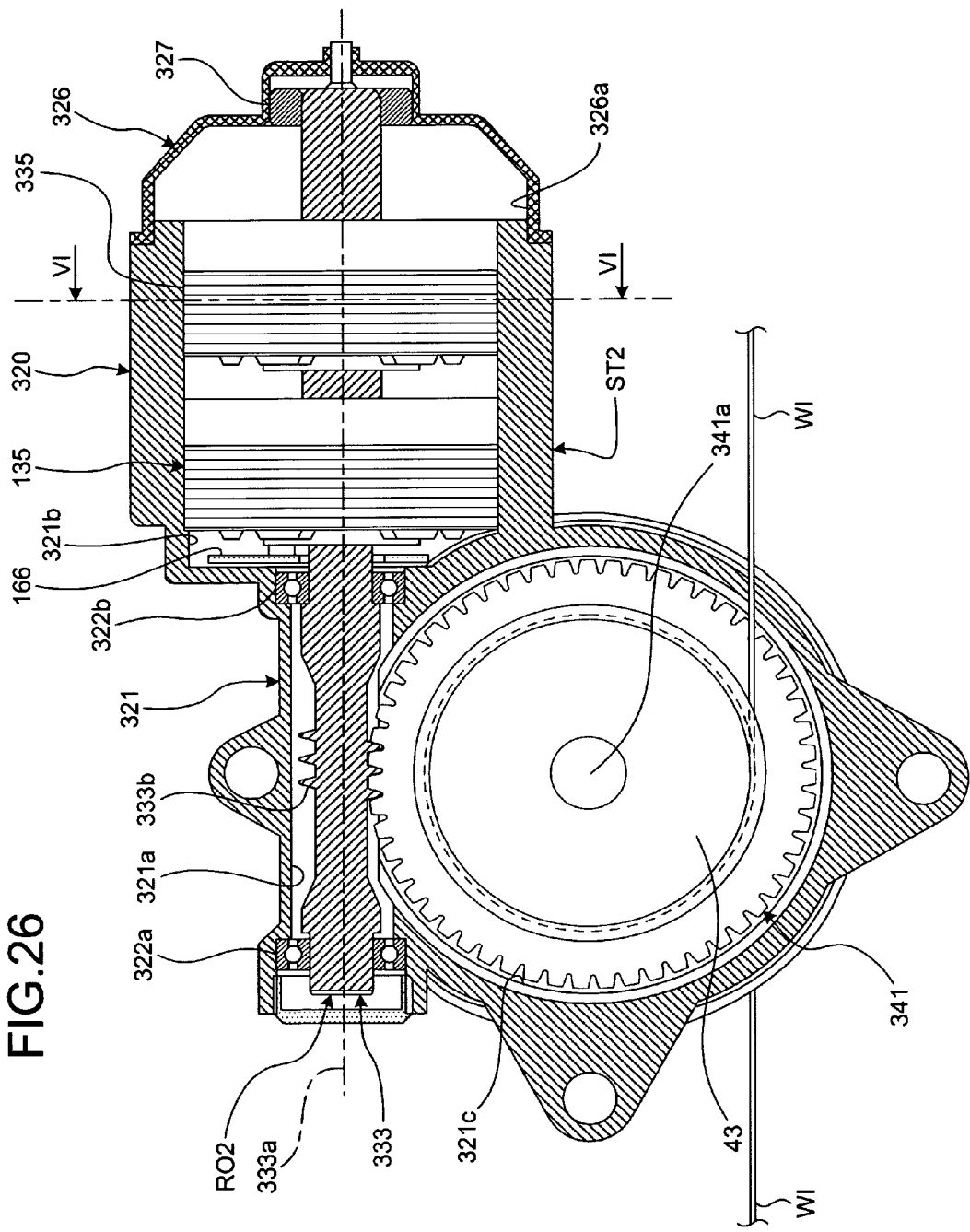
FIG. 26 is a perspective view of a sliding door motor (i.e., a motor for a movable body) according to a third embodiment of the present invention.

FIG. 26 depicts a sliding door motor 320 (hereinafter, "sliding door motor") according to a third embodiment of the present invention. In the sliding door motor (a motor for a movable body) 320 shown in FIG. 26, parts of the sliding door motor 320 similar to those of the sliding door motor 20 shown in FIGS. 1 to 17 are denoted by like reference numerals used in the sliding door motor 20 and explanation thereof is omitted, and parts of the sliding door motor 320 similar to those of the sliding door motor 120 shown in FIGS. 18 to 25 are denoted by like reference numerals used in the sliding door motor 120 and explanation thereof is omitted.

The sliding door motor 320 according to the third embodiment is applied to, for example, the power slide unit (a body moving apparatus) 10 for a passenger vehicle like the sliding door motor 20 according to the first embodiment.

The sliding door motor 320 rotates the drum 43 according to application of a voltage from a power source described later, and it includes a shaft 333, a worm wheel 341, a motor cap 326, and a motor case 321.

The shaft 333 is provided inside the motor case 321 and the motor cap 326 to be rotatable about a rotation axis 333a through bearings 322a, 322b provided on the motor case 321 and a bearing 327 provided on the motor cap 326. A worm 333b is provided on an outer peripheral face of a portion of the shaft 333 that is positioned between the bearing 322a and the bearing 322b, the braking field magnet 128 is provided on an outer peripheral face of a portion thereof that is positioned between the bearing 322b and the bearing 327 via the braking field-magnet holder 134, and a driving field magnet 328 is provided on the shaft 333 via a driving field-magnet holder 334, as shown in FIG. 27.

The driving field-magnet holder 334 is formed to have a hole with the same diameter as a diameter of the shaft 333, and it is attached to the shaft 333 by fixing an inner peripheral face of the hole and an outer peripheral face of the shaft 333.

The worm wheel 341 is provided in an accommodating space 321c provided in the motor case 321 so as to be rotatable about an output shaft 341a through a bearing (not shown) provided in the motor case 321 and to mesh with the worm 333b, as shown in FIG. 26. The worm wheel 341 of the first embodiment is provided such that the drums 43 attached with one ends of the two wires WI, respectively, are integrated to both sides of the worm wheel 341. That is, in the third embodiment, the worm wheel 341 and the drums 43 are integrally provided such that, when the shaft 333 is rotated once so that the worm wheel 341 is rotated via the worm 333b by a predetermined angle, the drums 43 are also rotated by the predetermined angle.

Figure 27:
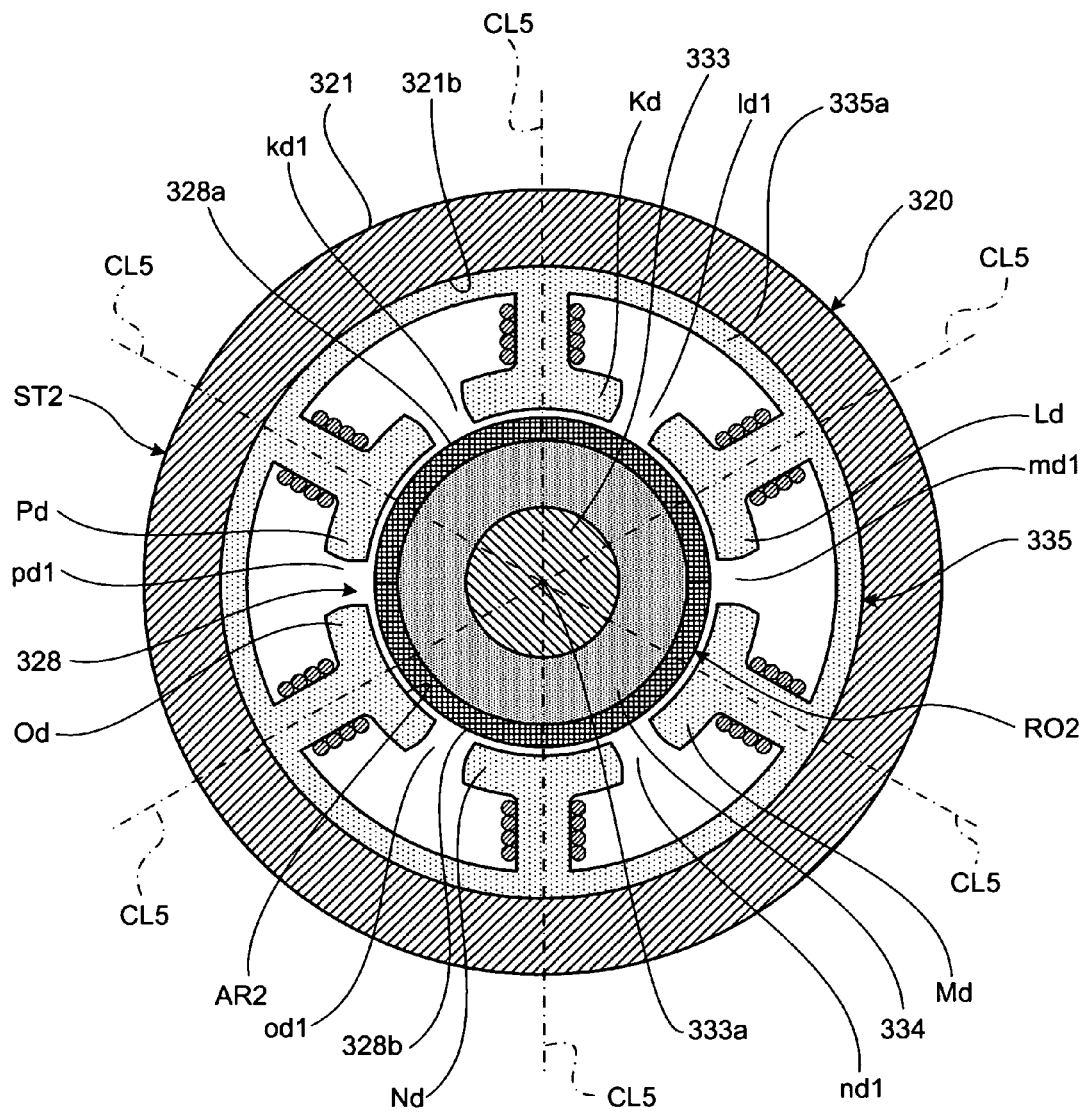
FIG. 27 is a sectional view taken along a line VI-VI in FIG. 26.

As shown in FIG. 27, the driving field magnet 328 is, for example, a plate-like permanent magnet, and it is formed by arranging two permanent magnets as a pair. One driving field magnet 328a is adhered on an upper side of an outer peripheral face of the braking field-magnet holder 334 and the other braking field magnet 328b different in polarity from a surface of the braking field magnet 328a is adhered on a lower side thereof such that the magnets 328a and 328b constitute a cylindrical shape on the outer peripheral face of the braking field-magnet holder 334. More specifically, the one braking field magnet 328a is adhered on the upper side of the outer peripheral face of the braking field-magnet holder 334 such that a surface thereof becomes the north pole, while the other braking field magnet 328b is adhered on the lower side of the outer peripheral face of the braking field-magnet holder 334 such that a surface thereof becomes the south pole.

As shown in FIG. 26, the motor cap 326 is formed in a cylindrical shape with a lid where a seventh space 326a that accommodates the shaft 333 therein is provided.

The motor case 321 is formed therein with a cylindrical eighth space 321a, a cylindrical ninth space 321b with a diameter larger than that of the eighth space 321a, and an accommodating space 321c. The eighth space 321a and the ninth space 321b accommodate the shaft 333 and they are formed to communicate with each other. As described above, the accommodating space 321c accommodates the worm wheel 341 and it is formed to communicate with the eighth space 321a. The motor case 321 and the motor cap 326 are assembled such that the ninth space 321b and the seventh space 326a communicate with each other.

The braking coil holder 135 and the driving coil holder 335 are provided in the ninth space 321b inside the motor case 321.

The driving coil holder 335 holds a conducting coil formed by winding a conducting wire described later, and it is formed by laminating magnetic members such as silicon steel plates so as to have a cylinder portion 335a provided cylindrically, a plurality of (six in the embodiment) tooth portions Kd, Ld, Md, Nd, Od, Pd provided on an inner peripheral face of the cylinder portion 335a so as to project, and a plurality of (six in the embodiment) slot portions (grooves) kd1, ld1, md1, nd1, od1, pd1 provided so as to correspond to the tooth portions Kd, Ld, Md, Nd, Od, Pd, as shown in FIG. 27. The driving coil holder 335 is attached to the motor case 321 by fixing an outer peripheral face of the cylinder portion 335a and an inner peripheral face of the motor case 321.

Each of the tooth portions Kd, Ld, Md, Nd, Od, Pd is formed in a T shape expanding toward its tip end in side view such that an opposed area between a surface of each driving field magnet 328a, 328b and a surface AR2 of the tip end becomes large. The tooth portions Kd, Ld, Md, Nd, Od, Pd are arranged such that a projecting direction of one of the tooth portions and a projecting direction of another of the tooth portions which is provided on the opposite side of the inner peripheral face of the cylinder portion 335a from the one are reverse to each other in a state where a center line CL5 passing through a center passes through the rotation axis 333a on a plane perpendicular to the rotation axis 333a and the slot portions kd1, ld1, md1, nd1, od1, pd1 are each interposed between adjacent ones of the tooth portions such that the tooth portions are positioned at equal intervals on the inner peripheral face of the cylinder portion 335a. Further, in the third embodiment, the tooth portions Kd, Ld, Md, Nd, Od, Pd are arranged on the plane perpendicular to the rotation axis 333a to form a point symmetry about the rotation axis 333a, where six tooth portions Kd, Ld, Md, Nd, Od, Pd are arranged on the inner peripheral face of the cylinder portion 335a such that an angle defined by the center line CL5 of one of the tooth portions Kd, Ld, Md, Nd, Od, Pd and the center line CL5 of another of the tooth portions Kd, Ld, Md, Nd, Od, Pd adjacent thereto forms 60 degrees.

The driving coil holder 335 with these tooth portions Kd, Ld, Md, Nd, Od, Pd are disposed in the ninth space 321b of the motor case 321 such that the surfaces of the driving field magnets 328a, 328b and surfaces AR2 of distal ends of the tooth portions Kd, Ld, Md, Nd, Od, Pd are opposed to each other in a state where slight gaps are formed between the surfaces of the driving field magnets 328a, 328b and the surfaces AR2 of the distal ends of the tooth portions Kd, Ld, Md, Nd, Od, Pd.

Figure 28:
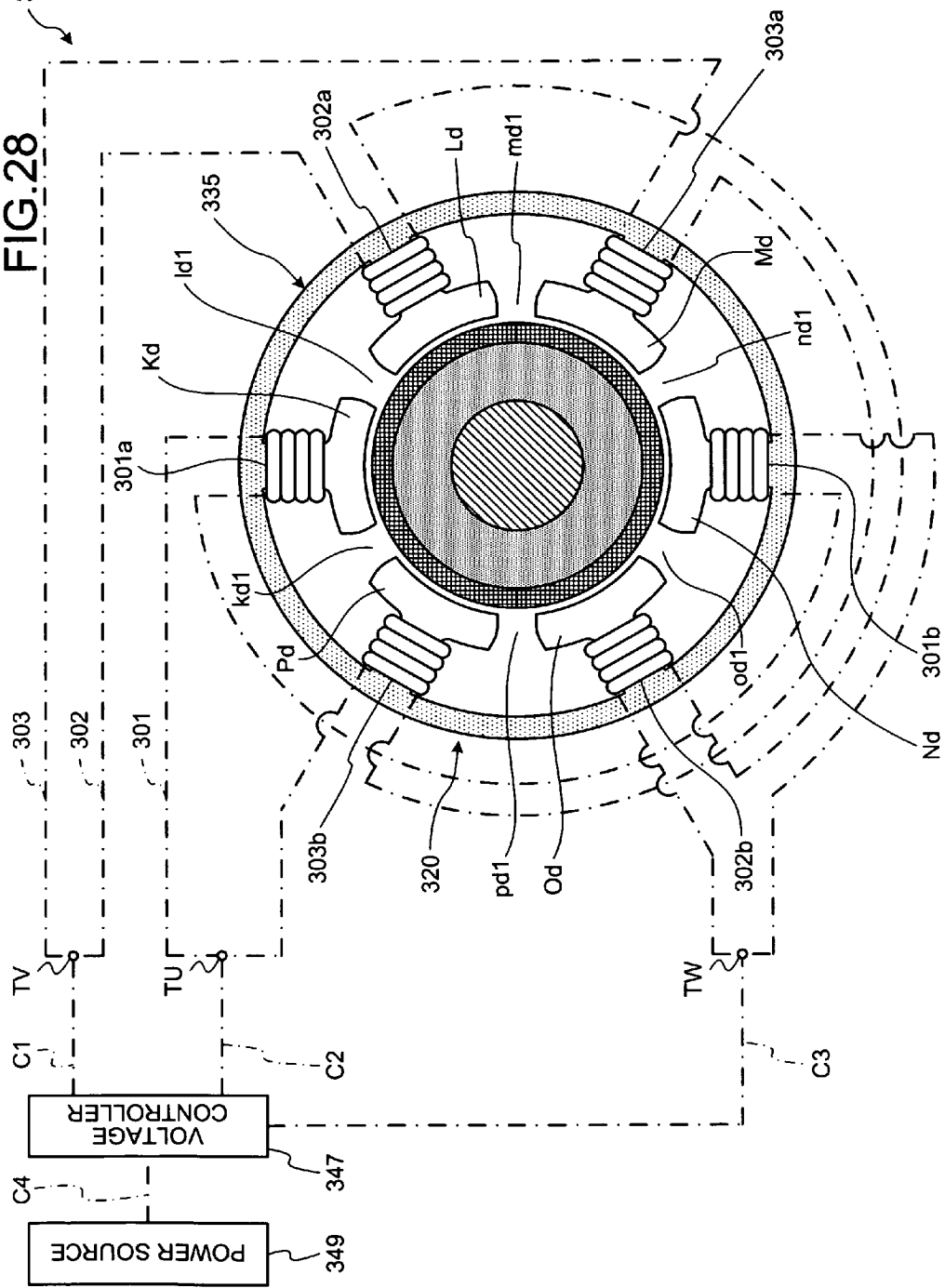
FIG. 28 is a schematic of a driving circuit included in the sliding door motor shown in FIG. 26.

As shown in FIG. 28, for example, in the sliding door motor 320 shown in the third embodiment, conducting coils 301a, 301b, 302a, 302b, 303a, 303b are provided by winding conducting wires 301, 302, 303 on the tooth portions Kd, Ld, Md, Nd, Od, Pd.

That is, the thirty-first conducting wire 301 whose one end has been attached to a terminal TU is made to pass through the slot portion kd1 and the slot portion ld1 so as to be wound around the twenty-first tooth portion Kd for plural times so that the twenty-first conducting coil 301a is provided. The thirty-first conducting wire 301 is then made to pass through the slot portion nd1 and the slot portion od1 so as to be wound around the twenty-fourth tooth portion Nd for plural times in a direction reverse to a winding direction regarding the twenty-first tooth portion Kd so that the twenty-first conducting coil 301b is provided, and thereafter the other end thereof is attached to the other terminal TW.

The twenty-second conducting wire 302 whose one end has been attached to a terminal TV is made to pass through the slot portion ld1 and the slot portion md1 so as to be wound around the twenty-second tooth portion Ld for plural times so that the twenty-second conducting coil 302a is provided. The twenty-second conducting wire 302 is then made to pass through the slot portion od1 and the slot portion pd1 so as to be wound around the twenty-fifth tooth portion Od for plural times in a direction reverse to a winding direction regarding the twenty-second tooth portion Ld so that the twenty-second conducting coil 302b is provided, and thereafter the other end thereof is attached to the other terminal TW.

The twenty-third conducting wire 303 whose one end has been attached to the terminal TV is made to pass through the slot portion md1 and the slot portion nd1 so as to be wound around the twenty-third tooth portion Md for plural times so that the twenty-third conducting coil 303a is provided. The twenty-third conducting wire 303 is then made to pass through the slot portion pd1 and the slot portion kd1 so as to be wound around the twenty-sixth tooth portion Pd for plural times in a direction reverse to a winding direction regarding the twenty-third tooth portion Md so that the twenty-third conducting coil 303b is provided, and thereafter the other end thereof is attached to the terminal TU.

The terminal TV is connected to the voltage controller 347 via a cable C1, the terminal TU is connected to the voltage controller 347 via a cable C2, and the terminal TW is connected to the voltage controller 347 via a cable C3. The voltage controller 347 is disposed, for example, inside the motor cap 326, it is connected to a power source (a battery) 349 provided inside the vehicle main body BD via a cable C4, and converts a DC voltage applied from the power source 349 to a three-phase AC voltage to provide the same. More specifically, the voltage controller 347 shown in the third embodiment converts a DC voltage from the power source 349 to a three-phase AC voltage with phases shifted from one another by 120 degrees to supply the same between the terminals TV and TU, between terminals TU and TW, and between the terminals TW and TV. In the sliding door motor 320 shown in the third embodiment, the power source 349, the voltage controller 347, the cables C1, C2, C3, C4, the terminals TV, TU, TW, and the conducting wires 301, 302, 303 constitute a drive circuit 350.

Although not shown, the sliding door motor 320 shown in the third embodiment includes a brake circuit (a drive control circuit) 154 having the eleventh conducting wire 204 and the switch 153.

In the sliding door motor 320 configured above, as shown in FIGS. 26 and 27, the shaft 333, the braking field-magnet holder 134, and the driving field-magnet holder 334 constitute a rotor RO2, while the motor case 321, the motor cap 326, the braking coil holder 135, and driving coil holder 335 constitute a stator ST2, and the rotor RO2 is disposed to be rotatable to the stator ST2.

Figure 29:
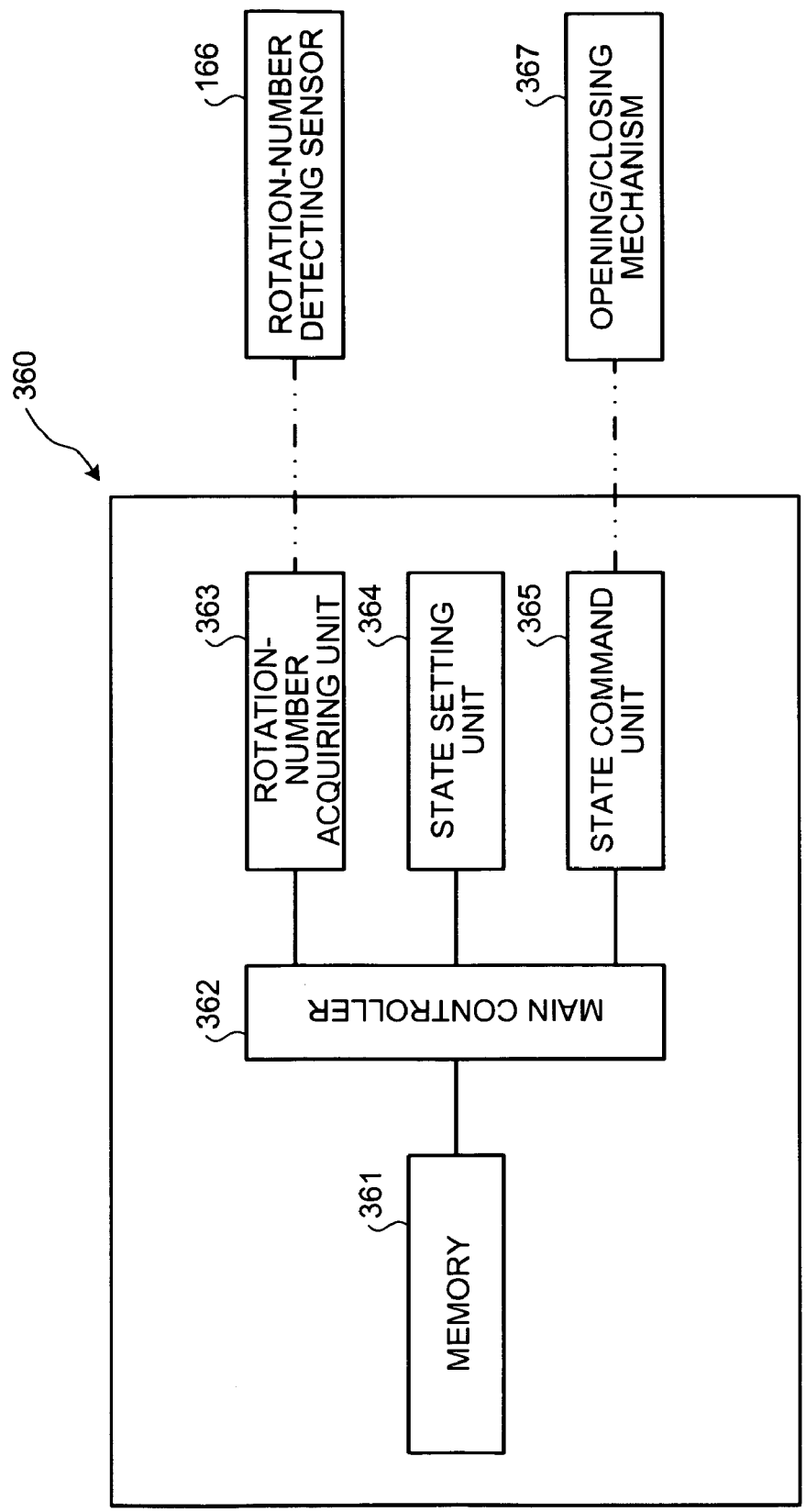
FIG. 29 is a block diagram of a control device included in the sliding door motor shown in FIG. 26.

The switch 153 described above is controlled by the following control device provided inside the vehicle main body BD. As shown in FIG. 29, a control device 360 includes a memory 361, a main controller 362, a rotation-number acquiring unit 363, a state setting unit 364, and a state command unit 365.

The main controller 362 collectively controls the rotation-number acquiring unit 363, the state setting unit 364, and the state command unit 365 based on, for example, a program or data stored in the memory 361 such as a ROM or a RAM in advance.

The rotation-number acquiring unit 363 is connected to a rotation-number detecting sensor 166, which is (shown in FIG. 26) provided inside the motor case 321. The rotation-number acquiring unit 363 calculates a rotation number per unit time (hereinafter, "rotation number") of the shaft 333 based on change of magnetic force detected by the rotation-number detecting sensor 166 and converts the calculated rotation number to a signal to send the same to the main controller 362.

The state setting unit 364 compares the rotation number of the shaft 333 acquired through the rotation-number acquiring unit 363 and a set rotation number (a threshold) of the shaft 333 stored in the memory 361 in advance with each other to set a state of the switch 153. More specifically, the state setting unit 364 compares the rotation number of the shaft 333 acquired through the rotation-number acquiring unit 363 and the threshold with each other to set the closed state of the switch 153 when the rotation number of the shaft 333 is larger than the threshold and set the opened state of the switch 153 when the rotation number of the shaft 333 is smaller than the threshold. The threshold is set to such a rotation number that is not exceeded when the shaft 333 is rotated according to an operation of the door switch during stop of the vehicle main body BD on a horizontal and flat ground and which is exceeded according to a follow-up rotation of the shaft 333 due to an action of the gravity when the shaft 333 is rotated according to an operation of the door switch during stop of the vehicle main body BD on a ground inclined to a moving direction of the door by a predetermined angle.

The state command unit 365 is connected to an opening/closing mechanism 367 provided in the switch 153, and it transmits a command to the opening/closing mechanism 367 based on a state set by the state setting unit 364, thereby changing the state of the switch 153.

The main controller 362 of the control device 360 shown in the third embodiment is connected to the voltage controller 347 via a cable (not shown), and it is also for performing control on the voltage controller 347. More specifically, the main controller 362 transmits a command instructing application of a three-phase AC voltage with phases shifted from one another by 120 degrees to between the terminals TV and TU, between the terminals TU and TW, and between the terminals TW and TV to the voltage controller 347 and instructing stop of the application of a voltage to the voltage controller 347.

Figure 30:
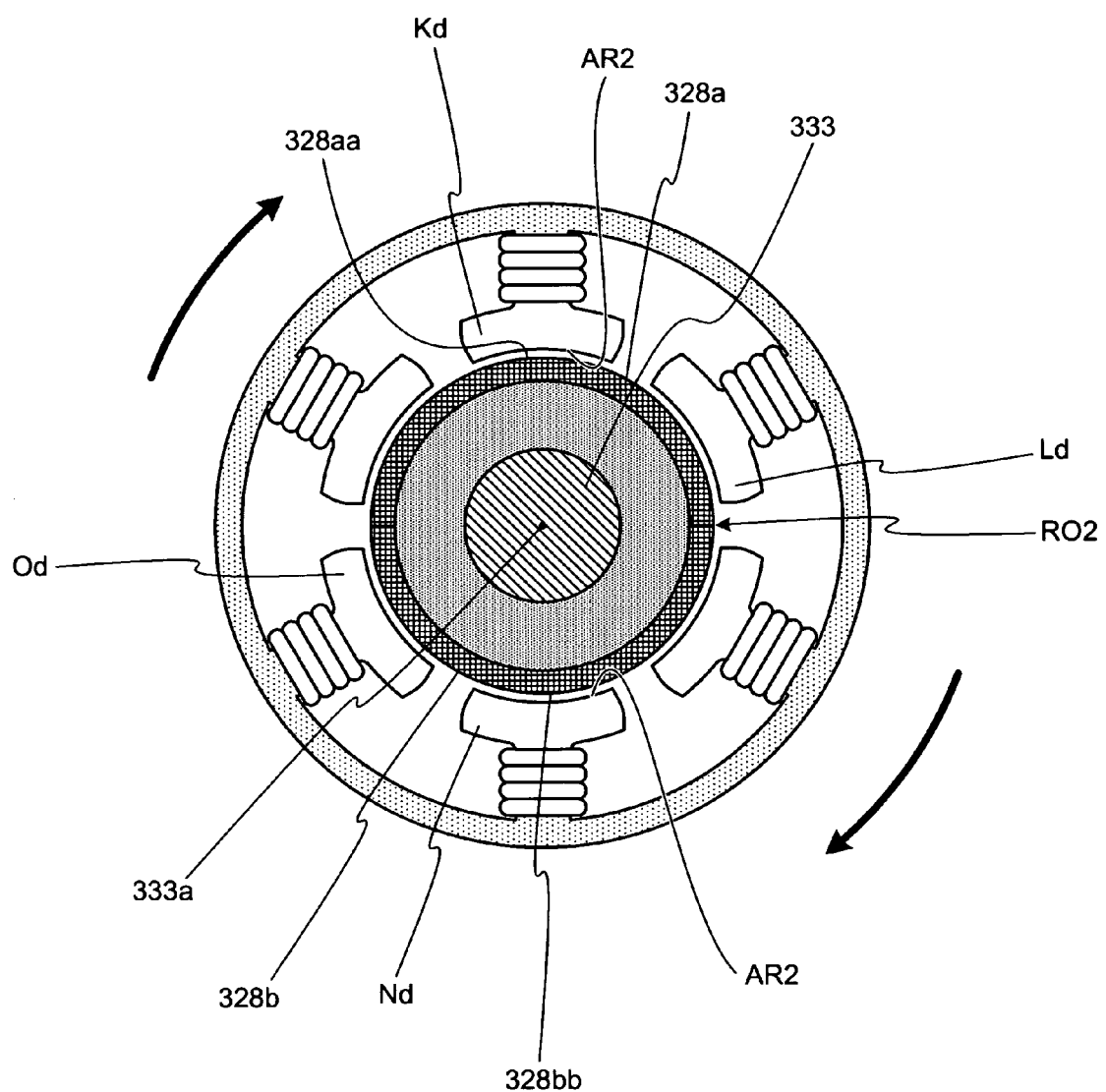
FIGS. 30 to 32 are explanatory diagrams of rotation of a rotor included in the sliding door motor shown in FIG. 26.

In a passenger vehicle to which the sliding door motor 320 with the constitution described above is applied, the sliding door SD is closed, for example, in the following manner. In the explanation below, it is assumed that the passenger vehicle stops on a horizontal and flat ground (a ground that is not inclined in a door opening direction and a door closing direction of the sliding door SD). As an initial state in the explanation, it is assumed that the sliding door SD is put in a fully opened position, and the rotor RO2 is stopped at a position where the center 328$aa$ of one driving field magnet 328$a$ and the surface AR2 of the twenty-first tooth portion Kd face each other and the center 328$bb$ of the other driving field magnet 328$b$ and the surface AR2 of the twenty-fourth tooth portion Nd face each other on a plane perpendicular to the rotation axis 333$a$, as shown in FIG. 30.

Since the shaft 333 is stopped in this state, the rotation-number detecting sensor 166 detects that the rotation number of the shaft 333 is zero. Thereby, the rotation-number acquiring unit 363 transmits that the rotation number of the shaft 333 is zero to the main controller 362. When the main controller 362 receives that effect, the state setting unit 364 determines that the rotation number of the shaft 333 is smaller than the threshold to perform setting for maintaining the opened state of the switch 153. Thereby, the state command unit 365 transmits a command instructing that the opened state of the switch 153 should be maintained to the opening/closing mechanism 367. Upon receipt of the command instructing that effect, the opening/closing mechanism 367 maintains the opened state of the switch 153.

For example, when a driver operates the door switch to conduct a door-closing operation from this state, a command instructing that an AC voltage with a frequency of T and phases shifted from one another by 120 degrees is applied to between the terminals TV and TU, between the terminal TU and TW, and between the terminals TW and TV is transmitted to the voltage controller 347 from the control device 360.

When the voltage controller 347 received the command instructing that effect, it starts application of an AC voltage with phases shifted from one another by 120 degrees to between the terminals TV and TU, between the terminals TU and TW, and between the terminals TW and TV.

Thereafter, the voltage controller 347 applies a voltage to between the terminals TV and TU, between the terminal TU and TW, and between the terminals TW and TV at a time t1 such that the twenty-second tooth portion Ld becomes the south pole with the highest magnetic field intensity and the twenty-fifth tooth portion Od becomes the north pole with the highest magnetic field intensity.

Figure 31:
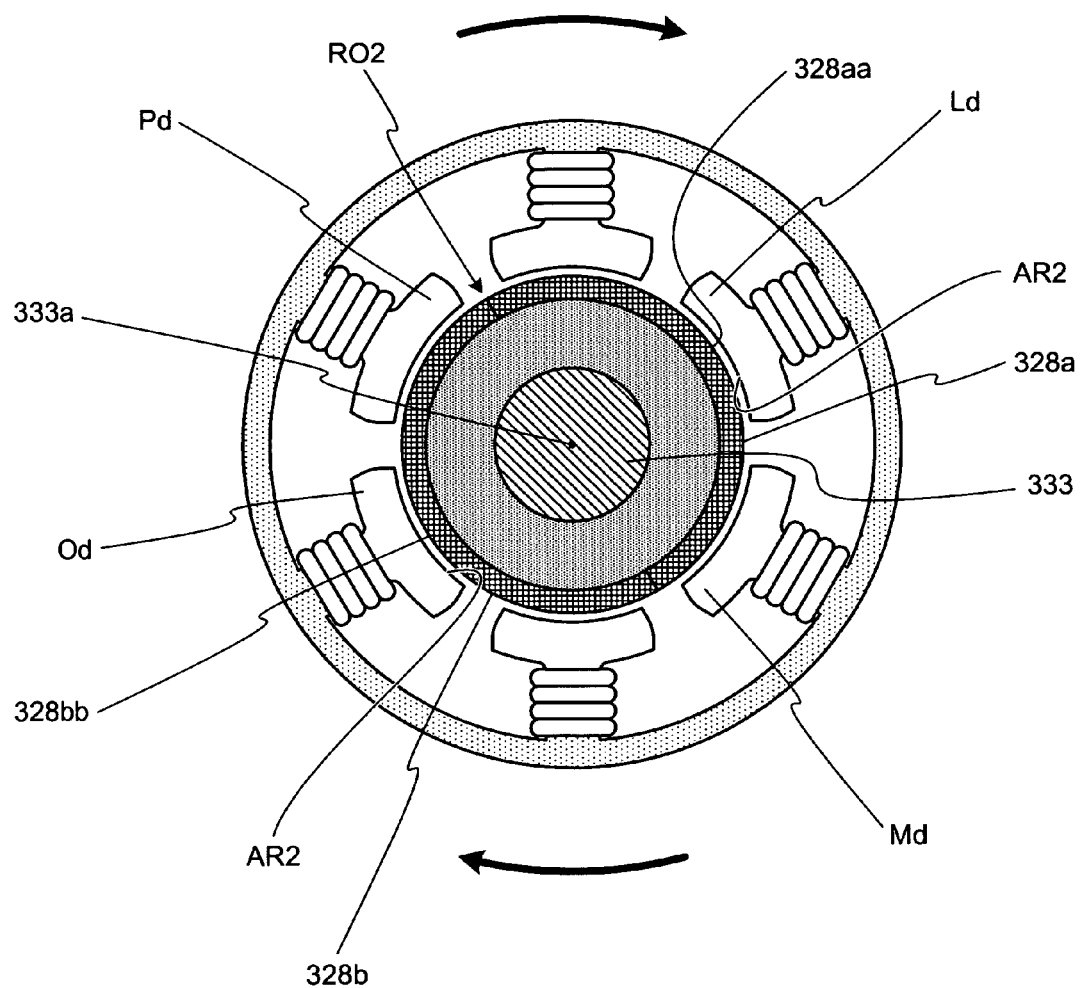

Since the twenty-second tooth portion Ld and the driving field magnet 328$a$ attract each other and the twenty-fifth tooth portion Od and the driving field magnet 328$b$ attract each other according to application of the voltage, the rotor RO2 rotates in a clockwise direction. As shown in FIG. 31, according to the rotation, the rotor RO2 rotates to a position where the center 328$aa$ of one driving field magnet 328$a$ and the surface AR2 of the twenty-second tooth portion Ld face each other and the center 328$bb$ of the other driving field magnet 328$b$ and the surface AR2 of the twenty-fifth tooth portion Od face each other on a plane perpendicular to the rotation axis 333$a$.

When T/6 time period elapses from the time t1, the voltage controller 347 applies a voltage to between the terminals TV and TU, between the terminal TU and TW, and between the terminals TW and TV such that the twenty-third tooth portion Md becomes the south pole with the highest magnetic field intensity and the twenty-sixth tooth portion Pd becomes the north pole with the highest magnetic field intensity.

Figure 32:
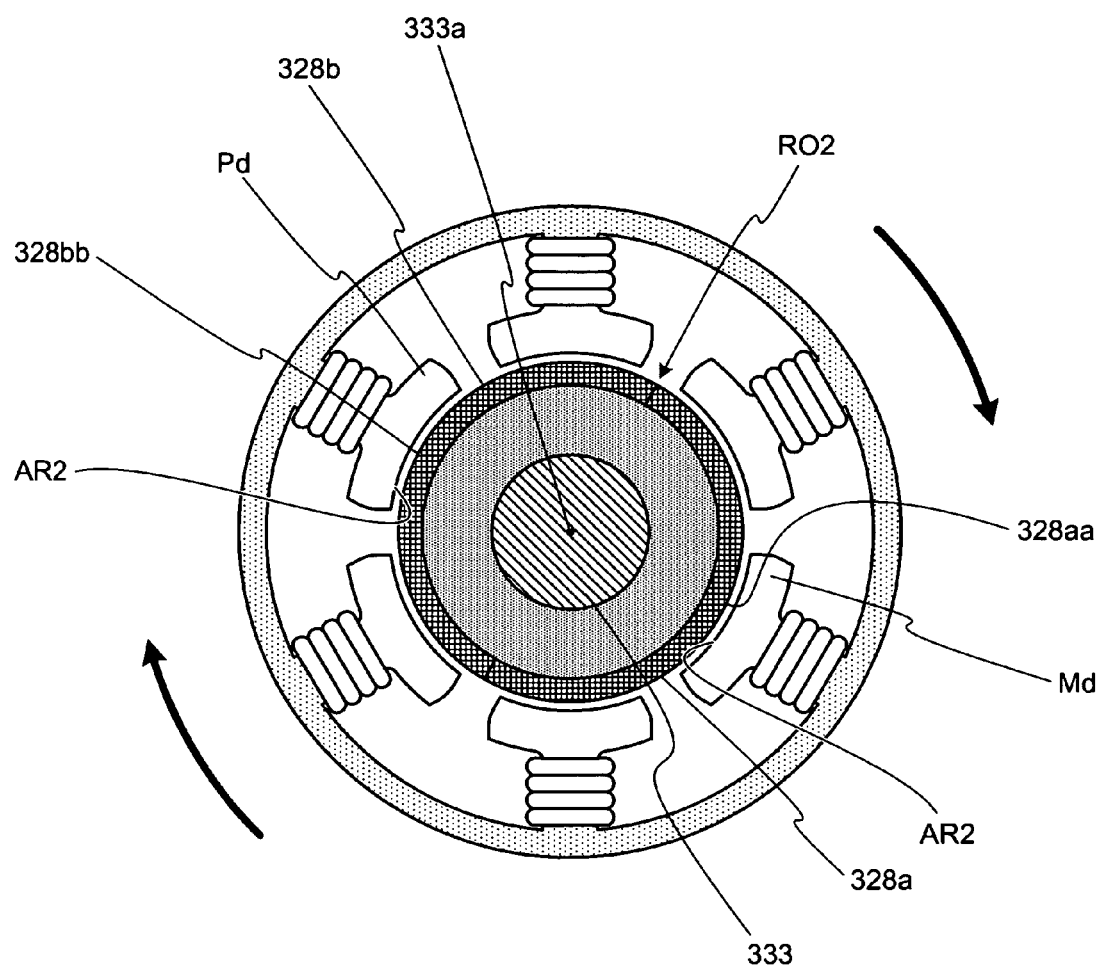

Since the twenty-third tooth portion Md and the driving field magnet 328$a$ attract each other and the twenty-sixth tooth portion Pd and the driving field magnet 328$b$ attract each other according to application of the voltage, the rotor RO2 rotates in a clockwise direction. As shown in FIG. 32, according to the rotation, the rotor RO2 rotates to a position where the center 328*aa* of the driving field magnet 328*a* and the surface AR2 of the twenty-third tooth portion Md face each other and the center 328*bb* of the other driving field magnet 328*b* and the surface AR2 of the twenty-sixth tooth portion Pd face each other on the plane perpendicular to the rotation axis 333*a*.

Similarly, the voltage controller 347 applies a voltage to between the terminals TV and TU, between the terminal TU and TW, and between the terminals TW and TV for each elapsing of T/6 time period such that the magnetic field intensities of ones of the tooth portions Kd, Ld, Md, Nd, Od, Pd that are adjacent to each other in a clockwise direction becomes the highest.

According to application of the voltage, one of the tooth portions Kd, Ld, Md, Nd, Od, Pd that becomes the south pole with the highest magnetic field intensity and the driving field magnet 328*a* attract each other and one of the tooth portions Kd, Ld, Md, Nd, Od, Pd that becomes the north pole with the highest magnetic field intensity and the driving field magnet 328*b* attract each other so that the rotor RO2 is rotated in a clockwise direction and the rotor RO2 is rotated in a clockwise direction according to the rotation.

As described above, when the rotor RO2 rotates and the worm 333*b* together with the shaft 333 rotates, the worm wheel 341 meshing with the worm 333*b* rotates. When the worm wheel 341 rotates, the drum 43 provided integrally with the worm wheel 341 also rotates. When the drum 43 rotates, the door-closing wire WI is wound while the door-opening wire WI is unwound, so that the sliding door SD is moved in the door-closing direction via these wires WI.

The rotation-number detecting sensor 166 detects the rotation number of the shaft 333 for each predetermined time period even during rotation of the rotor RO2. When it is detected by the rotation-number detecting sensor 166 that the rotation number of the shaft 333 is smaller that the threshold, the rotation-number acquiring unit 363 transmits that the rotation number of the shaft 333 is smaller than the threshold to the main controller 362. When the main controller 362 receives that effect, the state setting unit 364 determines that the rotation number of the shaft 333 is smaller than the threshold to set that the opened state of the switch 153 is maintained. Thereby, the state command unit 365 transmits a command instructing that the switch 153 is maintained in the opened state to the opening/closing mechanism 367. Upon receipt of the command, the opening/closing mechanism 367 continue to maintain the switch 153 in the opened state.

On the other hand, when it is detected by the rotation-number detecting sensor 166 that the rotation number of the shaft 333 is larger that the threshold, the rotation-number acquiring unit 363 transmits that the rotation number of the shaft 333 is larger than the threshold to the main controller 362. When the main controller 362 receives that effect, the state setting unit 364 determines that the rotation number of the shaft 333 is larger than the threshold to set that the switch 153 should be changed to a closed state. Thereby, the state command unit 365 transmits a command instructing that the switch 153 should be changed to a closed state to the opening/closing mechanism 367. When receiving the command, the opening/closing mechanism 367 changes the switch 153 to a closed state.

As described above, the passenger vehicle stops on a horizontal and flat ground, where the sliding door SD is not biased in the door-closing direction due to an action of the gravity. In this case, therefore, the rotation number of the shaft 333 does not exceed the threshold due to an action of the gravity, so that the switch 153 continues to maintain the opened state. Accordingly, induced electromotive force is not generated in the brake coils 211, 212, 213, 214, 215, 216 due to the magnetic force of the braking field magnets 128*a*, 128*b* according to the rotation of the rotor RO2 so that no current flows in the brake coils 211, 212, 213, 214, 215, 216. Therefore, the rotation of the rotor RO2 is not suppressed by the brake coils 211, 212, 213, 214, 215, 216.

The sliding door SD is then shifted to a fully closed position according to a sliding movement caused by driving of the sliding door motor 320. When the sliding door SD has been shifted to the fully closed position, the voltage controller 347 stops application of a voltage based on a command from the control device 360. Thereby, the rotation of the rotor RO2 stops.

Next, a case that, for example, a driver operates the door switch for door opening in a state where the vehicle main body BD is stopped on a ground inclined downwardly in the door-opening direction of the sliding door SD after the driver moves the passenger vehicle will be explained.

When the door switch is operated for door opening, a command instructing that an AC voltage with phases shifted from one another by 120 degrees is applied to between the terminals TV and TU, between the terminals TU and TW, and between the terminals TW and TV is transmitted from the control device 360 to the voltage controller 347.

Upon receipt of the command instructing that effect from the control device 360, the voltage controller 347 applies an AC voltage with a frequency of T and phases shifted from one another by 120 degrees to between the terminals TV and TU, between the terminals TU and TW, and between the terminals TW and TV such that the rotor RO2 rotates in a counterclockwise direction.

When the rotor RO2 rotates in a counterclockwise direction and the worm 333*b* together with the shaft 333 rotates, the worm wheel 341 meshing with the worm 333*b* rotates. When the worm wheel 341 rotates, the drum 43 provided integrally with the worm wheel 341 also rotates. When the drum 43 rotates, the door-opening wire WI is wound while the door-closing wire WI is unwound, so that the sliding door SD is moved in the door-opening direction via these wires WI.

As described above, the rotation-number detecting sensor 166 detects the rotation number of the shaft 333 for each predetermined time period during the rotation of the rotor RO2, and the control device 360 transmits a command to the opening/closing mechanism 367 based on the result of the detection.

As described above, the passenger vehicle is stopped on a ground inclined downwardly in the door-opening direction of the slide door SD and the vehicle main body BD is biased in the door-opening direction due to an action of the gravity, so that a case that the rotation number of the shaft 333 exceeds the threshold according to a follow-up rotation of the rotor RO2 can occur.

When it is detected by the rotation-number detecting sensor 166 that the rotation number of the shaft 333 exceeds the threshold, the control device 360 transmits a command instructing that the switch 153 is switched to the closed state to the opening/closing mechanism 367 based on the detection result. Upon receipt of the command, the opening/closing mechanism 367 switches the switch 153 to the closed state.

When the switch 153 is switched to the closed state, the brake circuit 154 switches to a closed circuit. When the rotor RO2 is rotated in this state, an induced electromotive force is generated in the brake coils 211, 212, 213, 214, 215, 216 according to electromagnetic induction caused by the braking field magnets 128*a*, 128*b* so that a current flows in the brake circuit 154 and magnetic field that suppresses the rotation of the rotor RO2 is generated in the brake coils 211, 212, 213, 214, 215, 216. The suppression of the rotation of the rotor RO2 continues during a period where the rotation number of the shaft 333 exceeds the threshold.

Accordingly, since a problem of the rotation number of the rotor RO2 exceeding the threshold is prevented, the sliding door SD is prevented from opening forcefully. Thereafter, when the rotation number of the rotor RO2 becomes lower than the threshold, it is detected by the rotation-number detecting sensor 166, and the control device 360 transmits a command instructing that the switch 153 is switched to the opened state to the opening/closing mechanism 367 based on the detection result. Upon receipt of the command, the opening/closing mechanism 367 switches the switch 153 to the opened state.

Next, when the sliding door SD is shifted to a fully opened position, the voltage controller 347 stops applying a voltage based on a command from the control device 360. Thereby, the rotation of the rotor RO2 stops.

In the above example, there has been explained the prevention of the problem of the sliding door SD opening forcefully when the sliding door SD is opened. A problem in the sliding door SD closing forcefully when the sliding door SD is closed is also prevented in the sliding door motor 320 according to a similar action.

According to the sliding door motor 320 shown in the third embodiment, since the switch 153 interposed between the both ends of the brake coils 211, 212, 213, 214, 215, 216 is provided to be switchable between the opened state and the closed state, when the switch 153 is switched to the closed state, the rotation of the rotor RO2 can be suppressed so that a problem of the sliding door SD closing forcefully can be prevented, and a problem of the sliding SD opening forcefully can be prevented. Thereby, the operability of the sliding door SD can be improved. Furthermore, when the switch 153 is switched to the opened state, the rotation of the rotor RO2 is not suppressed, so that efficiency thereof is not reduced.

According to the sliding door motor 320, the switch 153 is provided in the brake circuit 154 and the switch 153 can be switched to the closed state, if necessary, so that it is possible to set the gear ratio between the worm 333b and the worm wheel 341 such that the rotor RO2 rotates easily. By providing the worm 333b and the worm wheel 341 at such a gear ratio that the rotor RO2 rotates easily and providing the worm wheel 341 and the drum 43 integrally, the sliding door SD can be opened and closed manually according to a door operation of the door handle DH. Further, by providing the worm wheel 341 and the drum 43 integrally, the number of parts can be reduced so that the sliding door motor 320 can be provided at a low price. Of course, when the rotation number of the rotor RO2 exceeds the threshold by manually biasing the sliding door SD during a sliding movement of the sliding door SD performed by the voltage controller 347, the switch 153 is switched to the closed state so that the rotation of the rotor RO2 can be suppressed.

Further, according to the sliding door motor 320, since the brake coils 211, 212, 213, 214, 215, 216 are provided on all the tooth portions K, L, M, N, O, P, balanced state can be achieved when the rotation of the rotor RO2 is suppressed, so that occurrence of the vibration due to rotation fluctuation can be prevented, and occurrence of the noise due to the rotation fluctuation can be prevented.

In addition, according to the sliding door motor 320, since the braking coil holder 135 and the driving coil holder 335 are provided on the stator ST2, it is unnecessary to provide the brushes 23a, 23b, the braking brushes 30a, 30b, the commutator 37, and the braking commutator 39 explained in the first embodiment between the rotor RO2 and the stator ST2. Therefore, since the brushes 23a, 23b and the commutator 37 do not contact each other and the braking brushes 30a, 30b and the braking commutator 39 do not contact with each other, the vibration generated due to the contact can be prevented, the noise generated due to the contact can be prevented, and the electric noise generated by a spark due to the contact can be prevented.

According to the sliding door motor 320, since the magnetic force detecting sensor 166 that detects the magnetic force of the braking field magnets 128a, 128b is provided, a field magnet provided only for detecting the rotation number of the rotor RO2 can be cancelled by utilizing the braking field magnets 128a, 128b for suppressing the rotation of the rotor RO2 as field magnets for detecting the rotation number of the rotor RO2. Therefore, a parts cost can be reduced by sharing the braking field magnets 128a, 128b so that an inexpensive sliding door motor 320 can be provided.

In the third embodiment, explanation has been made using the sliding door motor 320 for opening and closing the sliding door SD provided on a side of the vehicle main body BD. However, the present invention is not limited to the embodiment, and even if it is applied to a sliding door motor for opening and closing a back door provided in the rear portion of the vehicle main body BD, similar functions and effects can be achieved. Of course, the present invention is not limited to the sliding door SD and the back door, and similar functions and effects can be achieved even in application of the present invention to a movable body opening and closing motor that moves, for example, a sunroof (a movable body) provided at a ceiling portion of the vehicle main body BD, and similar functions and effects can be achieved even in an application of the present invention to a motor for a movable body that moves a passenger seat (a movable body). Of course, the example where the present invention has been applied to the four-wheel passenger vehicle has been explained in the above, however, the present invention is not limited to the example, and similar functions and effects can be achieved even in application of the present invention to, for example, a motor truck (a truck) or a vehicle of a train, and similar functions and effects can be achieved even in application of the present invention to a motor for a movable body that moves a gate door (a movable body) for a house or the like.

In the third embodiment, the case that, when the rotation number of the shaft 333 exceeds the threshold, the control device 360 that suppresses the rotation of the rotor RO2 according to switching of the switch 153 to the closed state is provided has been explained. However, the present invention is not limited thereto, and a control device that performs switching between the opened state and the closed state of the switch 153 so as to intermittently perform suppression of the rotation of the rotor RO2 during a period where the rotation number of the shaft 333 exceeds the threshold can be provided.

In the third embodiment, the case that two braking field magnets 328a, 328b are provided on the shaft 333 has been explained. However, the present invention is not limited thereto, and more than two braking field magnets can be provided on the shaft 333.

In the third embodiment, the case that the magnetic force detecting sensor 166 that detects the magnetic force of the braking field magnets 128a, 128b is provided and the braking field magnets 128a, 128b are utilized as field magnets that detects the rotation number of the rotor RO2 has been explained. However, the present invention is not limited thereto, and if a magnetic force detecting sensor (a magnetic force detector) that detects magnetic force of the driving field magnets 328a, 328b is provided and the driving field magnets 328a, 328b that rotate the rotor RO2 are utilized as a field magnet that detects the rotation number of the rotor RO2, an inexpensive sliding door motor can be provided.

In the third embodiment, the case that the braking field-magnet holder 134 that holds the braking field magnets 128a, 128b, the braking coil holder 135 that holds the brake coil 211, 212, 213, 214, 215, 216, the driving coil holder 335 that holds the conducting coils 301a, 301b, 302a, 302b, 303a, 303b, and the driving field-magnet holder 334 that holds the driving field magnets 328a, 328b are provided has been explained. However, the present invention is not limited thereto, and the motor for a movable body can include a field magnet holder that holds the braking field magnets 128a, 128b and the driving field magnets 328a, 328b and a coil holder that holds the brake coils 211, 212, 213, 214, 215, 216 and the conducting coils 301a, 301b, 302a, 302b, 303a, 303b.

In the third embodiment, the case that the driving coil holder 335 and the braking coil holder 135 are provided on the stator ST2 while the driving field-magnet holder 334 and the braking field-magnet holder 134 are provided on the rotor RO2 has been explained, and the case that the motor cap (the driving field-magnet holder) 126 and the braking coil holder 135 are provided on the stator ST1 while the coil holder (the driving coil holder) 135 and the braking field-magnet holder 134 are provided on the rotor RO1 has been explained in the second embodiment. However, the present invention is not limited thereto, and the driving field-magnet holder and the braking coil holder can be provided on the rotor while the driving coil holder and the braking field-magnet holder being provided on the stator, or the driving field-magnet holder and the braking field-magnet holder can be provided on the stator while the driving coil holder and the braking coil holder being provided on the rotor.

According to an aspect of the present invention, in a motor for a movable body, since the brake coil where an electromotive force for generating magnetic field for suppressing the relative rotation of the coil holder and the field magnet holder between the both ends of the brake coil is induced when a current flows in the conducting coil and a switch unit interposed between the both ends of the brake coil are provided on the coil holder, the relative rotation of the coil holder and the field magnet holder can be suppressed by the brake coil when the switch unit is switched to a closed state. Accordingly, for example, a problem of the movable body such as a door moving forcefully is prevented, and the operability can be improved. Furthermore, since the relative rotation of the coil holder and the field magnet holder is not suppressed by the brake coil when the switch unit is switched to an opened state, efficiency thereof is not reduced.

Moreover, since the brake commutator and the brake brush are provided between the brake coil and the switch unit, the switch unit can be provided externally via a harness, for example. Thereby, a small-sized motor for a movable body can be provided.

Furthermore, since the magnetic force detector for detecting magnetic force of the field magnet is provided on the stator, the field magnet that causes the rotor to generates a rotational force in cooperation with the conducting coil is utilized as a field magnet that detects the rotation number of the rotor, so that a field magnet that is provided only for detecting the rotation number of the rotor can be cancelled. Thereby, a parts cost is reduced owing to sharing of the field magnet, so that an inexpensive motor for a movable body can be provided.

Moreover, since the intermediate position stop coil disposed such that the magnetic force of the field magnet and magnetic force generated by application of a voltage to between both ends of the intermediate position stop coil are attracted to each other is provided in the coil holder, the movable body can be stopped at an intermediate position. Therefore, the operability can be further improved.

According to another aspect of the present invention, in a motor for a movable body, since the brake coil where an electromotive force for generating magnetic field suppressing the relative rotation of the driving coil holder and the driving field-magnet holder is induced between the both ends of the brake coil when a current flows in the conducting coil and a switch unit that is interposed between the both ends of the brake coil are provided in the braking coil holder, the relative rotation of the driving coil holder and the driving field-magnet holder can be suppressed by the brake coil when the switch unit is switched to a closed state. Accordingly, for example, a problem of the movable body such as a door moving forcefully is prevented, and the operability can be improved. Furthermore, since the relative rotation of the driving coil holder and the driving field-magnet holder is not suppressed when the switch unit is switched to an opened state, efficiency thereof is not reduced.

Moreover, since the magnetic force detector that detects magnetic force of the braking field magnetic is provided on the stator, the braking field magnet that suppresses the relative rotation of the driving field-magnet holder and the driving coil holder in cooperation with the brake coil is utilized as a field magnet that can detect the rotation number of the rotor, so that a field magnet that is provided only for detecting the rotation number of the rotor can be omitted. Therefore, a parts cost is reduced owing to sharing of the field magnet, so that an inexpensive motor for a movable body can be provided.

Furthermore, since the magnetic force detector that detects the magnetic force of the driving field magnet is provided on the stator, the driving field magnet that performs the relative rotation of the driving field-magnet holder and the driving coil holder in cooperation with the conducting coil is utilized as a field magnet that can detect the rotation number of the rotor, so that a field magnet that is provided only for detecting the rotation number of the rotor can be omitted. Therefore, a parts cost is reduced owing to sharing of the field magnet, so that an inexpensive motor for a movable body can be provided.

Moreover, since the brake commutator and the brake brush are provided between the brake coil and the switch unit, the switch unit can be provided externally via a harness, for example. Thereby, a small-sized motor for a movable body can be provided.

Furthermore, since the intermediate position stop coil, which is disposed such that the magnetic force of the braking field magnet and the magnetic force generated by application of a voltage to between the both ends of the intermediate position stop coil are attracted to each other, is provided in the braking coil holder, the movable body can be stopped at an intermediate position. Therefore, its operability can be further improved.

According to still another aspect of the present invention, a body moving apparatus includes the above motor for a movable body, so that a body moving apparatus having the advantages described above can be provided.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor for driving a movable body, the motor comprising:
   a field magnet holder that holds a field magnet;
   a coil holder rotatable relative to the field magnet holder;
   a conducting coil that is wound on the coil holder and generates a rotational force between the coil holder and the field magnet holder when a current flows in the conducting coil;
   a brake coil that is wound on the coil holder, where an electromotive force for generating magnetic field that suppresses relative rotation between the coil holder and the field magnet holder is induced at both ends of the brake coil when a current flows in the conducting coil;
   a switch unit that is electrically interposed between the both ends of the brake coil; and
   a control device that switches the switch unit between an open state and a closed state so as to intermittently perform suppression of the relative rotation between the field magnet holder and the coil holder.

2. The motor according to claim 1, further comprising a stator and a rotor, wherein the field magnet holder is provided on the stator, and the coil holder is provided on the rotor.

3. The motor according to claim 2, wherein a braking commutator and a braking brush are provided between the brake coil and the switch unit.

4. The according to claim 1, further comprising a stator and a rotor, wherein the field magnet holder is provided on the rotor, and the coil holder is provided on the stator.

5. The motor according to claim 4, wherein a magnetic force detector that detects magnetic force of the field magnet is provided on the stator.

6. The motor according to claim 1, wherein an intermediate position stopping coil that is disposed such that the magnetic force of the field magnet and magnetic force generated by application of a voltage to both ends of the intermediate position stopping coil attract each other is provided on the coil holder.

7. A motor for driving a movable body, the motor comprising:
   a driving field-magnet holder that holds a driving field magnet;
   a driving coil holder that is rotatable relative to the driving field-magnet holder;
   a conducting coil that is wound on the driving coil holder and generates a rotational force between the driving coil and the driving field-magnet holder when a current flows in the conducting coil;
   a braking field-magnet holder that is rotatable together with any one of the driving coil holder and the driving field-magnet holder by a rotational force generated by the conducting coil and holds a braking field magnet;
   a braking coil holder that is rotatable relative to the braking field-magnet holder;
   a brake coil that is wound on the braking coil holder, where an electromotive force for generating magnetic field that suppresses, the relative rotation between the driving coil holder and the driving field-magnet holder is induced at both ends of the brake coil when a current flows in the conducting coil; and
   a switch unit that is electrically interposed between both ends of the brake coil.

8. The motor according to claim 7, further comprising a stator and a rotor, wherein both the driving field-magnet holder and the braking coil holder are provided on the stator, and both the driving coil holder and the braking field-magnet holder are provided on the rotor.

9. The motor according to claim 7, further comprising a stator and a rotor, wherein both the driving coil holder and the braking coil holder are provided on the stator, and both the driving field-magnet holder and the braking field-magnet holder are provided on the rotor.

10. The motor according to claim 7, further comprising a stator and a rotor, wherein both the driving field-magnet holder and the braking coil holder are provided on the rotor, and both the driving coil holder and the braking field-magnet holder are provided on the stator.

11. The motor according to claim 7, further comprising a stator and a rotor, wherein both the driving field-magnet holder and the braking field-magnet holder are provided on the stator, and both the driving coil holder and the braking coil holder are provided on the rotor.

12. The motor according to claim 8, wherein a magnetic force detector that detects magnetic force of the braking field magnet is provided on the stator.

13. The motor according to claim 9, wherein a magnetic force detector that detects magnetic force of the braking field magnet is provided on the stator.

14. The motor according to claim 9, wherein a magnetic force detector that detects magnetic force of the driving field magnet is provided on the stator.

15. The motor according to claim 10, wherein a magnetic force detector that detects magnetic force of the driving field magnet is provided on the stator.

16. The motor according to claim 10, wherein a braking commutator and a braking brush are provided between the brake coil and the switch unit.

17. The motor according to claim 11, wherein a braking commutator and a braking brush are provided between the brake coil and the switch unit.

18. The motor according to claim 7, further comprising a control device that switches the switch unit between its opened state and its closed state so as to intermittently perform suppression of the relative rotation between the driving coil holder and the driving field-magnet holder.

19. The motor according to claim 7, wherein an intermediate position stopping coil disposed such that the magnetic force of the braking field magnet and magnetic force generated by application of a voltage to both ends of the intermediate position stopping coil attract each other is provided on the braking coil holder.

* * * * *